United States Patent
Shah et al.

(10) Patent No.: US 12,423,900 B1
(45) Date of Patent: Sep. 23, 2025

(54) METHODS AND USER INTERFACES BASED ON MOTION

(71) Applicant: Apple Inc., Cupertino, CA (US)

(72) Inventors: Ronak J. Shah, Sunnyvale, CA (US); Matthew J. Allen, Menlo Park, CA (US); Felipe Bacim De Araujo E. Silva, San Jose, CA (US); Karlin Y. Bark, San Carlos, CA (US); Daniel K. Boothe, San Francisco, CA (US); Daniel De Rocha Rosario, San Francisco, CA (US); Avi S. Khemani, Los Altos Hills, CA (US); Jean-Pierre M. Mouilleseaux, San Carlos, CA (US); Samuel B. Schaevitz, Los Gatos, CA (US); Kurt R. Stiehl, Los Gatos, CA (US); Stuart J. Wood, London (GB)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 18/372,032

(22) Filed: Sep. 22, 2023

Related U.S. Application Data

(60) Provisional application No. 63/409,741, filed on Sep. 24, 2022.

(51) Int. Cl.
*G06T 13/80* (2011.01)
(52) U.S. Cl.
CPC .................................. *G06T 13/80* (2013.01)
(58) Field of Classification Search
CPC ......... G06T 19/006; G06T 2207/20221; G06T 2219/016; G06T 3/20; G06T 7/246; G06T 7/579; G06T 13/80
See application file for complete search history.

(56) References Cited

U.S. PATENT DOCUMENTS

| | | |
|---|---|---|
| 2015/0279102 A1 | 10/2015 | Fleck et al. |
| 2016/0335739 A1 | 11/2016 | Abraham et al. |
| 2018/0184014 A1 | 6/2018 | Goldstein |
| 2020/0017026 A1 | 1/2020 | Kumar et al. |
| 2023/0071037 A1 | 3/2023 | Kim et al. |
| 2023/0219419 A1 | 7/2023 | Kim |
| 2023/0259328 A1 | 8/2023 | Umezawa et al. |
| 2025/0110549 A1 | 4/2025 | Shah et al. |
| 2025/0113068 A1 | 4/2025 | Meyers |

FOREIGN PATENT DOCUMENTS

| | | |
|---|---|---|
| GB | 2557996 A | 7/2018 |
| WO | 2023/060048 A1 | 4/2023 |

OTHER PUBLICATIONS

International Search Report and Written Opinion received for PCT Patent Application No. PCT/US2024/049099, mailed on Nov. 18, 2024, 13 pages.
International Search Report and Written Opinion received for PCT Patent Application No. PCT/US2024/049102, mailed on Jan. 3, 2025, 13 pages.

*Primary Examiner* — Peter Hoang
(74) *Attorney, Agent, or Firm* — DLA Piper LLP (US)

(57) ABSTRACT

A method includes displaying a dynamic graphical element in a first state and graphical content in a second state. While displaying the graphical content in the second state, the graphical content is displayed in the second state and the dynamic graphical element is displayed in a third state, where the third state is different from the first state, and the third state is based on detected motion.

51 Claims, 47 Drawing Sheets

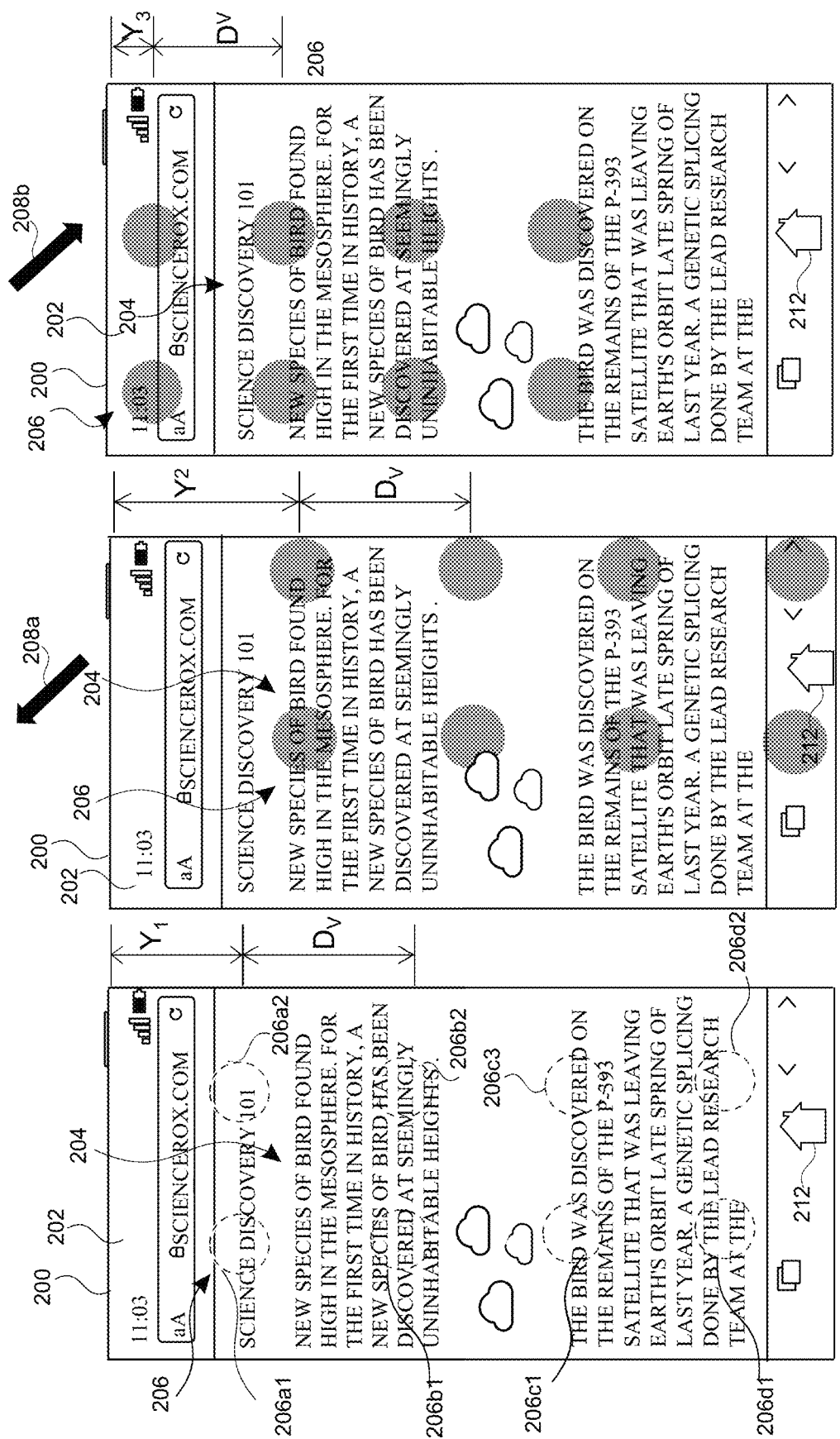

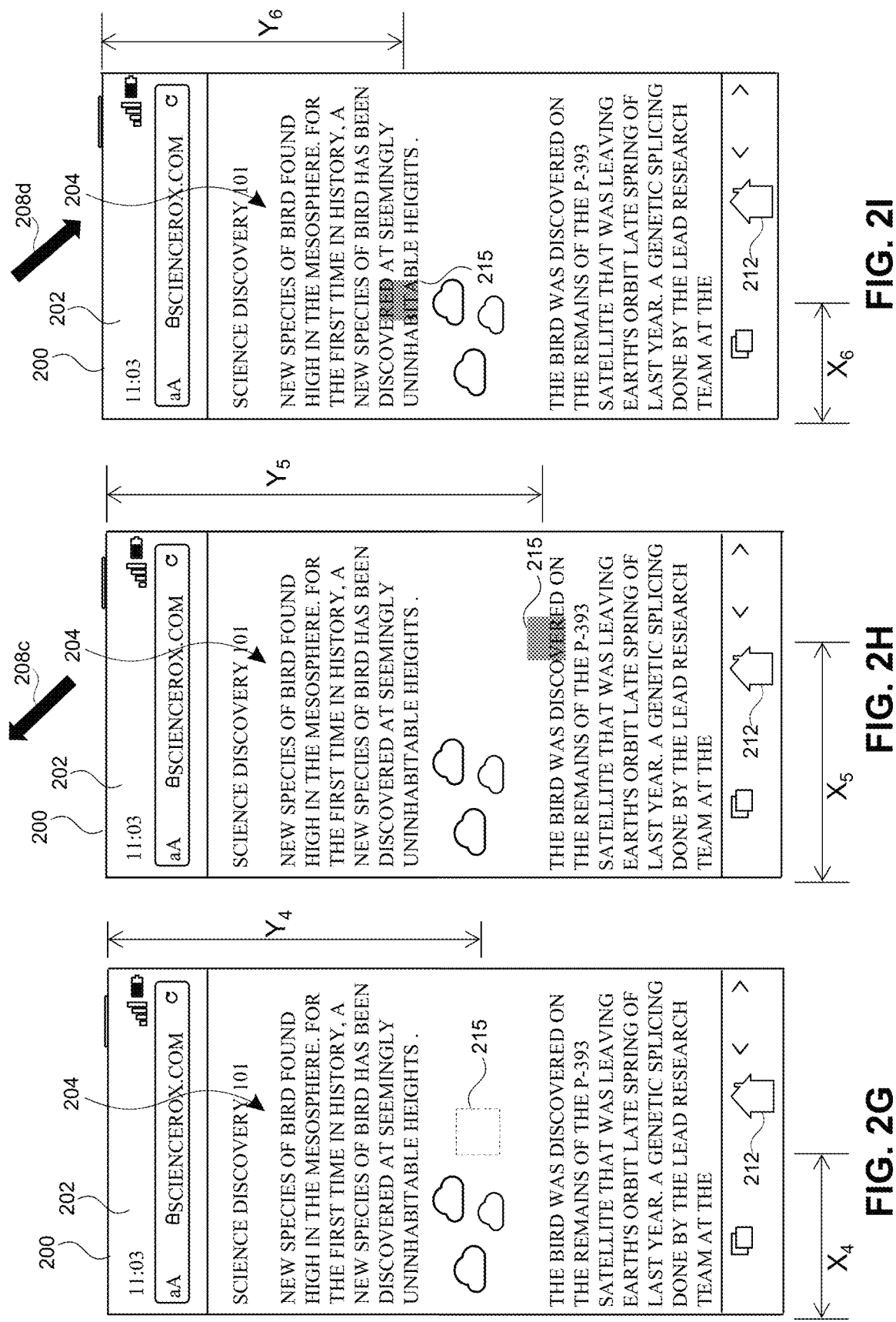

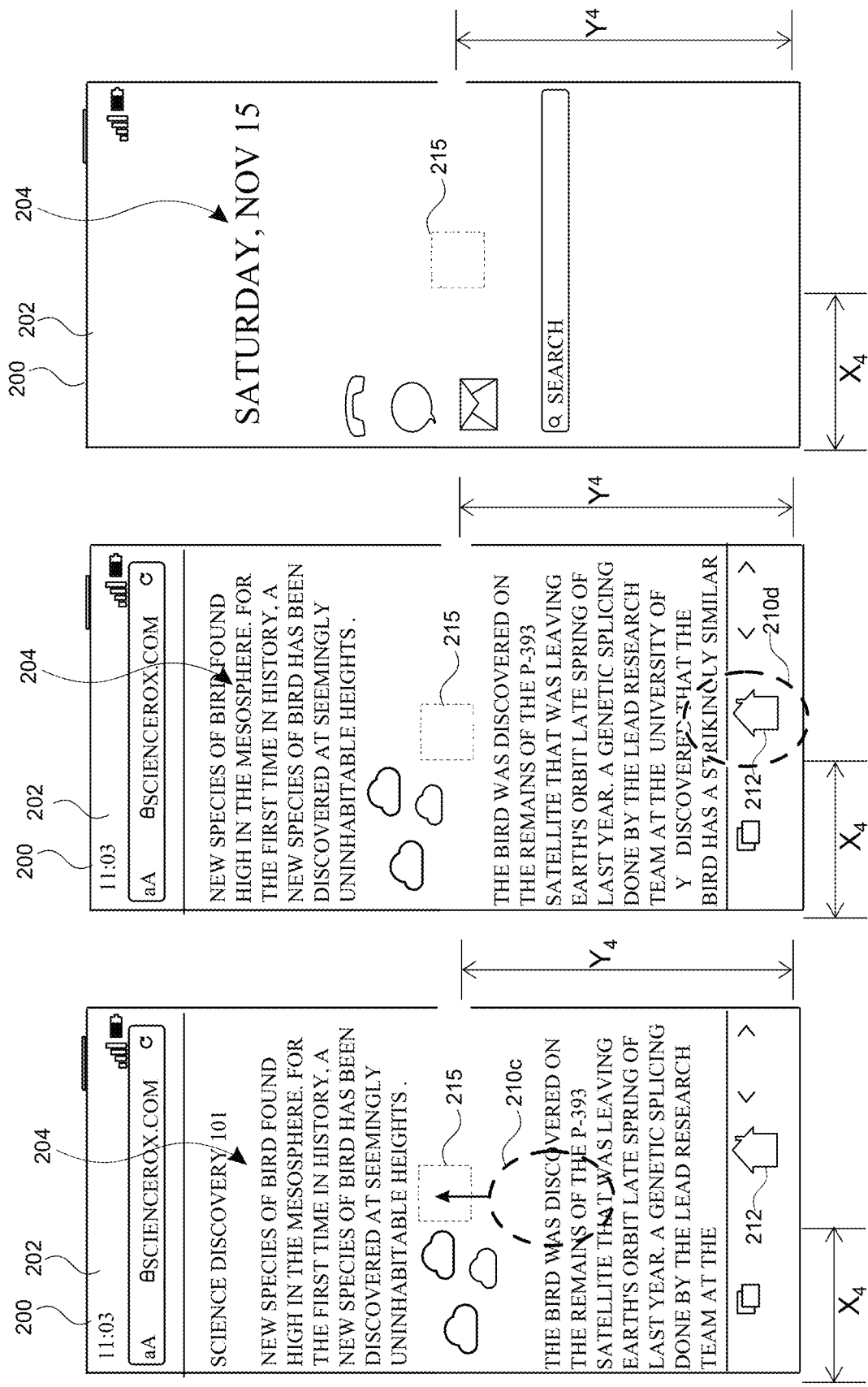

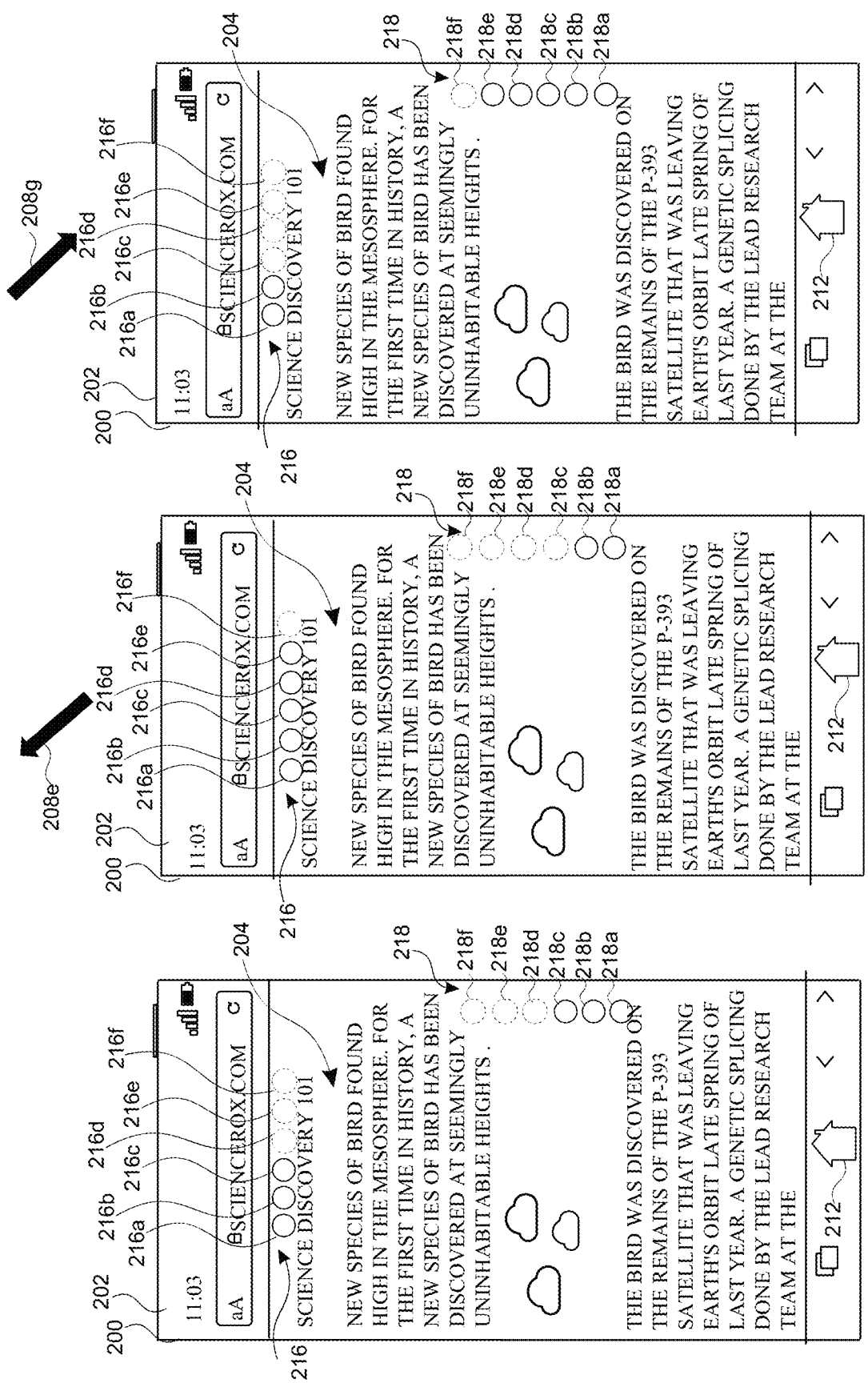

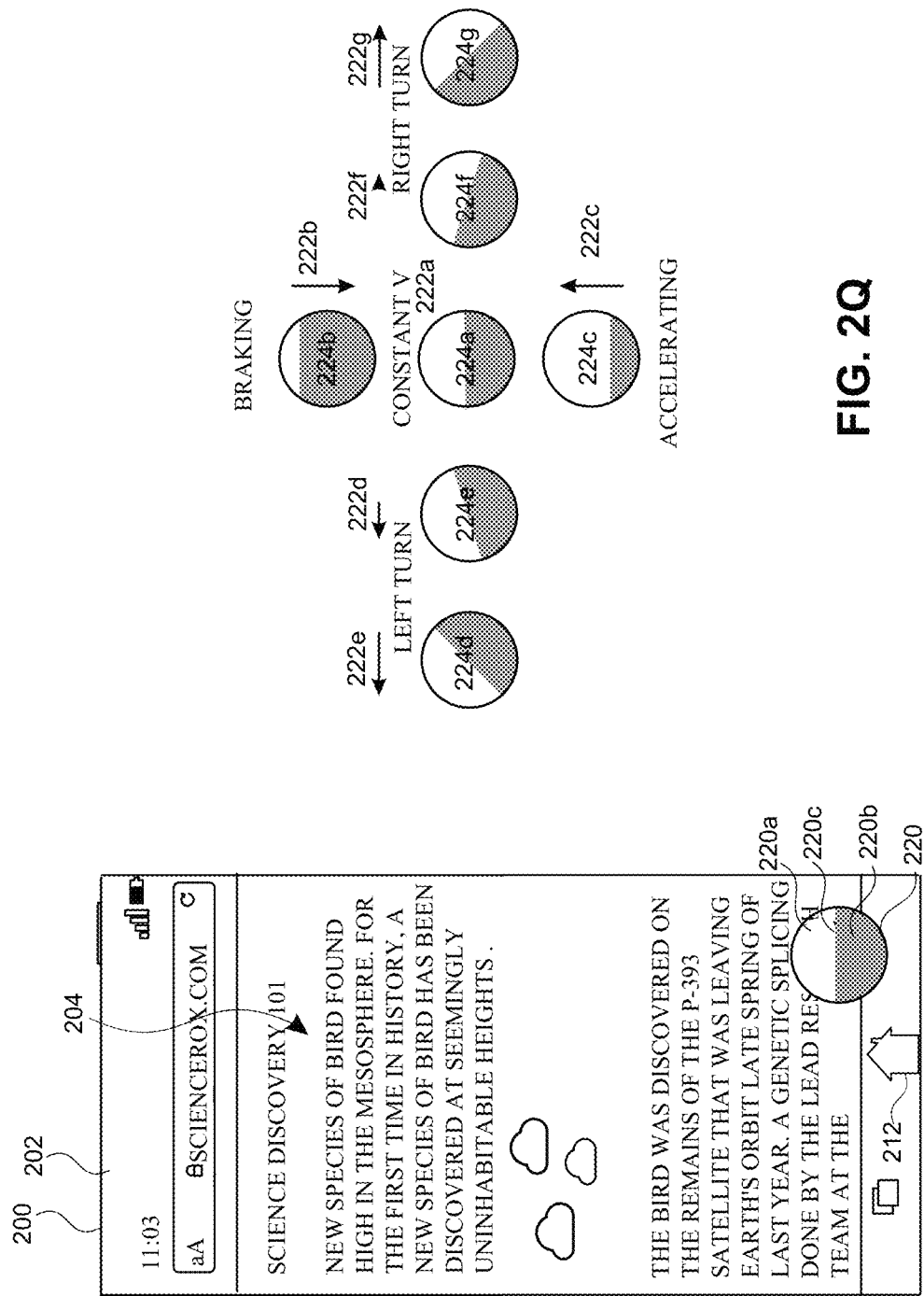

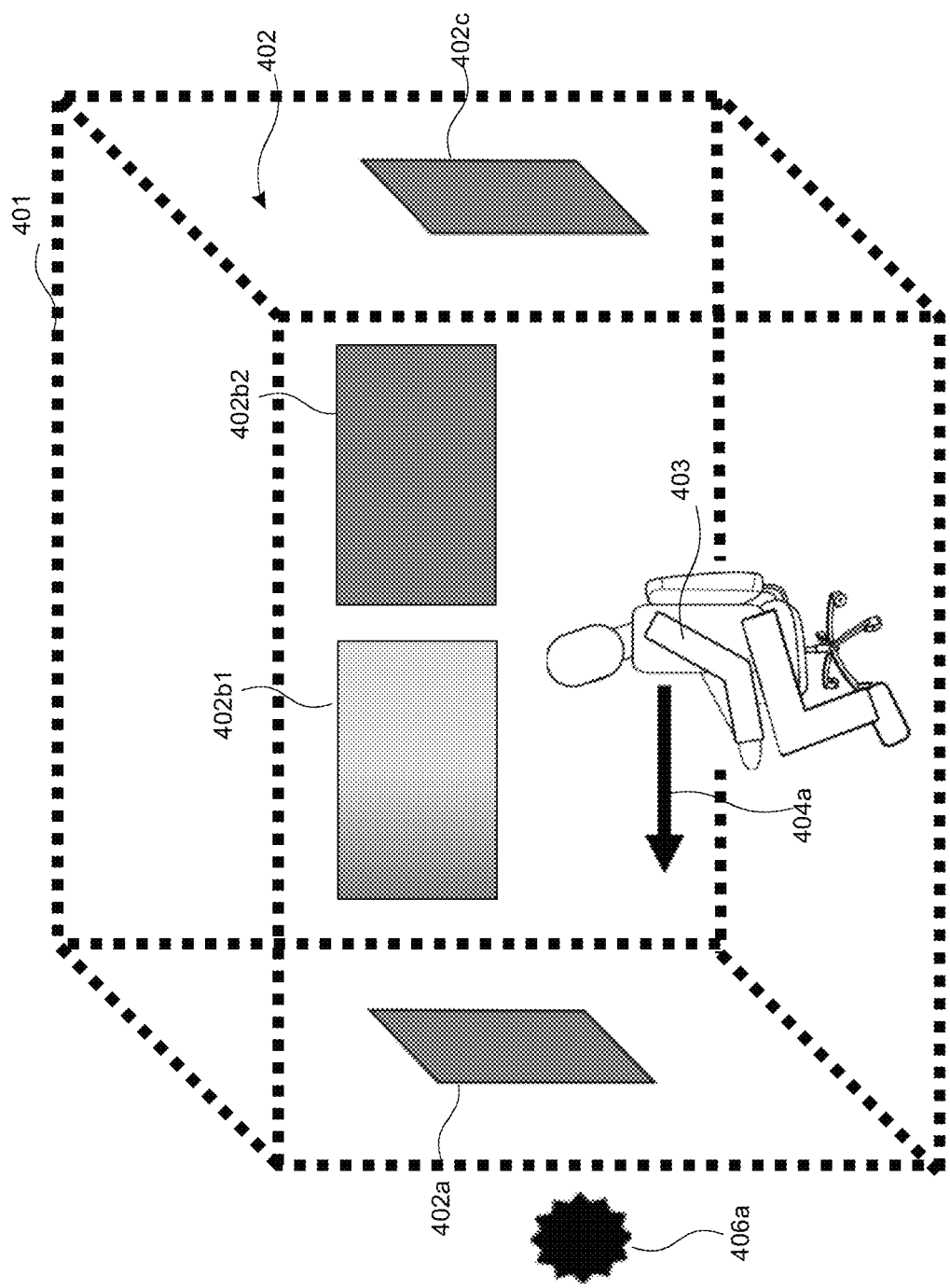

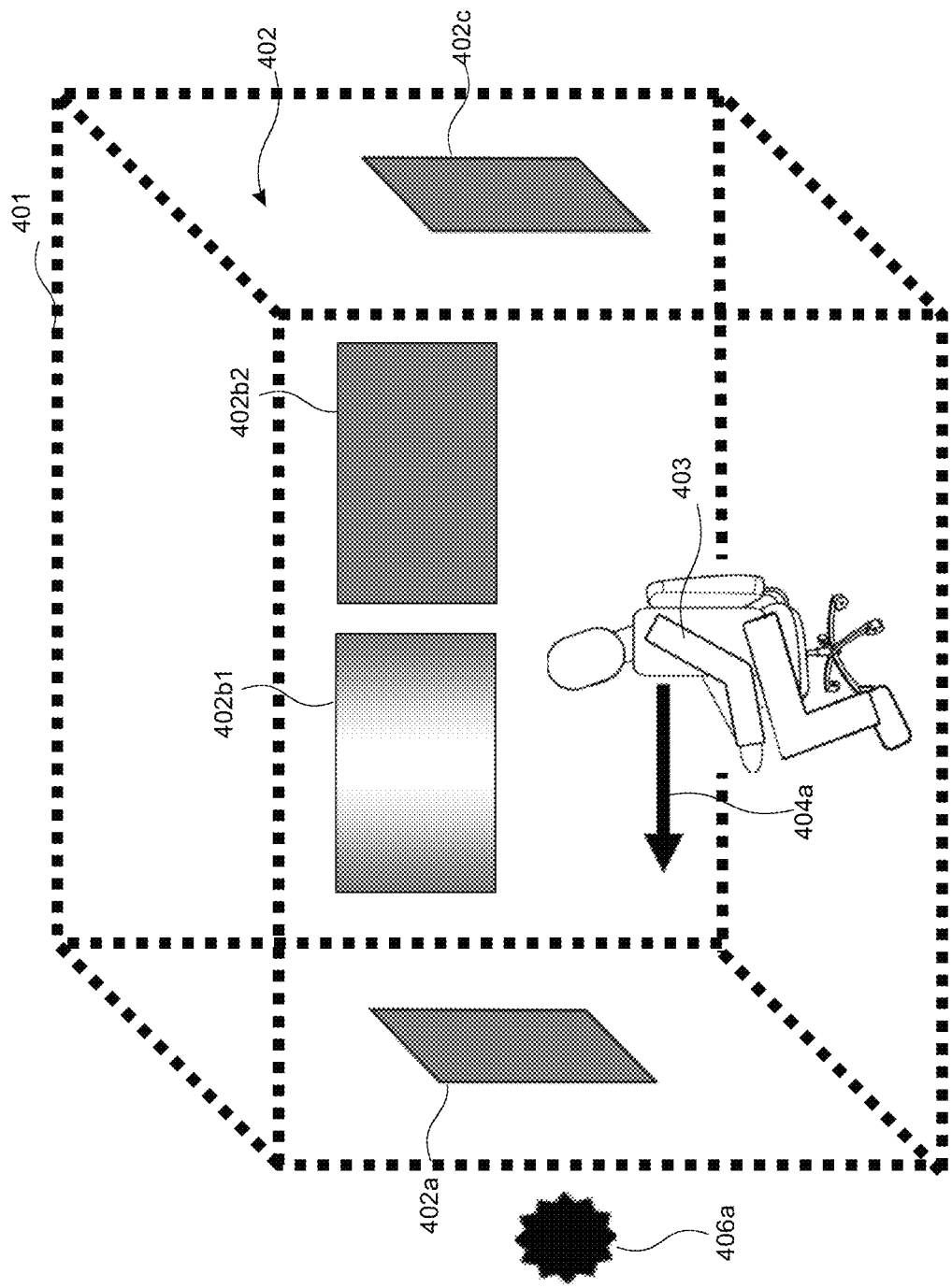
FIG. 4C2

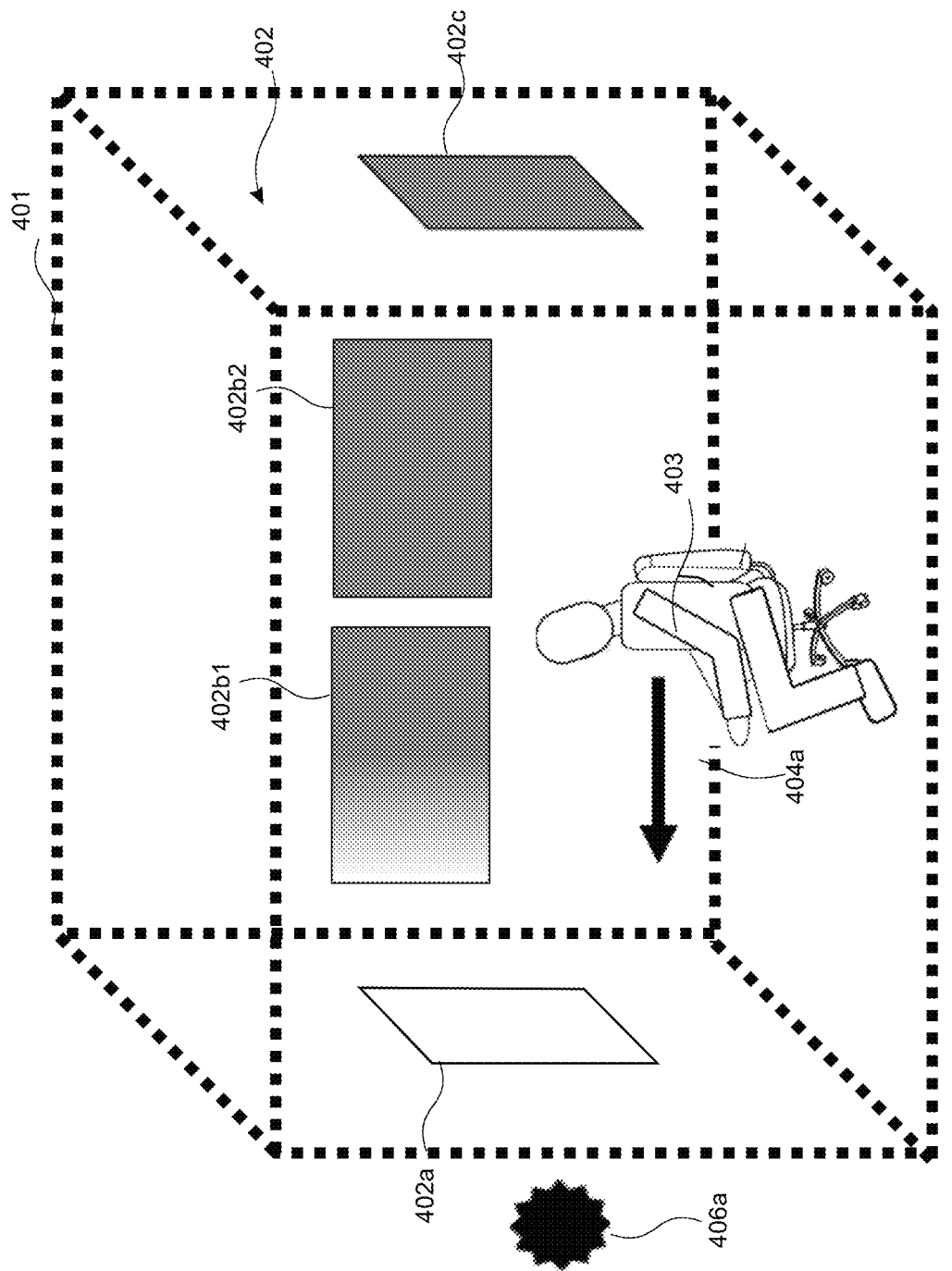

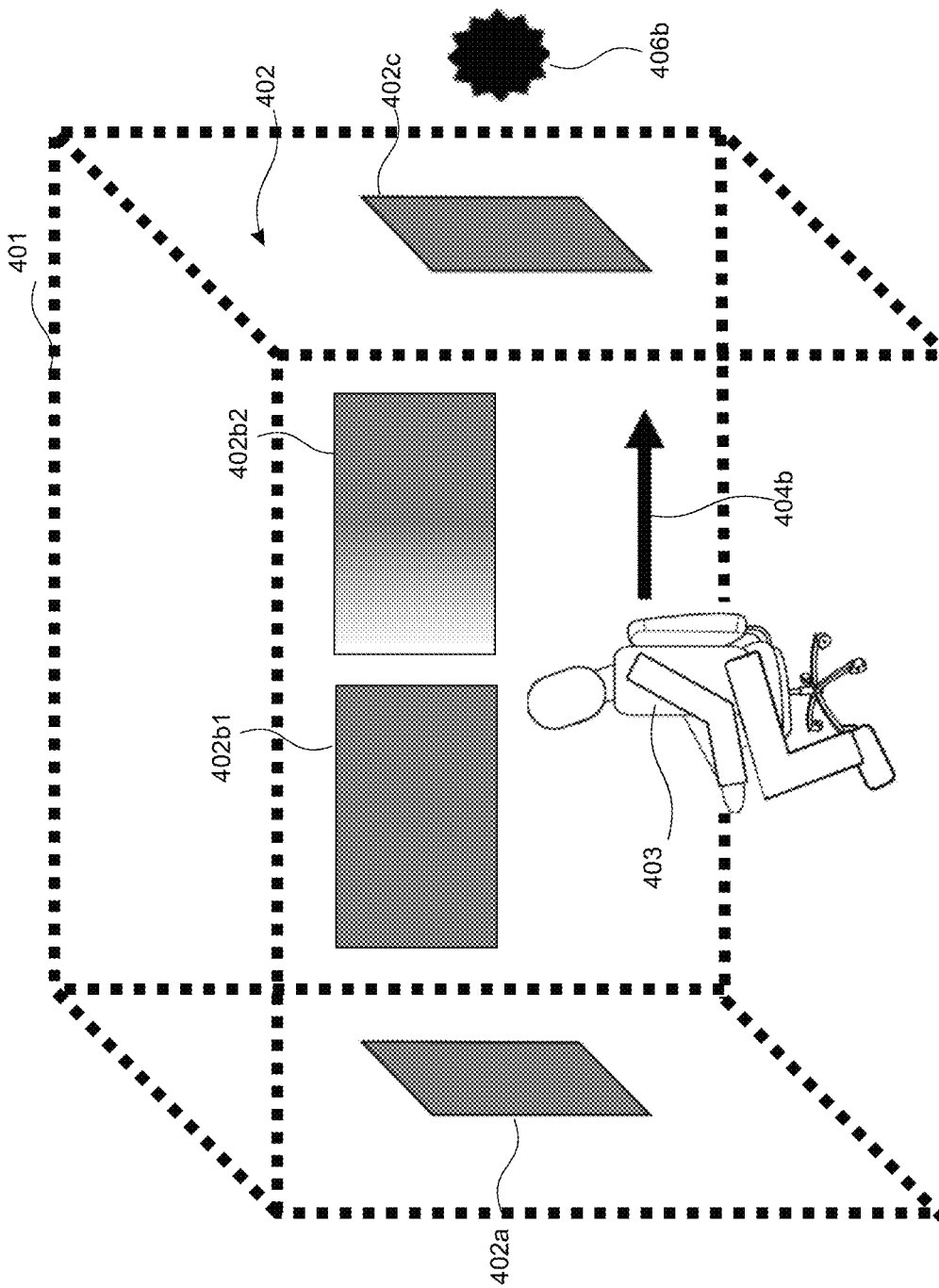
FIG. 4D1

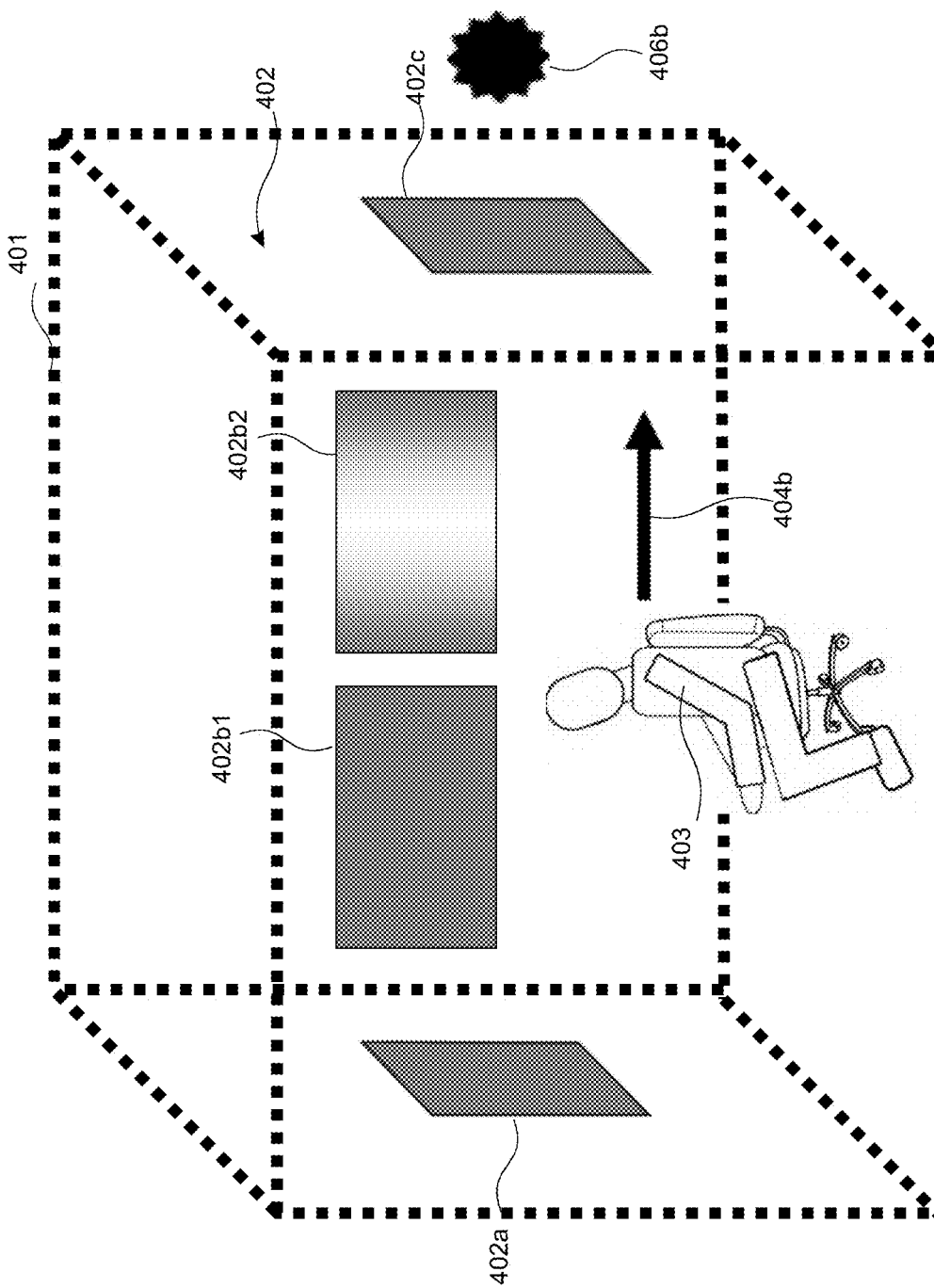
FIG. 4D2

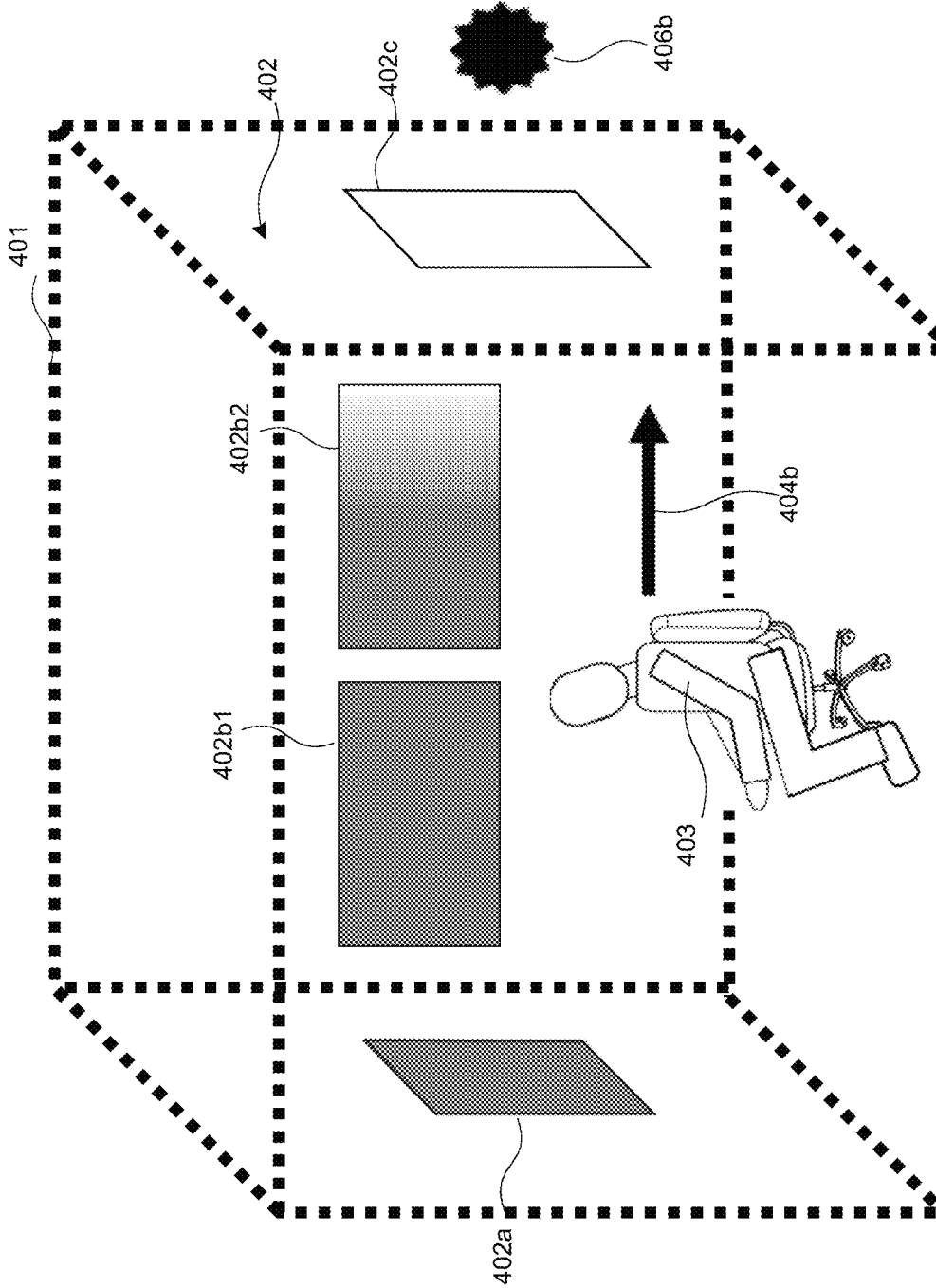
FIG. 4D3

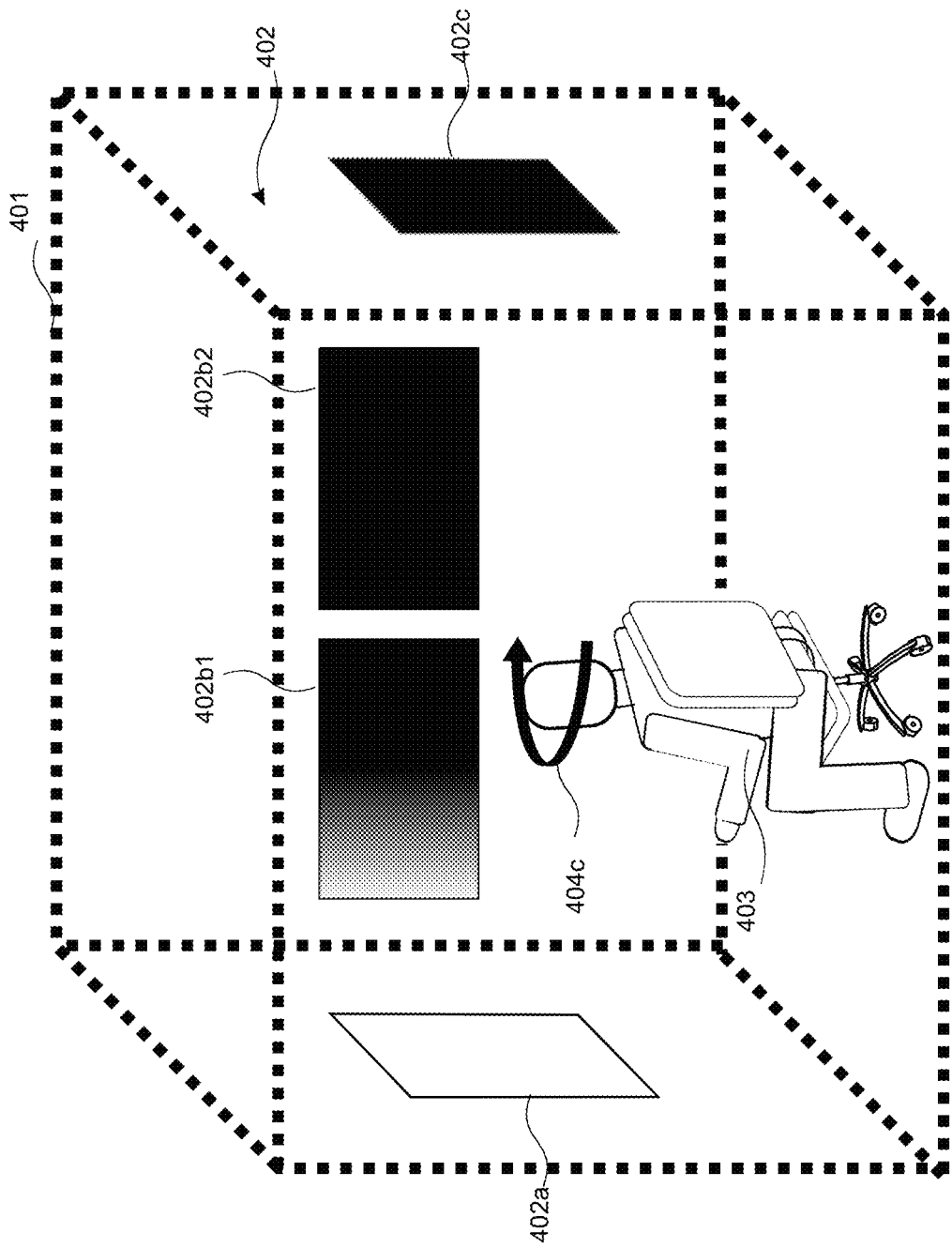
FIG. 4E1

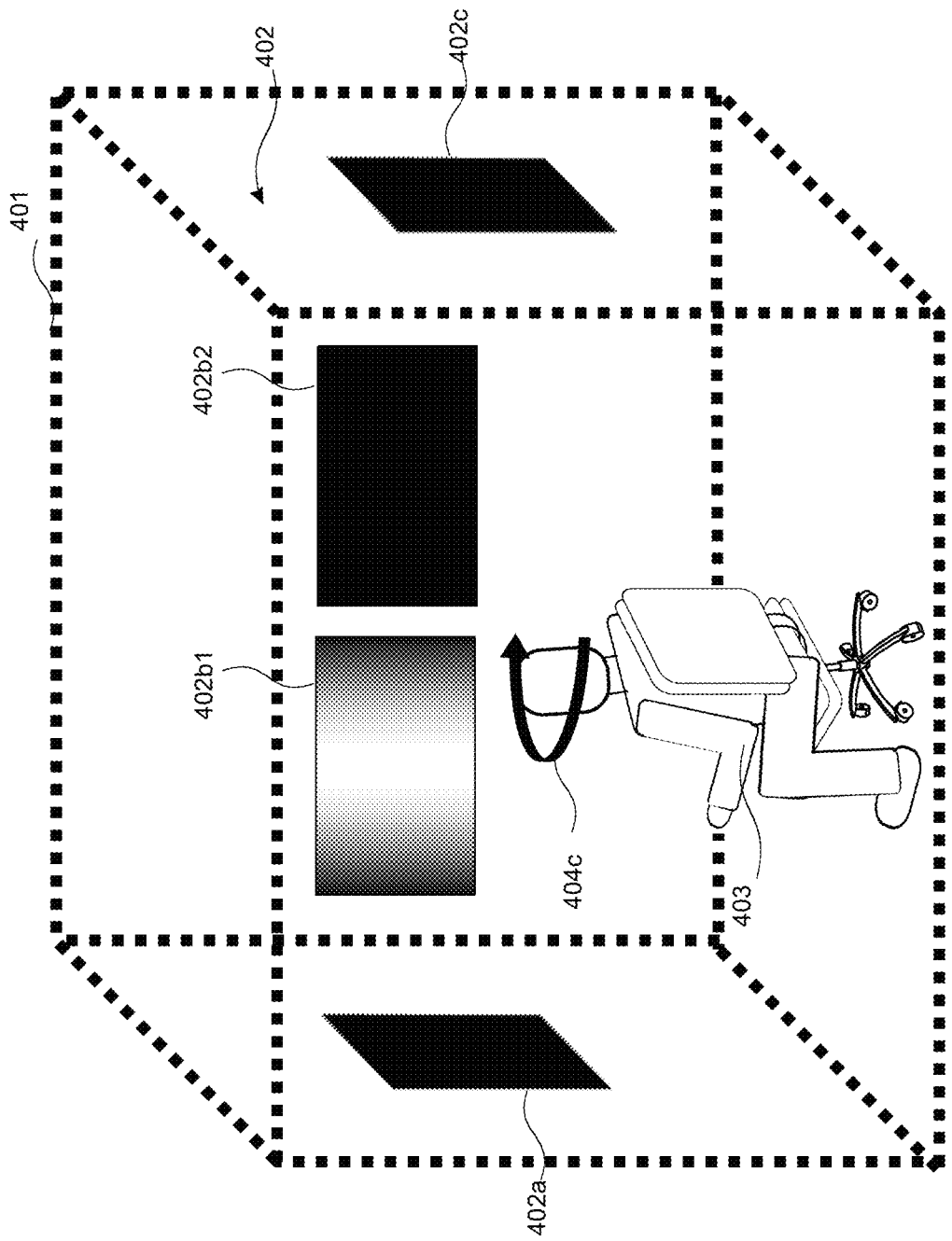
FIG. 4E2

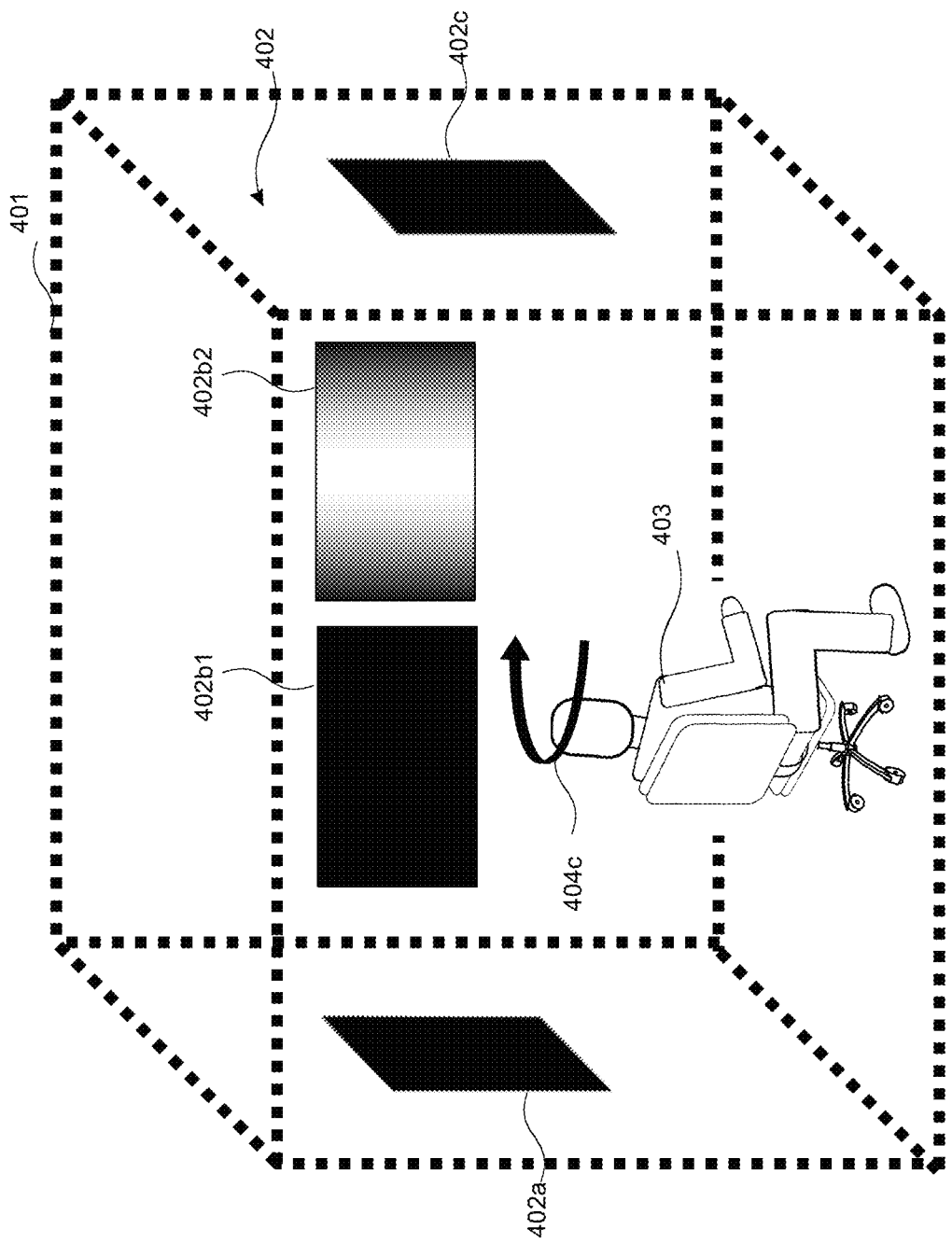
FIG. 4E3

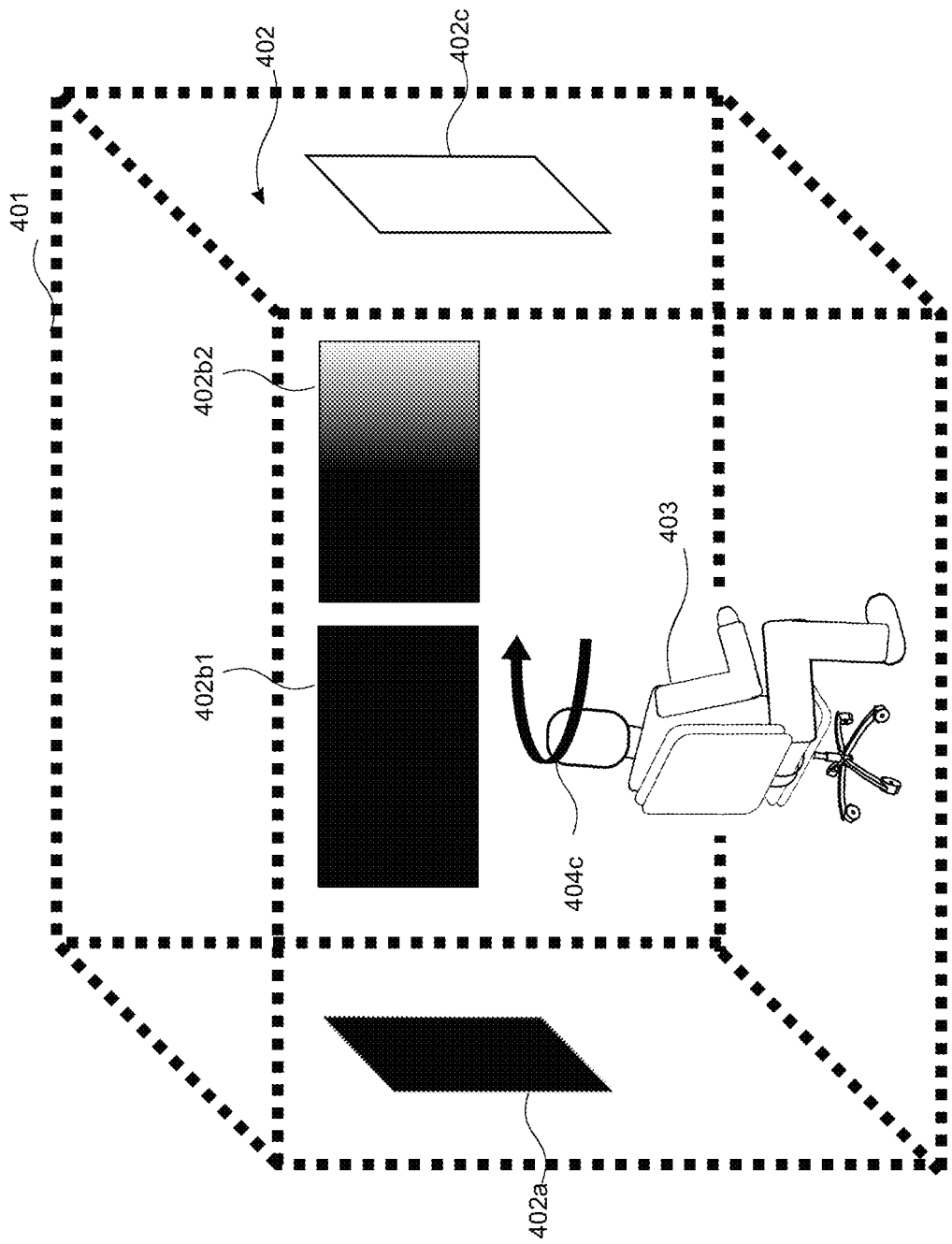
FIG. 4E4

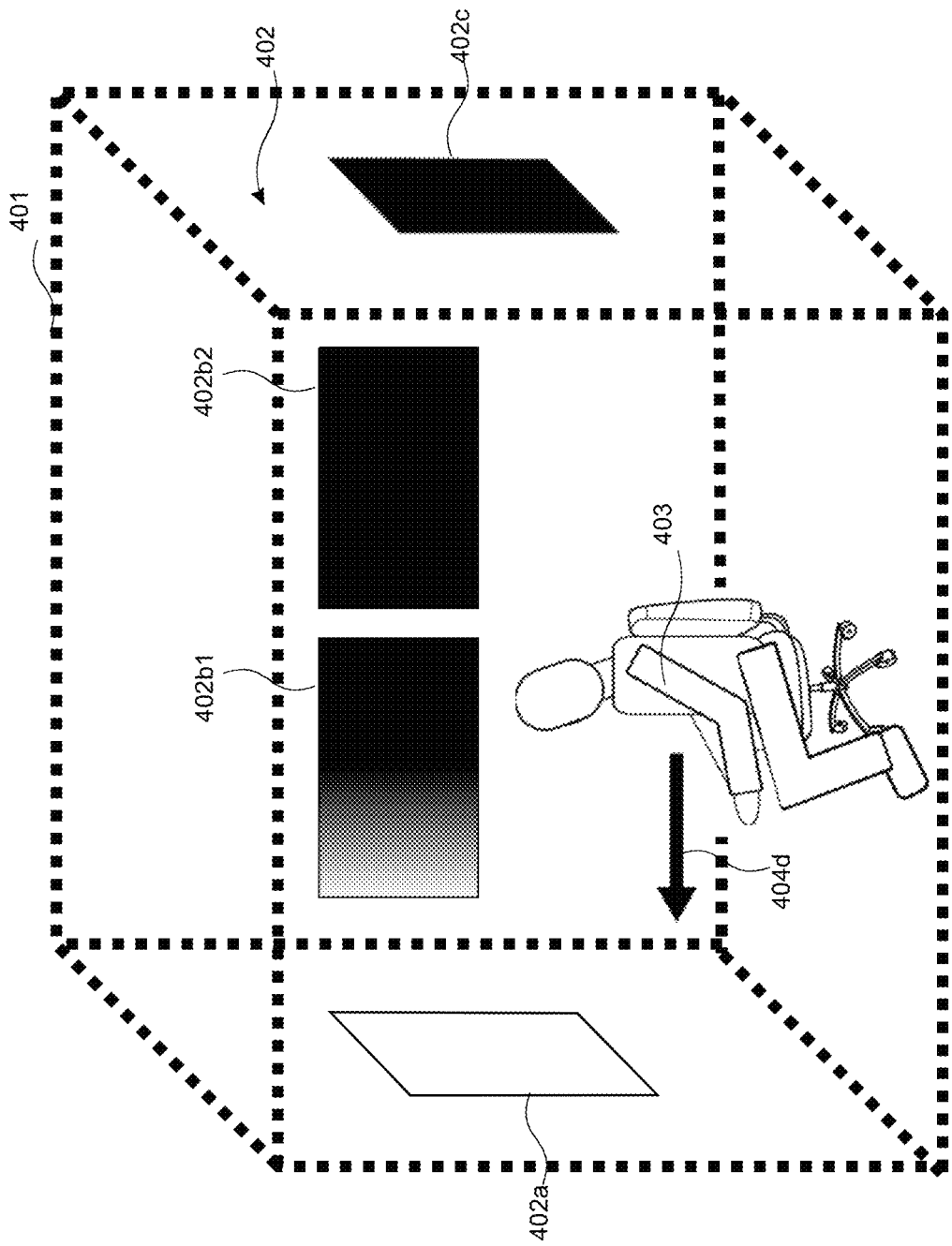
FIG. 4F1

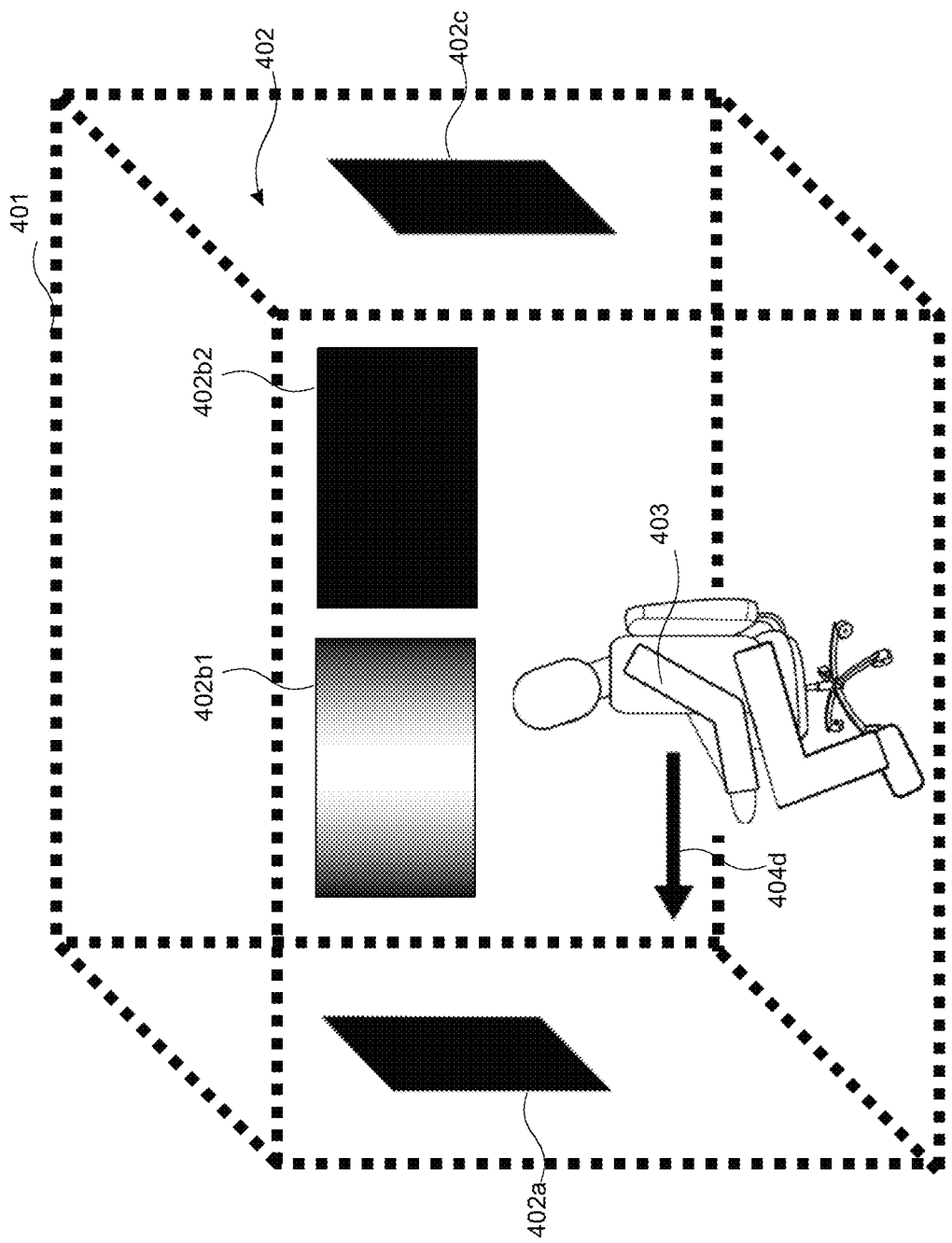
FIG. 4F2

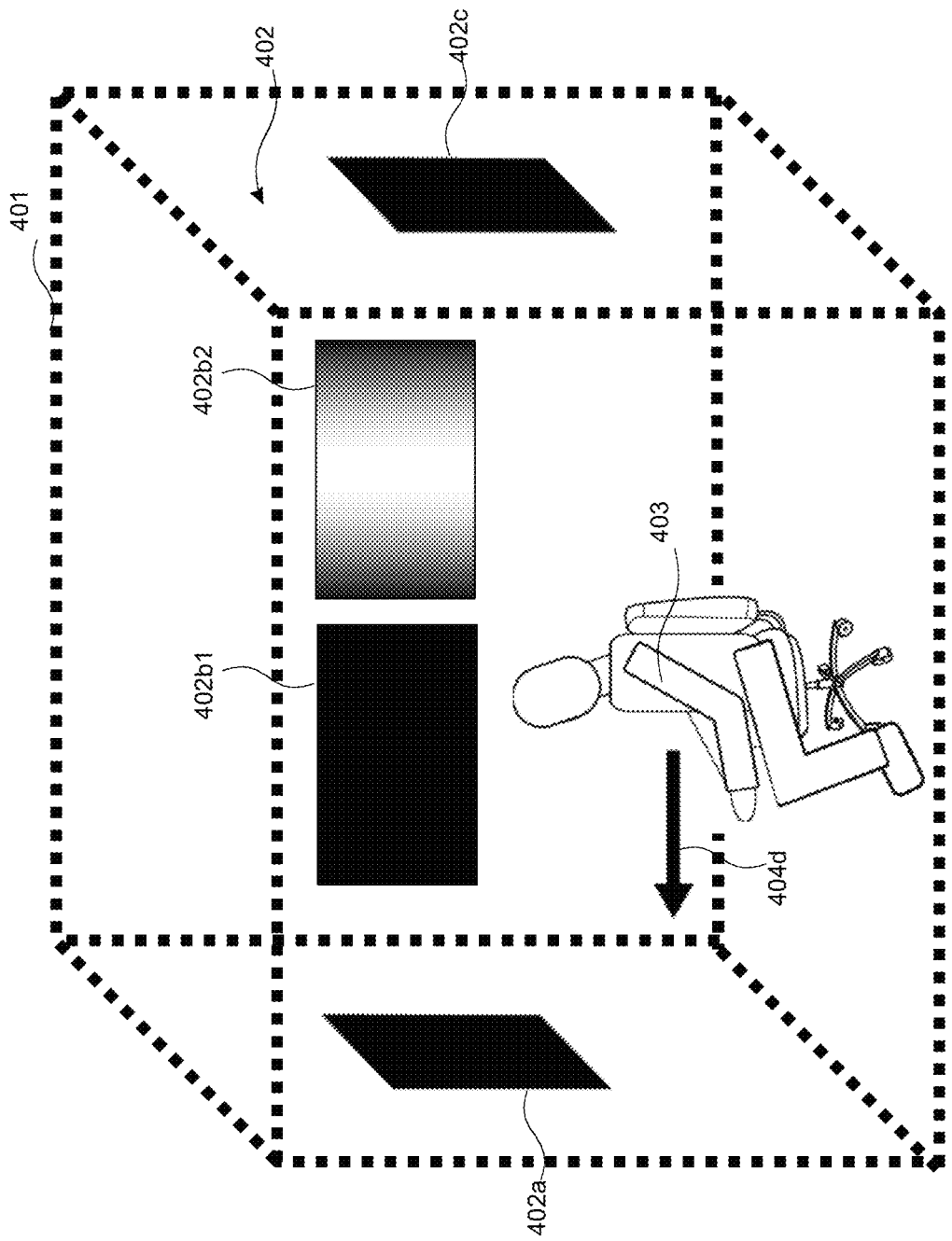
FIG. 4F3

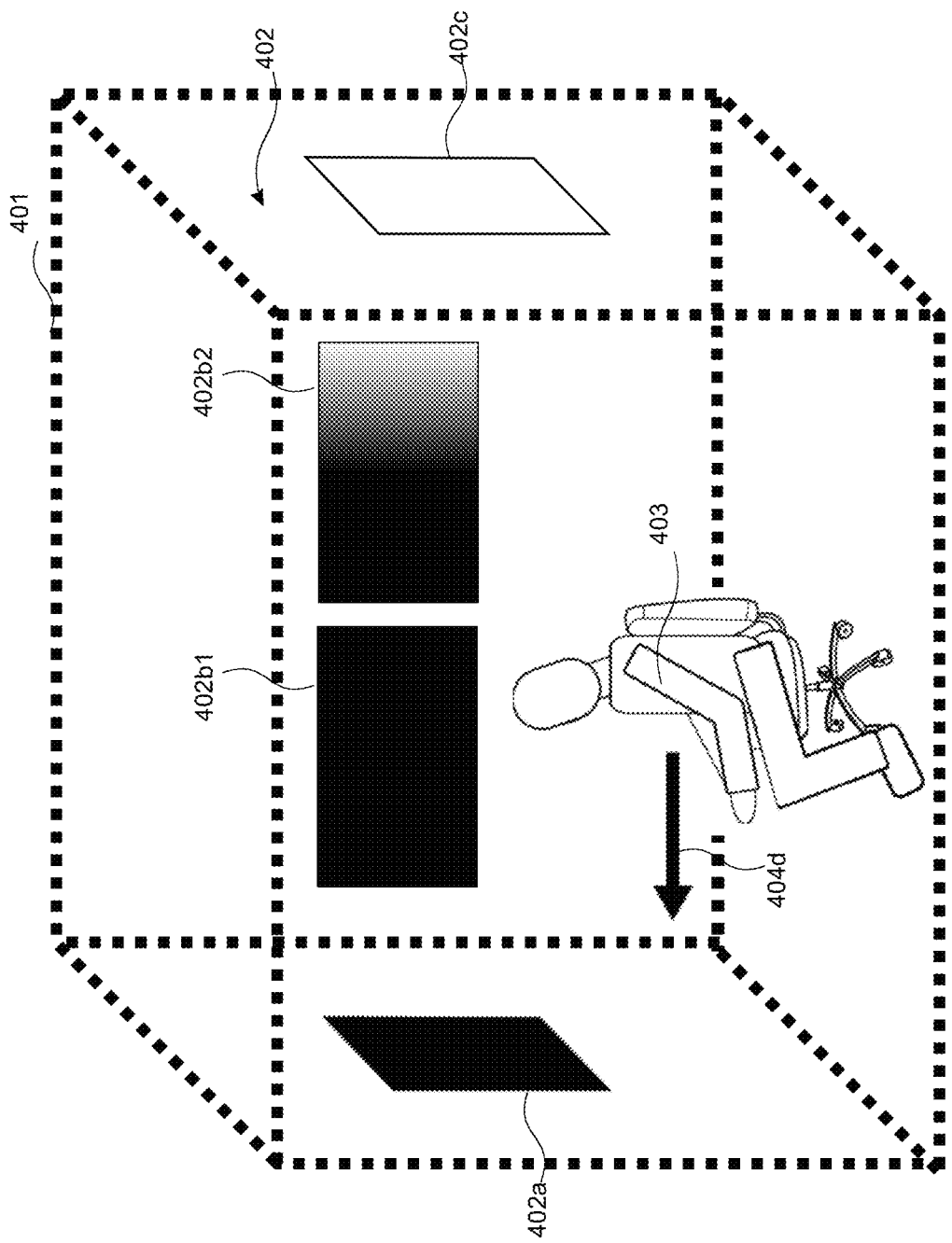
FIG. 4F4

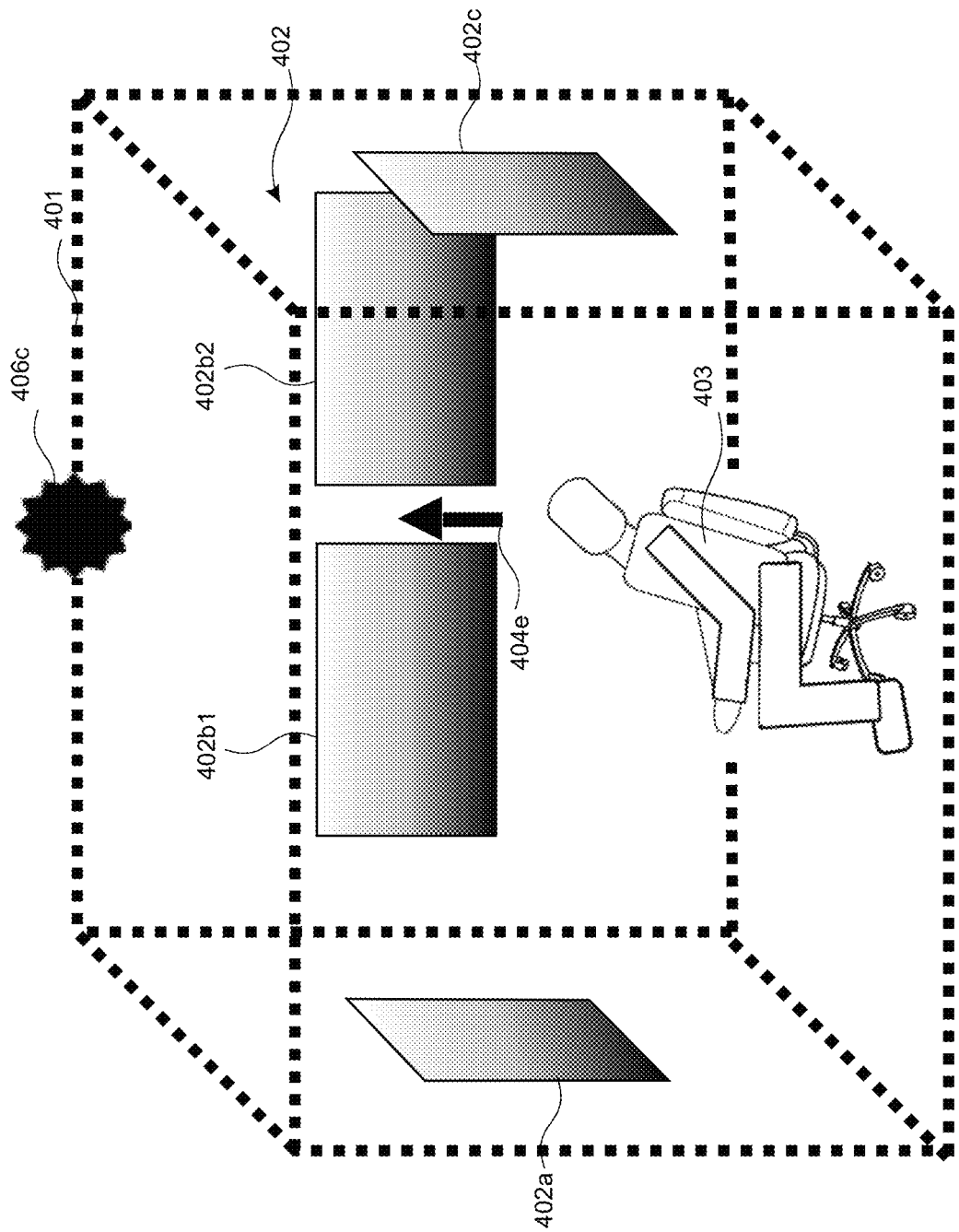

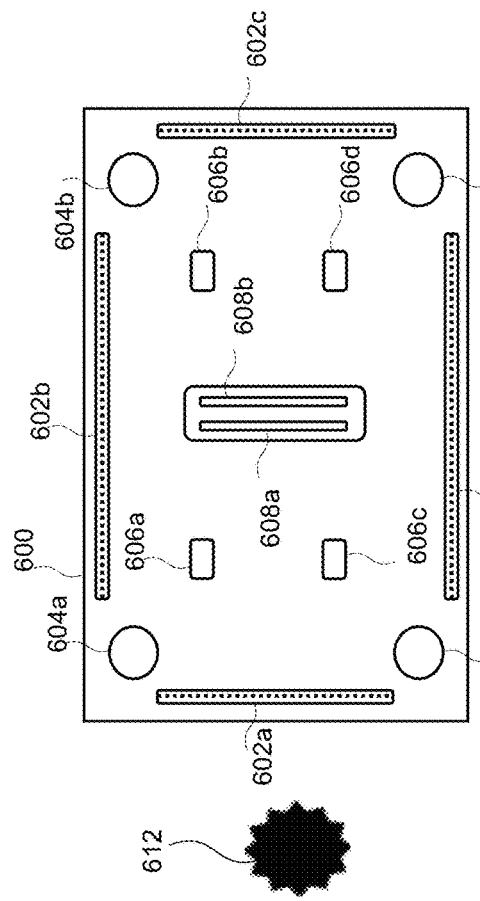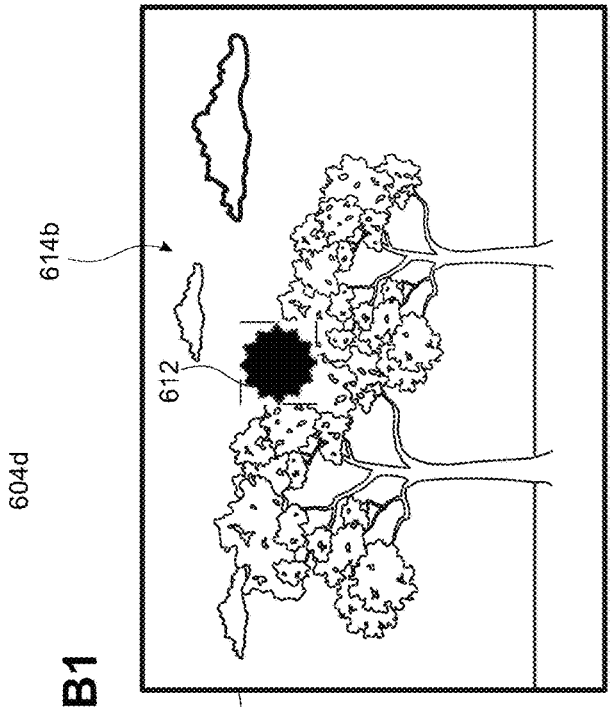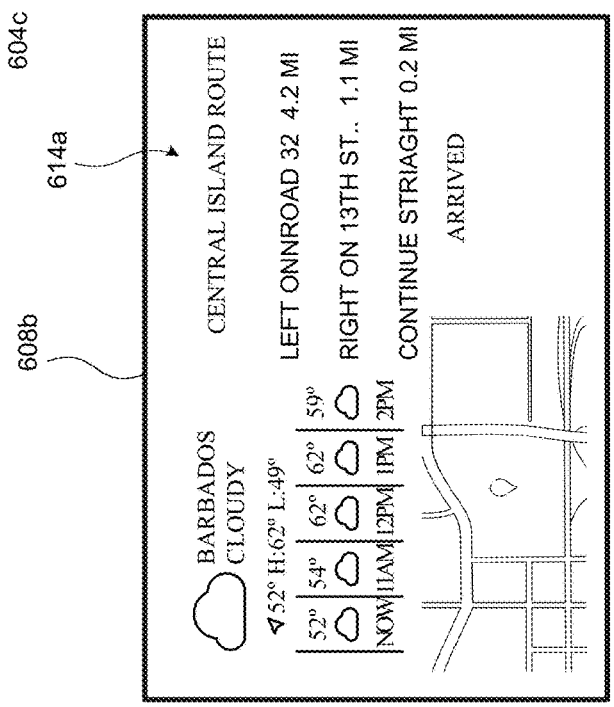

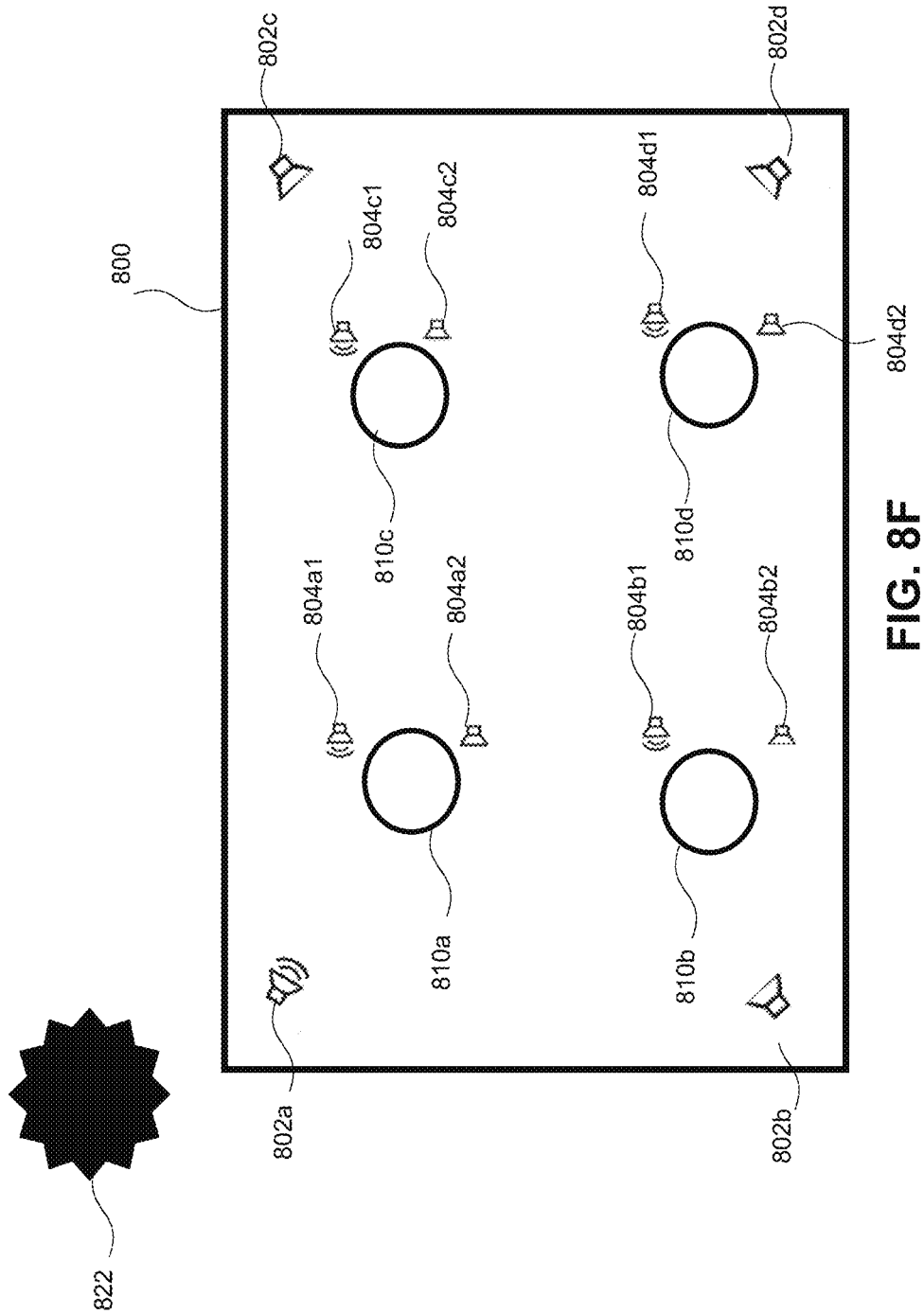

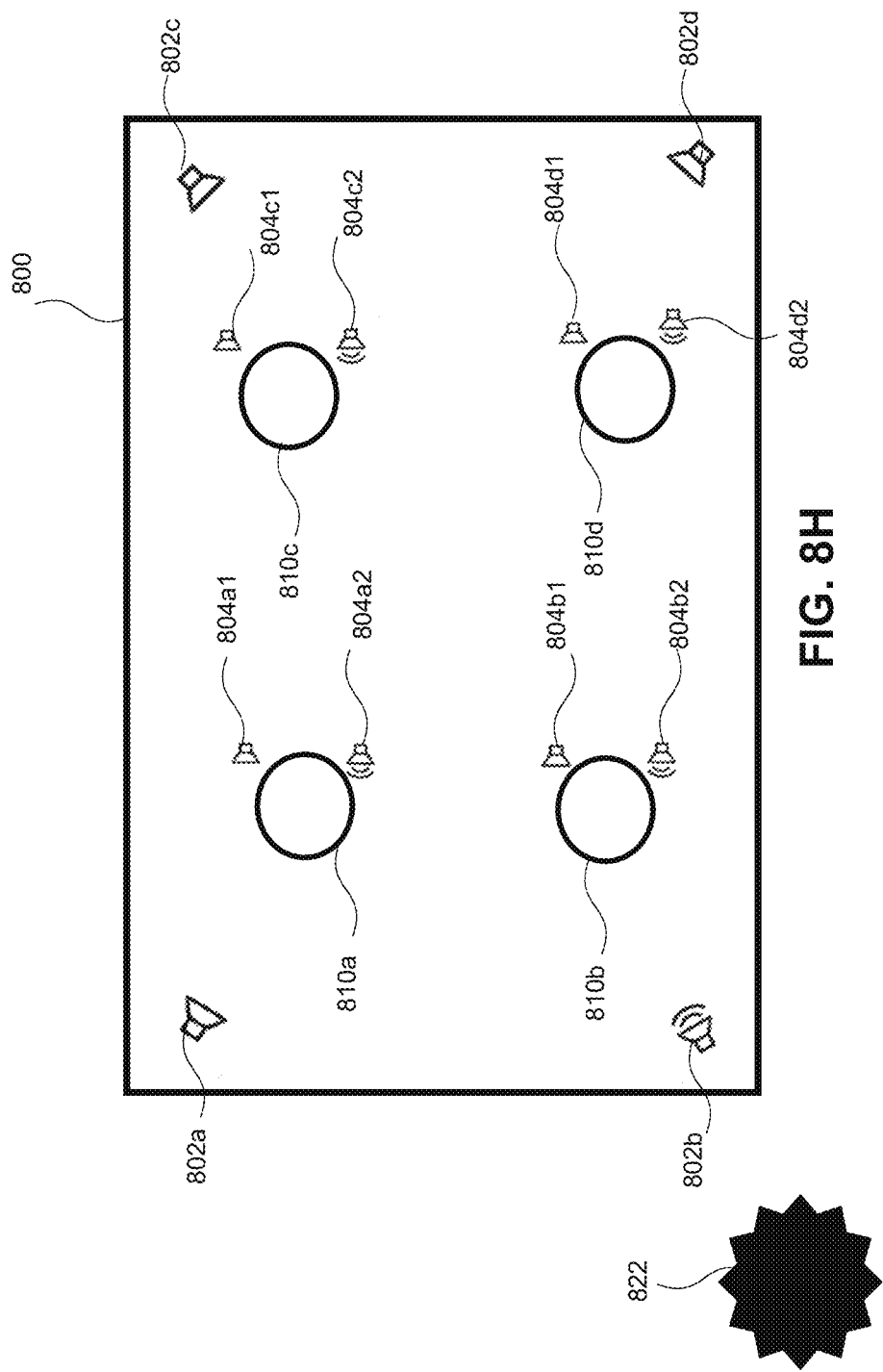

METHODS AND USER INTERFACES BASED ON MOTION

CROSS-REFERENCE TO RELATED APPLICATIONS

This application claims the benefit of priority of U.S. Provisional Patent Application Ser. No. 63/409,741, entitled "METHODS AND USER INTERFACES BASED ON MOTION," filed Sep. 24, 2022, the content of which is hereby incorporated by reference in its entirety.

BACKGROUND

Field

The present disclosure relates generally to techniques for providing effects based on various events, and more specifically to techniques for providing visual effects and/or sound effects based on events and/or motion associated with a user, an environment, and/or a platform.

Related Description

Various hardware exists for providing visual and sound effects, such as speakers, lights, and displays. Such hardware can be controlled and/or programmed to provide visual and sound effects under various circumstances.

BRIEF SUMMARY

In some embodiments, a method includes: displaying a dynamic graphical element in a first state and graphical content in a second state; and, while displaying the graphical content in the second state, displaying the graphical content in the second state and the dynamic graphical element in a third state, wherein the third state is different from the first state, and wherein the third state is based on detected motion.

In some embodiments, a computer-readable storage medium (e.g., a non-transitory computer-readable storage medium or a transitory computer-readable storage medium) stores one or more programs configured to be executed by one or more processors of a computer system. The one or more programs include instructions for: displaying a dynamic graphical element in a first state and graphical content in a second state; and, while displaying the graphical content in the second state, displaying the graphical content in the second state and the dynamic graphical element in a third state, wherein the third state is different from the first state, and wherein the third state is based on detected motion.

In some embodiments, a computer system includes one or more processors and memory storing one or more programs configured to be executed by the one or more processors. The one or more programs include instructions for: displaying a dynamic graphical element in a first state and graphical content in a second state; and, while displaying the graphical content in the second state, displaying the graphical content in the second state and the dynamic graphical element in a third state, wherein the third state is different from the first state, and wherein the third state is based on detected motion.

In some embodiments, a computer system includes: means for displaying a dynamic graphical element in a first state and graphical content in a second state; and means for, while displaying the graphical content in the second state, displaying the graphical content in the second state and the dynamic graphical element in a third state, wherein the third state is different from the first state, and wherein the third state is based on detected motion.

In some embodiments, a computer program product includes one or more programs configured to be executed by one or more processors of a computer system. The one or more programs include instructions for: displaying a dynamic graphical element in a first state and graphical content in a second state; and, while displaying the graphical content in the second state, displaying the graphical content in the second state and the dynamic graphical element in a third state, wherein the third state is different from the first state, and wherein the third state is based on detected motion.

In some embodiments, a method includes: causing a set of one or more windows of a vehicle to have a first tint state; obtaining data associated with motion of the vehicle; and after obtaining the data associated with the motion of the vehicle, causing the set of one or more windows to have a second tint state that is different from the first tint state, wherein the second tint state is based on the motion of the vehicle.

In some embodiments, a computer-readable storage medium (e.g., a non-transitory computer-readable storage medium or a transitory computer-readable storage medium) stores one or more programs configured to be executed by one or more processors of a computer system. The one or more programs include instructions for: causing a set of one or more windows of a vehicle to have a first tint state; obtaining data associated with motion of the vehicle; and after obtaining the data associated with the motion of the vehicle, causing the set of one or more windows to have a second tint state that is different from the first tint state, wherein the second tint state is based on the motion of the vehicle.

In some embodiments, a computer system includes one or more processors and memory storing one or more programs configured to be executed by the one or more processors. The one or more programs include instructions for: causing a set of one or more windows of a vehicle to have a first tint state; obtaining data associated with motion of the vehicle; and after obtaining the data associated with the motion of the vehicle, causing the set of one or more windows to have a second tint state that is different from the first tint state, wherein the second tint state is based on the motion of the vehicle.

In some embodiments, a computer system includes: means for causing a set of one or more windows of a vehicle to have a first tint state; means for obtaining data associated with motion of the vehicle; and means for, after obtaining the data associated with the motion of the vehicle, causing the set of one or more windows to have a second tint state that is different from the first tint state, wherein the second tint state is based on the motion of the vehicle.

In some embodiments, a computer program product includes one or more programs configured to be executed by one or more processors of a computer system. The one or more programs include instructions for: causing a set of one or more windows of a vehicle to have a first tint state; obtaining data associated with motion of the vehicle; and after obtaining the data associated with the motion of the vehicle, causing the set of one or more windows to have a second tint state that is different from the first tint state, wherein the second tint state is based on the motion of the vehicle.

In some embodiments, a method includes: causing a set of one or more visual output elements of a vehicle to have a first visual state; obtaining data associated with motion of the vehicle; and after obtaining the data associated with the motion of the vehicle, causing the set of one or more visual output elements to have a second visual state that is different from the first visual state, wherein the second visual state is based on the motion of the vehicle.

In some embodiments, a computer-readable storage medium (e.g., a non-transitory computer-readable storage medium or a transitory computer-readable storage medium) stores one or more programs configured to be executed by one or more processors of a computer system. The one or more programs include instructions for: causing a set of one or more visual output elements of a vehicle to have a first visual state; obtaining data associated with motion of the vehicle; and after obtaining the data associated with the motion of the vehicle, causing the set of one or more visual output elements to have a second visual state that is different from the first visual state, wherein the second visual state is based on the motion of the vehicle.

In some embodiments, a computer system includes one or more processors and memory storing one or more programs configured to be executed by the one or more processors. The one or more programs include instructions for: causing a set of one or more visual output elements of a vehicle to have a first visual state; obtaining data associated with motion of the vehicle; and after obtaining the data associated with the motion of the vehicle, causing the set of one or more visual output elements to have a second visual state that is different from the first visual state, wherein the second visual state is based on the motion of the vehicle.

In some embodiments, a computer system includes: means for causing a set of one or more visual output elements of a vehicle to have a first visual state; means for obtaining data associated with motion of the vehicle; and means for, after obtaining the data associated with the motion of the vehicle, causing the set of one or more visual output elements to have a second visual state that is different from the first visual state, wherein the second visual state is based on the motion of the vehicle.

In some embodiments, a computer program product includes one or more programs configured to be executed by one or more processors of a computer system. The one or more programs include instructions for: causing a set of one or more visual output elements of a vehicle to have a first visual state; obtaining data associated with motion of the vehicle; and after obtaining the data associated with the motion of the vehicle, causing the set of one or more visual output elements to have a second visual state that is different from the first visual state, wherein the second visual state is based on the motion of the vehicle.

In some embodiments, a method includes: causing a set of two or more light sources in an interior of a vehicle to have a first lighting state, wherein the set of two or more light sources includes a first light source and a second light source, and wherein the first light source and the second light source are independently controllable; obtaining data associated with motion of the vehicle; and after obtaining the data associated with motion of the vehicle, causing the set of two or more light sources to have a second lighting state that is based on the data associated with motion of the vehicle and that is different from the first lighting state, including causing the first light source to produce a first light output based on the data associated with motion of the vehicle and causing the second light source to produce a second light output based on the data associated with motion of the vehicle.

In some embodiments, a computer-readable storage medium (e.g., a non-transitory computer-readable storage medium or a transitory computer-readable storage medium) stores one or more programs configured to be executed by one or more processors of a computer system. The one or more programs include instructions for: causing a set of two or more light sources in an interior of a vehicle to have a first lighting state, wherein the set of two or more light sources includes a first light source and a second light source, and wherein the first light source and the second light source are independently controllable; obtaining data associated with motion of the vehicle; and after obtaining the data associated with motion of the vehicle, causing the set of two or more light sources to have a second lighting state that is based on the data associated with motion of the vehicle and that is different from the first lighting state, including causing the first light source to produce a first light output based on the data associated with motion of the vehicle and causing the second light source to produce a second light output based on the data associated with motion of the vehicle.

In some embodiments, a computer system includes one or more processors and memory storing one or more programs configured to be executed by the one or more processors. The one or more programs include instructions for: causing a set of two or more light sources in an interior of a vehicle to have a first lighting state, wherein the set of two or more light sources includes a first light source and a second light source, and wherein the first light source and the second light source are independently controllable; obtaining data associated with motion of the vehicle; and after obtaining the data associated with motion of the vehicle, causing the set of two or more light sources to have a second lighting state that is based on the data associated with motion of the vehicle and that is different from the first lighting state, including causing the first light source to produce a first light output based on the data associated with motion of the vehicle and causing the second light source to produce a second light output based on the data associated with motion of the vehicle.

In some embodiments, a computer system includes: means for causing a set of two or more light sources in an interior of a vehicle to have a first lighting state, wherein the set of two or more light sources includes a first light source and a second light source, and wherein the first light source and the second light source are independently controllable; means for obtaining data associated with motion of the vehicle; and means for, after obtaining the data associated with motion of the vehicle, causing the set of two or more light sources to have a second lighting state that is based on the data associated with motion of the vehicle and that is different from the first lighting state, including causing the first light source to produce a first light output based on the data associated with motion of the vehicle and causing the second light source to produce a second light output based on the data associated with motion of the vehicle.

In some embodiments, a computer program product includes one or more programs configured to be executed by one or more processors of a computer system. The one or more programs include instructions for: causing a set of two or more light sources in an interior of a vehicle to have a first lighting state, wherein the set of two or more light sources includes a first light source and a second light source, and wherein the first light source and the second light source are independently controllable; obtaining data associated with motion of the vehicle; and after obtaining the data associated with motion of the vehicle, causing the set of two or more light sources to have a second lighting state that is based on the data associated with motion of the vehicle and that is different from the first lighting state, including causing the first light source to produce a first light output based on the data associated with motion of the vehicle and causing the second light source to produce a second light output based on the data associated with motion of the vehicle.

In some embodiments, a method includes: causing a set of one or more audio output elements of a vehicle to have a first audio output state; obtaining data associated with motion of the vehicle; and after receiving the data associated with motion of the vehicle, causing the set of one or more audio output elements to have a second audio output state that is different from the first audio output state, wherein the second audio output state is based on the motion of the vehicle.

In some embodiments, a computer-readable storage medium (e.g., a non-transitory computer-readable storage medium or a transitory computer-readable storage medium) stores one or more programs configured to be executed by one or more processors of a computer system. The one or more programs include instructions for: causing a set of one or more audio output elements of a vehicle to have a first audio output state; obtaining data associated with motion of the vehicle; and after receiving the data associated with motion of the vehicle, causing the set of one or more audio output elements to have a second audio output state that is different from the first audio output state, wherein the second audio output state is based on the motion of the vehicle.

In some embodiments, a computer system includes one or more processors and memory storing one or more programs configured to be executed by the one or more processors. The one or more programs include instructions for: causing a set of one or more audio output elements of a vehicle to have a first audio output state; obtaining data associated with motion of the vehicle; and after receiving the data associated with motion of the vehicle, causing the set of one or more audio output elements to have a second audio output state that is different from the first audio output state, wherein the second audio output state is based on the motion of the vehicle.

In some embodiments, a computer system includes: means for causing a set of one or more audio output elements of a vehicle to have a first audio output state; means for obtaining data associated with motion of the vehicle; and means for, after receiving the data associated with motion of the vehicle, causing the set of one or more audio output elements to have a second audio output state that is different from the first audio output state, wherein the second audio output state is based on the motion of the vehicle.

In some embodiments, a computer program product includes one or more programs configured to be executed by one or more processors of a computer system. The one or more programs include instructions for: causing a set of one or more audio output elements of a vehicle to have a first audio output state; obtaining data associated with motion of the vehicle; and after receiving the data associated with motion of the vehicle, causing the set of one or more audio output elements to have a second audio output state that is different from the first audio output state, wherein the second audio output state is based on the motion of the vehicle.

In some embodiments, a method includes: causing a set of two or more audio output elements in an interior of a vehicle to have a first audio output state, wherein the set of two or more audio output elements includes a first audio output element and a second audio output element, and wherein the first audio output element and the second audio output elements are independently controllable; obtaining data associated with motion of the vehicle; and after receiving the data associated with motion of the vehicle, causing the set of two or more audio output elements to have a second audio output state that is based on the motion of the vehicle and that is different from the first audio output state, including causing the first audio output element to produce a first audio output based on the data associated with motion of the vehicle and causing the second audio output element to produce a second audio output based on the data associated with motion of the vehicle.

In some embodiments, a computer-readable storage medium (e.g., a non-transitory computer-readable storage medium or a transitory computer-readable storage medium) stores one or more programs configured to be executed by one or more processors of a computer system. The one or more programs includes instructions for: causing a set of two or more audio output elements in an interior of a vehicle to have a first audio output state, wherein the set of two or more audio output elements includes a first audio output element and a second audio output element, and wherein the first audio output element and the second audio output elements are independently controllable; obtaining data associated with motion of the vehicle; and after receiving the data associated with motion of the vehicle, causing the set of two or more audio output elements to have a second audio output state that is based on the motion of the vehicle and that is different from the first audio output state, including causing the first audio output element to produce a first audio output based on the data associated with motion of the vehicle and causing the second audio output element to produce a second audio output based on the data associated with motion of the vehicle.

In some embodiments, a computer system includes one or more processors and memory storing one or more programs configured to be executed by the one or more processors. The one or more programs including instructions for: causing a set of two or more audio output elements in an interior of a vehicle to have a first audio output state, wherein the set of two or more audio output elements includes a first audio output element and a second audio output element, and wherein the first audio output element and the second audio output elements are independently controllable; obtaining data associated with motion of the vehicle; and after receiving the data associated with motion of the vehicle, causing the set of two or more audio output elements to have a second audio output state that is based on the motion of the vehicle and that is different from the first audio output state, including causing the first audio output element to produce a first audio output based on the data associated with motion of the vehicle and causing the second audio output element to produce a second audio output based on the data associated with motion of the vehicle.

In some embodiments, a computer system includes: means for causing a set of two or more audio output elements in an interior of a vehicle to have a first audio output state, wherein the set of two or more audio output elements includes a first audio output element and a second audio output element, and wherein the first audio output element and the second audio output elements are independently controllable; means for obtaining data associated with motion of the vehicle; and means for, after receiving the data associated with motion of the vehicle, causing the set of two or more audio output elements to have a second audio output state that is based on the motion of the vehicle and that is different from the first audio output state, including causing the first audio output element to produce a first audio output based on the data associated with motion of the vehicle and causing the second audio output element to produce a second audio output based on the data associated with motion of the vehicle.

In some embodiments, a computer program product includes one or more programs configured to be executed by one or more processors of a computer system. The one or more programs include instructions for: causing a set of two or more audio output elements in an interior of a vehicle to have a first audio output state, wherein the set of two or more audio output elements includes a first audio output element and a second audio output element, and wherein the first audio output element and the second audio output elements are independently controllable; obtaining data associated with motion of the vehicle; and after receiving the data associated with motion of the vehicle, causing the set of two or more audio output elements to have a second audio output state that is based on the motion of the vehicle and that is different from the first audio output state, including causing the first audio output element to produce a first audio output based on the data associated with motion of the vehicle and causing the second audio output element to produce a second audio output based on the data associated with motion of the vehicle.

In some embodiments, executable instructions for performing these functions are included in a non-transitory computer-readable storage medium or other computer program product configured for execution by one or more processors. In some embodiments, executable instructions for performing these functions are included in a transitory computer-readable storage medium or other computer program product configured for execution by one or more processors.

BRIEF DESCRIPTION OF THE FIGURES

To better understand the various described embodiments, reference should be made to the Description of Embodiments below, along with the following drawings in which like reference numerals refer to corresponding parts throughout the figures.

FIGS. 4A-4H illustrate techniques for tinting windows according to some embodiments.

FIGS. 6A-6I illustrate techniques for providing visual and/or audio output in accordance with some embodiments.

FIGS. 8A-8I illustrate techniques for providing visual and/or audio output in accordance with some embodiments.

DESCRIPTION OF EMBODIMENTS

The following description sets forth exemplary methods, parameters, and the like. However, such description is not intended as a limitation on the scope of the present disclosure but is instead provided as a description of exemplary embodiments.

Although the following description uses terms "first," "second," etc. to describe various elements, these elements should not be limited by the terms. In some embodiments, these terms are used to distinguish one element from another. For example, a first item could be termed a second item, and, similarly, a second item could be termed a first item, without departing from the scope of the various described embodiments. In some embodiments, the first item and the second item are two separate references to the same item. In some embodiments, the first item and the second item are both the same type of item, but they are not the same item.

The terminology used in the description of the various described embodiments herein is for the purpose of describing particular embodiments only and is not intended to be limiting. The singular forms "a," "an," and "the" are intended to include the plural forms as well, unless the context clearly indicates otherwise. The term "and/or" refers to and encompasses any and all possible combinations of one or more of the associated listed items. The terms "includes," "including," "comprises," and/or "comprising" specify the presence of stated features, steps, operations, elements, and/or components, but do not preclude the presence or addition of one or more other features, steps, operations, elements, components, and/or groups thereof.

Figure 1:
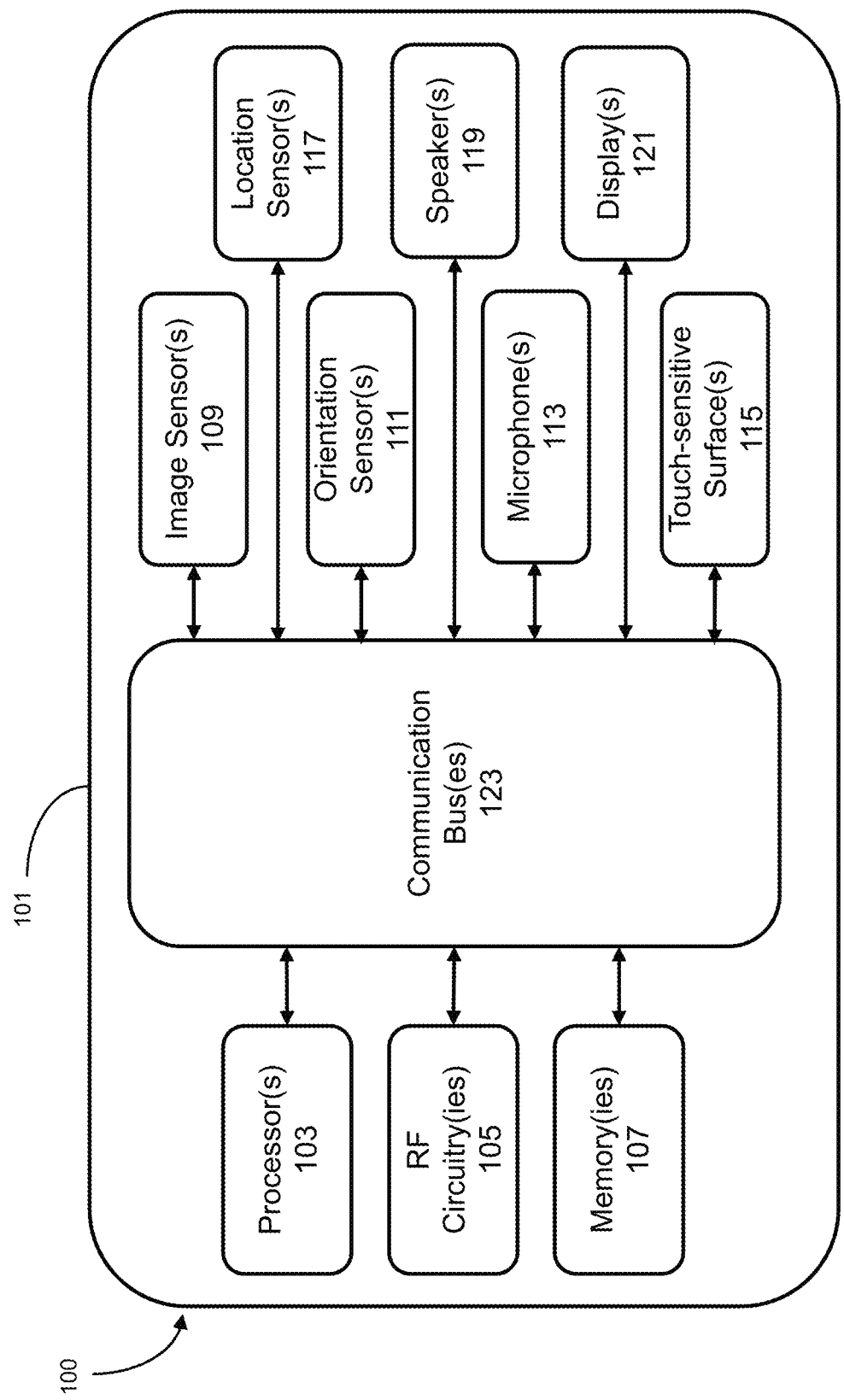
FIG. 1 illustrates an example system for implementing the techniques described herein.

FIG. 1 illustrates an example system 100 for implementing the techniques described herein. System 100 can perform any of the methods described in FIGS. 3, 5, 7, and/or 9 (e.g., methods 300, 500, 700, and/or 900) or portions thereof.

In FIG. 1, system 100 includes device 101. Device 101 includes various components, such as processor(s) 103, RF circuitry(ies) 105, memory(ies) 107, image sensor(s) 109, orientation sensor(s) 110, microphone(s) 113, location sensor(s) 117, speaker(s) 119, display(s) 121, and touch-sensitive surface(s) 115. These components optionally communicate over communication bus(es) 123 of device 101. In some embodiments, system 100 includes two or more devices that include some or all of the features of device 101.

In some examples, system 100 is a desktop computer, embedded computer, and/or a server. In some examples, system 100 is a mobile device such as, e.g., a smartphone, smartwatch, laptop computer, and/or tablet computer. In some examples, system 100 is a head-mounted display (HMD) device. In some examples, system 100 is a wearable HUD device. In some embodiments, system 100 includes a virtual reality device, an augmented reality device, a mixed reality device, and/or an extended reality device that is configured to display virtual objects. In some embodiments, system 100 is configured to display a virtual environment (e.g., that includes virtual objects). In some embodiments, system 100 is configured to display virtual objects overlaid on and/or integrated with a view of a physical environment. In some embodiments, system 100 includes a transparent display through which a user can observe the view of the physical environment. In some embodiments, the view of the physical environment includes captured images and/or video of the physical environment that are displayed by system 100 (e.g., passthrough video).

System 100 includes processor(s) 103 and memory(ies) 107. Processor(s) 103 include one or more general processors, one or more graphics processors, and/or one or more digital signal processors. In some examples, memory(ies) 107 are one or more non-transitory computer-readable storage mediums (e.g., flash memory and/or random-access memory) that store computer-readable instructions configured to be executed by processor(s) 103 to perform the techniques described herein.

System 100 includes RF circuitry(ies) 105. RF circuitry(ies) 105 optionally include circuitry for communicating with electronic devices, networks, such as the Internet, intranets, and/or a wireless network, such as cellular networks and wireless local area networks (LANs). RF circuitry(ies) 105 optionally includes circuitry for communicating using near-field communication and/or short-range communication, such as Bluetooth®.

System 100 includes display(s) 121. In some examples, display(s) 121 include one or more monitors, projectors, and/or screens. In some examples, display(s) 121 include a first display for displaying images to a first eye of the user and a second display for displaying images to a second eye of the user (e.g., a three-dimensional display). Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays (e.g., a three-dimensional effect). In some examples, display(s) 121 include a single display (e.g., a single three-dimensional display). Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display (e.g., a three-dimensional effect).

In some examples, system 100 includes touch-sensitive surface(s) 115 for receiving user inputs, such as tap inputs and swipe inputs. In some examples, display(s) 121 and touch-sensitive surface(s) 115 form touch-sensitive display(s).

System 100 includes image sensor(s) 109. Image sensor(s) 109 optionally include one or more visible light image sensor, such as charged coupled device (CCD) sensors, and/or complementary metal-oxide-semiconductor (CMOS) sensors operable to obtain images of physical objects. Image sensor(s) also optionally include one or more infrared (IR) sensor(s), such as a passive IR sensor or an active IR sensor, for detecting infrared light. For example, an active IR sensor includes an IR emitter, such as an IR dot emitter, for emitting infrared light. Image sensor(s) 109 also optionally include one or more camera(s) configured to capture movement of physical objects. Image sensor(s) 109 also optionally include one or more depth sensor(s) configured to detect the distance of physical objects from system 100. In some examples, system 100 uses CCD sensors, cameras, and depth sensors in combination to detect the physical environment around system 100. In some examples, image sensor(s) 109 include a first image sensor and a second image sensor. In some examples, system 100 uses image sensor(s) 109 to receive user inputs, such as hand gestures. In some examples, system 100 uses image sensor(s) 109 to detect the position and orientation of system 100 in the physical environment.

In some examples, system 100 includes microphones(s) 113. System 100 uses microphone(s) 113 to detect sound from the user and/or the physical environment of the user. In some examples, microphone(s) 113 includes an array of microphones (including a plurality of microphones) that optionally operate in tandem, such as to identify ambient noise or to locate the source of sound in space of the physical environment.

System 100 includes orientation sensor(s) 111 for detecting orientation and/or movement of system 100. For example, system 100 uses orientation sensor(s) 111 to track changes in the position and/or orientation of system 100, such as with respect to physical objects in the physical environment. Orientation sensor(s) 111 optionally include one or more gyroscopes, one or more inertial measurement units, and/or one or more accelerometers.

FIGS. 2A-2Q illustrate example techniques for displaying user interfaces based on motion. The techniques can be used to make motion more comfortable for a person. Some people experience discomfort such as motion sickness or simulation sickness when there is a disconnect between the motion that the person is physically experiencing and motion that the person perceives through sight and/or hearing. For example, a person may experience motion sickness when looking at a display and/or using an electronic device such as a smartphone, laptop computer, smartwatch, or tablet computer while riding in a car because the person feels the motion of the car but is not looking at the movement of the surrounding environment. As another example, a person may experience simulation sickness when viewing moving content on a display or content that makes it appear as though the person is moving (e.g., a first-person perspective in a virtual environment) when the person is not physically moving. In some embodiments, the techniques described can help with motion comfort while a user is viewing and/or interacting with content displayed on an electronic device.

FIG. 2A illustrates computer system 200 with display 202. Computer system 200 can include any feature, or combination of features, of system 100 described above. In FIG. 2A, content 204 and dynamic element 206 are displayed. In the embodiment illustrated in FIG. 2A, content 204 includes system status indicators (such as an indication of time, a cellular status indicator, a Wi-Fi status indicator, and a battery status indicator) and a user interface of a web browser application. The user interface of the web browser application includes content of a web page, controls for navigating and sharing a web page, and a text field for entering a web address and/or performing a search function. In some embodiments, the system status indicators are part of the user interface of the web browser application. In some embodiments, content 204 includes a user interface of a different application, a watch face user interface (e.g., on a smartwatch), and/or a system user interface (e.g., a desktop user interface, a home screen, a settings user interface, and/or an application springboard that includes application icons for launching and/or opening applications).

In the embodiment illustrated in FIG. 2A, dynamic element 206 includes a set of graphical elements 206a1, 206a2, 206b1, 206b2, 206c1, 206c2, 206d1, and 206d2 (collectively referred to as graphical elements 206a1-206d2 or dynamic element 206). In some embodiments, dynamic element 206 is a graphical layer (e.g., that is displayed in front of or behind content 204). Graphical elements 206a1-206d2 are arranged in a rectangular array or grid of horizontal rows and vertical columns. The vertical spacing or distance between rows (e.g., between a center of graphical element 206a1 and a center of graphical element 206b1) is distance DV. In the embodiment illustrated in FIG. 2A, the spacing between rows is consistent, with each graphical element being a constant distance from its adjacent graphical elements (e.g., the distance between a center of graphical element 206a1 and a center of graphical element 206b1 is the same as the distance between the center of graphical element 206*b*1 and a center of graphical element 206*c*1). In some embodiments, the spacing between rows varies (e.g., the distance between a center of graphical element 206*a*1 and a center of graphical element 206*b*1 is different from the distance between the center of graphical element 206*b*1 and a center of graphical element 206*c*1).

The horizontal spacing or distance between columns (e.g., between the center of graphical element 206*a*1 and the center of graphical element 206*a*2) is distance DH. In some embodiments, the spacing between columns is consistent, with each graphical element being a constant distance from its adjacent graphical elements (e.g., the distance between a center of graphical element 206*a*1 and a center of graphical element 206*a*2 is the same as the distance between the center of graphical element 206*a*2 and a center of an adjacent graphical element in a column to the right of graphical element 206*a*2). In some embodiments, the spacing between columns varies (e.g., the distance between a center of graphical element 206*a*1 and a center of graphical element 206*a*2 is different from the distance between the center of graphical element 206*a*2 and a center of an adjacent graphical element in a column to the right of graphical element 206*a*2). In some implementations, the graphical elements are not in columns or rows, but are variably spaced or patterned across the user interface (e.g., in a diagonal pattern or in a random pattern).

Dynamic element 206 is affected by detected motion such that dynamic element 206 is displayed (e.g., appears), moves, and/or changes appearance on display 202 in response to and/or in accordance with detected motion. In some embodiments, dynamic element 206 moves based on motion of a vehicle (e.g., a vehicle in which (or on which) computer system 200 or a user of computer system 200 is located), motion of a user of computer system 200, motion of computer system 200 itself, and/or virtual or simulated motion (e.g., motion that the user is intended to perceive, but does not physically experience). In some embodiments, computer system 200 is in or on a vehicle such as, for example, a car, bus, truck, train, bike, motorcycle, boat, plane, golf cart, and/or all-terrain vehicle (ATV). In some embodiments, computer system 200 displays dynamic element 206 in accordance with a determination that computer system 200 is in a vehicle (e.g., computer system 200 does not display dynamic element 206 when computer system 200 is not in a vehicle).

In some embodiments, various characteristics of dynamic element 206 are variable and/or configurable. For example, in some embodiments, the brightness, size, transparency, number, pattern, spacing, and/or shape of the graphical elements of dynamic element 206 change based on detected motion. For example, the size, brightness, and/or opacity of the graphical elements of dynamic element 206 vary (e.g., increase or decrease) with the magnitude of motion (e.g., velocity and/or acceleration). In some embodiments, the brightness, size, transparency, number, pattern, spacing, and/or shape of the graphical elements are user configurable (e.g., are displayed and/or can be changed based on user-selectable settings).

In FIG. 2A, dynamic element 206 is in a neutral state because there is no motion affecting dynamic element 206. In FIG. 2A (e.g., in the neutral state), dynamic element 206 is offset horizontally from the left side of display 202 by distance X1 and offset vertically from the top of display 202 by distance Y1. In some embodiments, computer system 200 does not display dynamic element 206 when there is no motion and displays dynamic element 206 and/or increases an opacity of dynamic element 206 in response to detecting motion.

In FIG. 2B, motion represented by arrow 208*a* (also referred to as motion 208*a*) is detected. In some embodiments, computer system 200 detects motion 208*a*. In some embodiments, a computer system and/or one or more sensors that are external to and/or separate from computer system 200 detect motion 208*a* and transmit data and/or information associated with motion 208*a* to computer system 200. In some embodiments, the computer system and/or one or more sensors that detect motion 208*a* transmit the data and/or information associated with motion 208*a* to a server, which transmits the data and/or information to computer system 200.

As shown in FIG. 2B, dynamic element 206 increases in opacity (e.g., becomes darker and/or more opaque) and moves (e.g., changes location on display 202) based on motion 208*a* (e.g., in response to detecting motion 208*a* or in response to receiving data representing motion 208*a*). In FIG. 2B, motion 208*a* includes a change in direction (e.g., acceleration) forward (or upward) and to the left relative to the position and/or orientation of computer system 200. Based on motion 208*a*, dynamic element 206 moves in a direction opposite of the direction of motion 208*a*. Accordingly, compared to the position of dynamic element 206 in FIG. 2A, dynamic element 206 moves down due to the forward component of motion 208*a* and to the right due to the leftward component of motion 208*a*. In particular, because of the forward (upward) component of motion 208*a*, the vertical offset of dynamic element 206 from the top side of display 202 has increased from distance Y1 in FIG. 2A to distance Y2 in FIG. 2B (where Y2 is greater than Y1). Similarly, because of the leftward component of motion 208*a*, the horizontal offset of dynamic element 206 from the left side of display 202 has increased from distance X1 in FIG. 2A to distance X2 in FIG. 2B (where X2 is greater than X1). In this way, dynamic element 206 simulates the perceived force on a user due to motion 208*a*. For example, when a platform on which a user is located accelerates forward and to the left, the user feels as though they are being pushed backward and to the right.

In FIG. 2C, motion represented by arrow 208*b* (also referred to as motion 208*b*) is detected. Motion 208*b* can be detected in the same manner as motion 208*a* described above with reference to FIG. 2B, and data representing or associated with motion 20*b* can be transmitted and/or received in the same manner as data representing or associated with motion 208*a* described with reference to FIG. 2B. As shown in FIG. 2C, dynamic element 206 becomes opaquer (e.g., compared to FIG. 2A) and moves (e.g., changes location on display 202) based on motion 208*b* (e.g., in response to detecting motion 208*b* or in response to receiving data representing motion 208*b*).

In FIG. 2C, motion 208*b* includes a change in direction (e.g., acceleration) backward (or downward) and to the right relative to the position and/or orientation of computer system 200 (e.g., in the opposite direction of motion 208*a*). Based on motion 208*b*, dynamic element 206 moves in a direction opposite of the direction of motion 208*b*. Accordingly, compared to the position of dynamic element 206 in FIG. 2A, dynamic element 206 moves up due to the backward (downward) component of motion 208*b* and to the left due to the rightward component of motion 208*b*. In particular, because of the backward component of motion 208*b*, the vertical offset of dynamic element 206 from the top side of display 202 has decreased from distance Y1 in FIG. 2A to distance Y3 in FIG. 2C (where Y3 is less than Y1). Similarly, because of the rightward component of motion 208b, the horizontal offset of dynamic element 206 from the left side of display 202 has decreased from distance X1 in FIG. 2A to distance X3 in FIG. 2C (where X3 is less than X1). In this way, dynamic element 206 simulates the perceived force on a user due to motion 208b. For example, when a platform on which a user is located accelerates backward and to the right, the user feels as though they are being pushed forward and to the left.

In some embodiments, the magnitude of the change dynamic element 206 (e.g., the change in position, opaqueness, brightness, and/or size) of dynamic element 206 is proportional to the magnitude of the motion. For example, in response to motion in the direction of motion 208a, but with greater magnitude, dynamic element 206 becomes opaquer and moves in the same direction, but by a greater amount, than as shown in FIG. 2B (e.g., X2 and Y2 are greater than as shown in FIG. 2B).

In some embodiments, the position and/or movement of dynamic element 206 is independent from the display of content 204. For example, in FIGS. 2B and 2C, dynamic element 206 moves based on motion 208a and motion 208b without affecting content 204 (e.g., content 204 does not change or move in FIGS. 2B and 2C based on motion 208a, motion 208b, or the movement of dynamic element 206).

Figures 2D, 2E, 2F:
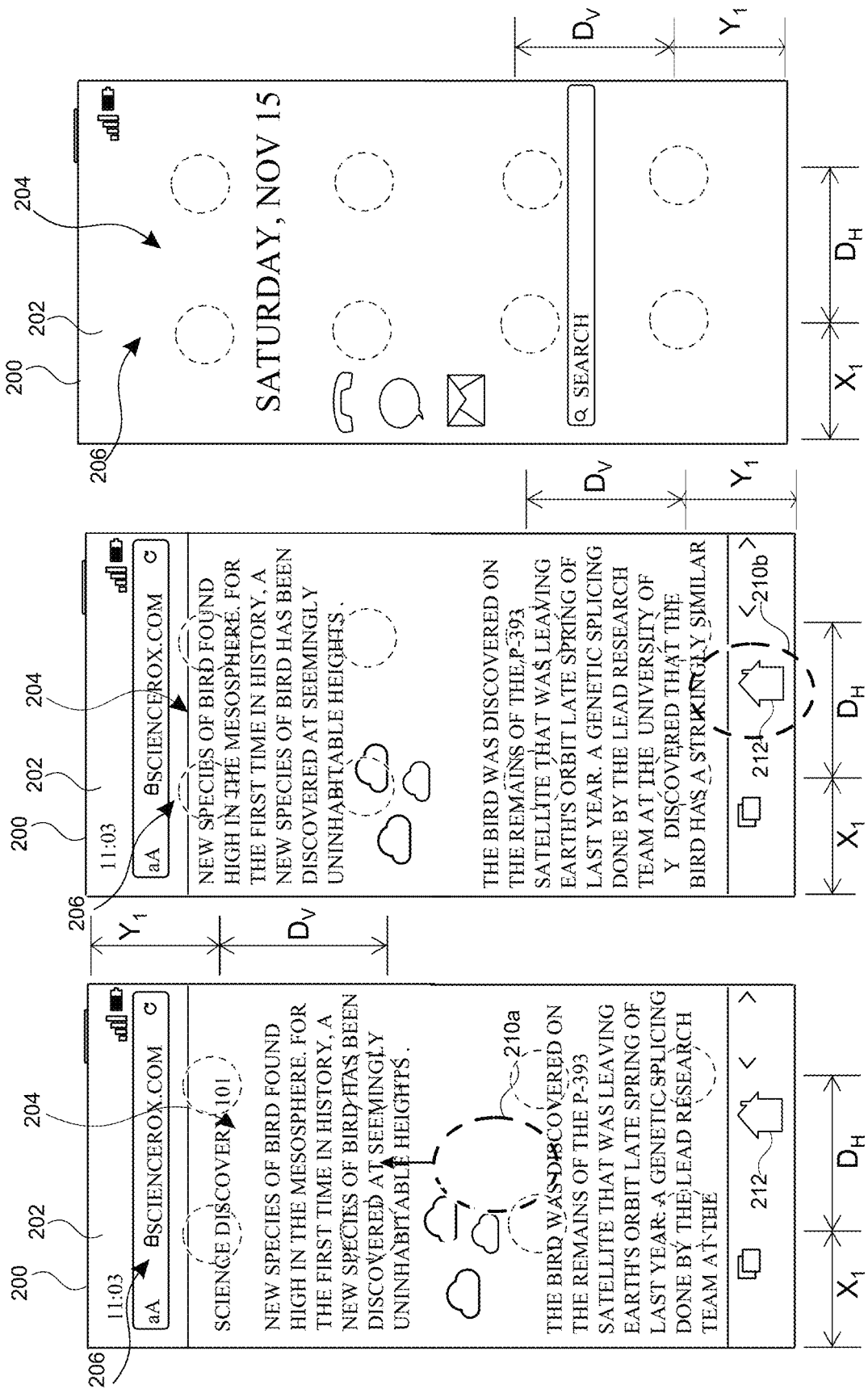
FIGS. 2A-2Q illustrate techniques for displaying user interfaces based on detected motion according to some embodiments.

Conversely, a user can change and/or navigate content 204 without affecting the position and/or movement of dynamic element 206. FIG. 2D illustrates content 204 and dynamic element 206 in the same state as in FIG. 2A. In FIG. 2D, computer system 200 detects input 210a corresponding to a request to navigate (e.g., scroll) content 204. In response to detecting input 210a, computer system 200 scrolls content 204 and maintains the position of dynamic element 206, as shown in FIG. 2E (e.g., dynamic element 206 has the same position in FIG. 2E as in FIG. 2D). In this way, dynamic element 206 is independent from content 204.

In FIG. 2E, computer system 200 detects input 210b (e.g., selection of home button 212) corresponding to a request to navigate to a home screen (e.g., to close (or move to the background) the web browsing application displayed in FIG. 2E). In response to detecting input 210b, computer system 200 displays home screen 214 and maintains the position of dynamic element 206, as shown in FIG. 2F (e.g., dynamic element 206 has the same position in FIG. 2F as in FIG. 2E). In this way, dynamic element 206 is independent from the content displayed on display 202 (e.g., graphical objects and features other than dynamic element 206).

FIGS. 2G-2L illustrate example techniques for making motion more comfortable. The techniques described can make a user more comfortable while the user is viewing and/or interacting with content displayed on an electronic device. In FIG. 2G, computer system 200 displays content 204 (e.g., as in FIGS. 2A-2E) and dynamic element 215. In some embodiments, dynamic element 215 moves in a manner analogous to dynamic element 206 described with reference to FIGS. 2A-2F. In some embodiments, the movement of dynamic element 215 simulates the movement of a mass on a spring. Dynamic element 215 includes a single graphical element (e.g., a square). In some embodiments, dynamic element 215 is a circle, triangle, star, cube, pyramid, or sphere.

Dynamic element 215 is affected by detected motion such that dynamic element 215 moves on display 202 in response to and/or in accordance with detected motion. In some embodiments, dynamic element 215 moves based on motion of a vehicle (e.g., a vehicle in which (or on which) computer system 200 or a user of computer system 200 is located), motion of a user of computer system 200, motion of computer system 200 itself, and/or virtual or simulated motion (e.g., motion that the user is intended to perceive, but does not physically experience).

In FIG. 2G, dynamic element 215 is in a neutral state because there is no motion affecting the element. In FIG. 2G (e.g., in the neutral state), dynamic element 215 is offset horizontally from the left side of display 202 by distance X4 (e.g., half of the length of display 202 in the horizontal direction) and offset vertically from the top of display 202 by distance Y4 (e.g., half of the length of display 202 in the vertical direction).

In FIG. 2H, motion represented by arrow 208c (also referred to as motion 208c) is detected. Motion 208c can be detected in the same manner as motion 208a and/or motion 208b described above with reference to FIGS. 2B and 2C, and data representing or associated with motion 20c can be transmitted and/or received in the same manner as data representing or associated with motion 208a and/or motion 208b described with reference to FIGS. 2B and 2C.

As shown in FIG. 2H, dynamic element 215 moves (e.g., changes location on display 202) based on motion 208c (e.g., in response to detecting motion 208c or in response to receiving data representing motion 208c). In FIG. 2H, motion 208c includes a change in direction (e.g., acceleration) forward (or upward) and to the left relative to the position and/or orientation of computer system 200. Based on motion 208c, dynamic element 215 moves in a direction opposite of the direction of motion 208c. Accordingly, compared to the position of dynamic element 215 in FIG. 2G, dynamic element 215 moves down due to the forward component of motion 208c and to the right due to the leftward component of motion 208c. In particular, because of the forward (upward) component of motion 208c, the vertical offset of dynamic element 215 from the top side of display 202 has increased from distance Y4 in FIG. 2G to distance Y5 in FIG. 2H (where Y5 is greater than Y4). Similarly, because of the leftward component of motion 208c, the horizontal offset of dynamic element 215 from the left side of display 202 has increased from distance X4 in FIG. 2G to distance X5 in FIG. 2H (where X5 is greater than X4). In this way, dynamic element 215 simulates the perceived force on a user due to motion 208c. For example, when a platform on which a user is located accelerates forward and to the left, the user feels as though they are being pushed backward and to the right.

In FIG. 2I, motion represented by arrow 208d (also referred to as motion 208d) is detected. Motion 208d can be detected in the same manner as motion 208a, motion 208b, and/or motion 208c described above, and data representing or associated with motion 20d can be transmitted and/or received in the same manner as data representing or associated with motion 208a, motion 208b, and/or motion 208c described above.

As shown in FIG. 2I, dynamic element 215 moves (e.g., changes location on display 202) based on motion 208d (e.g., in response to detecting motion 208d or in response to receiving data representing motion 208d). In FIG. 2I, motion 208d includes a change in direction (e.g., acceleration) backward (or downward) and to the right relative to the position and/or orientation of computer system 200 (e.g., in the opposite direction of motion 208c). Based on motion 208d, dynamic element 215 moves in a direction opposite of the direction of motion 208c. Accordingly, compared to the position of dynamic element 215 in FIG. 2G, dynamic element 215 moves up due to the backward (downward)

component of motion 208d and to the left due to the rightward component of motion 208d. In particular, because of the backward component of motion 208d, the vertical offset of dynamic element 215 from the top side of display 202 has decreased from distance Y4 in FIG. 2G to distance Y6 in FIG. 2I (where Y6 is less than Y4). Similarly, because of the rightward component of motion 208d, the horizontal offset of dynamic element 215 from the left side of display 202 has decreased from distance X4 in FIG. 2G to distance X6 in FIG. 2I (where X6 is less than X4). In this way, dynamic element 215 simulates the perceived force on a user due to motion 208d. For example, when a platform on which a user is located accelerates backward and to the right, the user feels as though they are being pushed forward and to the left.

In some embodiments, the magnitude of the change in position of dynamic element 215 is proportional to the magnitude of the motion. For example, in response to motion in the direction of motion 208c, but with greater magnitude, dynamic element 215 moves in the same direction, but by a greater amount, than as shown in FIG. 2H (e.g., X5 is greater than as shown in FIG. 2H and Y5 is less than as shown in FIG. 2H).

In some embodiments, the position and/or movement of dynamic element 215 is independent from the display of content 204. For example, in FIGS. 2H and 2I, dynamic element 215 moves based on motion 208c and motion 208d without affecting content 204 (e.g., content 204 does not change or move in FIGS. 2H and 2I based on motion 208c, motion 208d, or the movement of dynamic element 215).

Conversely, a user can change and/or navigate content 204 without affecting the position and/or movement of dynamic element 215. FIG. 2J illustrates content 204 and dynamic element 215 in the same state as in FIG. 2G. In FIG. 2J, computer system 200 detects input 210c corresponding to a request to navigate (e.g., scroll) content 204. In response to detecting input 210c, computer system 200 scrolls content 204 and maintains the position of dynamic element 215, as shown in FIG. 2K (e.g., dynamic element 215 has the same position in FIG. 2K as in FIG. 2J). In this way, dynamic element 215 is independent from content 204.

In FIG. 2K, computer system 200 detects input 210d (e.g., selection of home button 212) corresponding to a request to navigate to a home screen (e.g., to close (or move to the background) the web browsing application displayed in FIG. 2K). In response to detecting input 210d, computer system 200 displays home screen 214 and maintains the position of dynamic element 215, as shown in FIG. 2L (e.g., dynamic element 215 has the same position in FIG. 2L as in FIG. 2K). In this way, dynamic element 215 is independent from the content displayed on display 202 (e.g., graphical objects and features other than dynamic element 215).

FIGS. 2M-2O illustrate example techniques for mitigating discomfort caused by motion. The techniques described can help a user feel comfortable while viewing and/or interacting with content displayed on an electronic device.

In FIG. 2M, content 204 (e.g., the content shown in FIGS. 2A-2L), dynamic element 216, and dynamic element 218 are displayed. Dynamic element 216 includes a set of six graphical elements 216a, 216b, 216c, 216d, 216e, and 216f (collectively referred to as graphical elements 216a-216f or dynamic element 216). Graphical elements 216a-216f are arranged horizontally (e.g., along a horizontal line). In some embodiments, dynamic element 216 includes fewer than six graphical elements (e.g., 3, 4, or 5 graphical elements) arranged horizontally. In some embodiments, dynamic element 216 includes more than six graphical elements (e.g., 7, 8, 9, 10, 11, or 12 graphical elements) arranged horizontally.

Graphical elements 216a-216f can have a first visual state (e.g., filled in, highlighted, a first color, solid outline, and/or a first pattern) or a second visual state (e.g., not filled in, not highlighted, a second color (different from the first color), dashed outline, a second pattern (different from the first pattern), and/or not displayed), where the first visual state is different from (e.g., visually distinguishable from) the second visual state. For example, in FIG. 2M, graphical element 216a, graphical element 216b, and graphical element 216c have a first visual state (e.g., filled in and/or solid outline), while graphical element 216d, graphical element 216e, and graphical element 216f have a second visual state (e.g., not filled in, dashed outline, and/or not displayed). In some embodiments, graphical elements 216a-216f can have more than two different visual states (e.g., a third visual state or a transitional visual state when changing from the first visual state to the second visual state).

Dynamic element 216 is affected by detected motion (e.g., motion along the horizontal direction) such that the visual state of dynamic element 216 changes (e.g., by changing the visual state of one or more of graphical elements 216a-216f) in response to and/or in accordance with detected motion. In some embodiments, dynamic element 216 changes visual states based on motion of a vehicle (e.g., a vehicle in which (or on which) computer system 200 or a user of computer system 200 is located), motion of a user of computer system 200, motion of computer system 200 itself, and/or virtual or simulated motion (e.g., motion that the user is intended to perceive, but does not physically experience).

In FIG. 2M, dynamic element 216 is in a neutral state because there is no motion affecting dynamic element 216. In FIG. 2M (e.g., in the neutral state), the graphical elements on the left side (e.g., left half) of dynamic element 216 (e.g., graphical elements 216a-216c) have a first visual state, and the graphical elements on the right side (e.g., right half) of dynamic element 216 (e.g., graphical elements 216d-216f) have a second visual state.

Dynamic element 218 includes a set of six graphical elements 218a, 218b, 218c, 218d, 218e, and 218f (collectively referred to as graphical elements 218a-218f or dynamic element 218). Graphical elements 218a-218f are arranged vertically (e.g., along a vertical line). In some embodiments, dynamic element 218 includes fewer than six graphical elements (e.g., 3, 4, or 5 graphical elements) arranged vertically. In some embodiments, dynamic element 218 includes more than six graphical elements (e.g., 7, 8, 9, 10, 11, or 12 graphical elements) arranged vertically.

Graphical elements 218a-218f can have a first visual state (e.g., filled in, highlighted, a first color, solid outline, and/or a first pattern) or a second visual state (e.g., not filled in, highlighted, a second color (different from the first color), dashed outline, a second pattern (different from the first pattern), and/or not displayed), where the first visual state is different from (e.g., visually distinguishable from) the second visual state. For example, in FIG. 2M, graphical element 218a, graphical element 218b, and graphical element 218c have a first visual state, while graphical element 218d, graphical element 218e, and graphical element 218f have a second visual state. In some embodiments, graphical elements 218a-218f can have more than two different visual states (e.g., a third visual state or a transitional visual state when changing from the first visual state to the second visual state).

Dynamic element 218 is affected by detected motion (e.g., motion along the forward-backward direction) such that the visual state of dynamic element 218 changes (e.g., by changing the visual state of one or more of graphical elements 218a-218f) in response to and/or in accordance with detected motion. In some embodiments, dynamic element 218 changes visual states based on motion of a vehicle (e.g., a vehicle in which (or on which) computer system 200 or a user of computer system 200 is located), motion of a user of computer system 200, motion of computer system 200 itself, and/or virtual or simulated motion (e.g., motion that the user is intended to perceive, but does not physically experience).

In FIG. 2M, dynamic element 218 is in a neutral state because there is no motion affecting dynamic element 218. In FIG. 2M (e.g., in the neutral state), the graphical elements on the lower side (e.g., lower half) of dynamic element 216 (e.g., graphical elements 216a-216c) have a first visual state (e.g., filled in and/or solid outline), and the graphical elements on the upper side (e.g., upper half) of dynamic element 218 (e.g., graphical elements 218d-218f) have a second visual state (e.g., not filled in, dashed outline, and/or not displayed).

In FIG. 2N, motion represented by arrow 208e (also referred to as motion 208e) is detected. Motion 208e can be detected in the same manner as motion 208a, motion 208b, motion 208c, and/or motion 208d described above, and data representing or associated with motion 208e can be transmitted and/or received in the same manner as data representing or associated with motion 208a, motion 208b, motion 208c, and/or motion 208d described above. As shown in FIG. 2N, dynamic element 216 and dynamic element 218 are displayed in a state (e.g., changed state) based on motion 208e (e.g., in response to detecting motion 208e or in response to receiving data representing motion 208e). In FIG. 2N, motion 208e includes a change in direction (e.g., acceleration) forward (or upward) and to the left relative to the position and/or orientation of computer system 200.

Based on motion 208e, graphical elements 216a-216e are displayed with the first visual state, and graphical element 216f is displayed with the second visual state. Accordingly, due to motion 208e, graphical elements 216d and 216e have changed from the second visual state to the first visual state (e.g., the first visual state has "moved" to the right, in the opposite direction of the lateral component of motion 208e), compared to FIG. 2M. Accordingly, compared to the state of dynamic element 216 in FIG. 2M, the right side of dynamic element 216 includes a graphical element (e.g., graphical element 216d) that has the first visual state due to the leftward component of motion 208e. In particular, because of the leftward component of motion 208e, the majority of dynamic element 216 (e.g., the entire left half and a left portion of the right half of dynamic element 216) has the first visual state. In this way, dynamic element 216 simulates the perceived force on a user due to motion 208e. For example, when a platform on which a user is located accelerates at least partially to the left, the user feels as though they are being pushed to the right.

Based on motion 208e, graphical elements 218a-218b are displayed with the first visual state (e.g., filled in and/or solid outline), and graphical elements 218c-218f are displayed with the second visual state (e.g., not filled in, dashed outline, and/or not displayed). Accordingly, due to motion 208e, graphical element 218c has changed from the first visual state to the second visual state (e.g., the first visual state has "moved" down, in the opposite direction of the vertical component of motion 208e), compared to FIG. 2M. Accordingly, compared to the state of dynamic element 218 in FIG. 2M, the lower side of dynamic element 218 includes a graphical element (e.g., graphical element 218c) that has the second visual state due to the forward component of motion 208e. In particular, because of the forward component of motion 208e, the majority of dynamic element 218 (e.g., the entire upper half and an upper-most portion of the lower half of dynamic element 218) has the second visual state. In this way, dynamic element 218 simulates the perceived force on a user due to motion 208e. For example, when a platform on which a user is located accelerates at least partially forward (or upward), the user feels as though they are being pushed back (or down).

In FIG. 2O, motion represented by arrow 208f (also referred to as motion 208f) is detected. Motion 208f can be detected in the same manner as motion 208a, motion 208b, motion 208c, motion 208d, and/or motion 208e described above, and data representing or associated with motion 208f can be transmitted and/or received in the same manner as data representing or associated with motion 208a, motion 208b, motion 208c, motion 208d, and/or motion 208e described above.

As shown in FIG. 2O, dynamic element 216 and dynamic element 218 are displayed in a state (e.g., changed state) based on motion 208f (e.g., in response to detecting motion 208f or in response to receiving data representing motion 208f). In FIG. 2O, motion 208f includes a change in direction (e.g., acceleration) backward (or downward) and to the right relative to the position and/or orientation of computer system 200.

Based on motion 208f, graphical elements 216a-216b are displayed with the first visual state, and graphical elements 216c-216f are displayed with the second visual state. Accordingly, due to motion 208f, graphical element 216c has changed from the first visual state to the second visual state (e.g., the first visual state has "moved" to the left, in the opposite direction of the lateral component of motion 208f), compared to FIG. 2M. Accordingly, compared to the state of dynamic element 216 in FIG. 2M, the left side of dynamic element 216 includes a graphical element (e.g., graphical element 216c) that has the second visual state due to the rightward component of motion 208f. In particular, because of the rightward component of motion 208f, the minority of dynamic element 216 (e.g., only a portion of the left half of dynamic element 216) has the first visual state. In this way, dynamic element 216 simulates the perceived force on a user due to motion 208f. For example, when a platform on which a user is located accelerates at least partially to the right, the user feels as though they are being pushed to the left.

Based on motion 208f, graphical elements 218a-218e are displayed with the first visual state, and graphical element 218f is displayed with the second visual state. Accordingly, due to motion 208f, graphical elements 218d-218e have changed from the second visual state to the first visual state (e.g., the first visual state has "moved" up, in the opposite direction of the vertical component of motion 208f), compared to FIG. 2M. Accordingly, compared to the state of dynamic element 218 in FIG. 2M, the upper side of dynamic element 218 includes a graphical element (e.g., graphical elements 218d-218e) that has the first visual state due to the backward component of motion 208f. In particular, because of the backward component of motion 208f, the majority of dynamic element 218 (e.g., the entire lower half and a lower-most portion of the upper half of dynamic element 218) has the first visual state. In this way, dynamic element 218 simulates the perceived force on a user due to motion 208f. For example, when a platform on which a user is located accelerates at least partially backward (or downward), the user feels as though they are being pushed forward (or up).

In some embodiments, the magnitude of the change in state of dynamic element 216 and/or dynamic element 218 is proportional to the magnitude of the motion. For example, in response to motion in the direction of motion 208e, but with greater magnitude, the state of dynamic element 216 and/or dynamic element 218 changes in the same direction, but by a greater amount, than as shown in FIG. 2N (e.g., the fill state is changed for graphical elements 216d, 216e, 216f, 218a, 218b, and 218c).

Similar to dynamic element 206 described with reference to FIGS. 2D-2F, in some embodiments, dynamic element 216 and/or dynamic element 218 is independent from other displayed content, such as content 204. For example, content 204 can be navigated, modified, scrolled, and/or changed (e.g., as shown in FIGS. 2D-2F) independently of (e.g., without affecting) dynamic element 216 and/or dynamic element 218.

In some embodiments, the state of dynamic element 216 is independent from the display of content 204. For example, in FIGS. 2N and 2O, dynamic element 216 changes state based on motion 208e and motion 208f without affecting content 204 (e.g., content 204 does not change or move in FIGS. 2N and 2O based on motion 208e, motion 208f, or the change in state of dynamic element 216). Similarly, the state of dynamic element 218 is independent from the display of content 204. For example, in FIGS. 2N and 2O, dynamic element 218 changes state based on motion 208e and motion 208f without affecting content 204 (e.g., content 204 does not change or move in FIGS. 2N and 2O based on motion 208e, motion 208f, or the change in state of dynamic element 218).

Conversely, a user can change and/or navigate content 204 without affecting the state of dynamic element 216 and/or dynamic element 218. For example, in response to detecting a request (e.g., input 210a shown in FIG. 2D) to navigate content 204, computer system 200 scrolls content 204 (e.g., as described with reference to FIGS. 2D and 2E) and maintains the state of dynamic element 216 and/or dynamic element 218. As another example, in response to detecting a request (e.g., selection of home button 212) to navigate to a different user interface (e.g., home screen 214, a user interface of a different application, a system user interface, and/or a watch face user interface), computer system displays a different user interface (e.g., as described with reference to FIGS. 2E and 2F) without changing the state of the dynamic element 216 and/or dynamic element 218. In this way, dynamic element 216 and/or dynamic element 218 are independent from the content displayed on display 202 (e.g., graphical objects and features other than dynamic element 216 and/or dynamic element 218).

In some embodiments, characteristics of dynamic elements 216 and/or 218 are configurable. These characteristics can include, e.g., the size, shape, spacing, and/or color of the individual elements of dynamic elements 216 and/or 218.

FIGS. 2P-2Q illustrate example techniques for mitigating discomfort caused by motion. The techniques described can help with motion comfort while a user is viewing and/or interacting with content displayed on an electronic device.

In FIG. 2P, content 204 (e.g., the content shown in FIGS. 2A-2O) and dynamic element 220 are displayed. Dynamic element 220 includes first portion 220a (e.g., an upper portion), second portion 220b (e.g., a lower portion), and boundary 220c (e.g., a line) between first portion 220a and second portion 220b. In some embodiments, first portion 220a, second portion 220b, and boundary 220c are included in a circular region (e.g., as shown in FIGS. 2P and 2Q) or a region that has another shape (e.g., rectangular, square, or triangular). In some embodiments, dynamic element 220 is overlaid on content 204 (e.g., as shown in FIG. 2P). In some embodiments, dynamic element 220 is displayed behind content 204 (e.g., content 204 is overlaid on dynamic element 220 and/or dynamic element 220 is displayed in a background and/or as a background element).

In some embodiments, dynamic element 220 is displayed at or near the bottom of display 202 (e.g., as shown in FIG. 2P). In some embodiments, dynamic element 220 is displayed at or near the top of display 202. In some embodiments, dynamic element 220 is displayed at or near the middle of display 202 (e.g., relative to the top and bottom of display 202). In some embodiments, dynamic element 220 is displayed at or near the left side of display 202. In some embodiments, dynamic element 220 is displayed at or near the right side of display 202 e.g., as shown in FIG. 2P). In some embodiments, dynamic element 220 is displayed at or near the middle of display 202 (e.g., relative to the left side and right side of display 202).

Dynamic element 220 is affected by detected motion such that the position and/or orientation of boundary 220c changes in response to and/or in accordance with detected motion. In some embodiments, dynamic element 220 according to a physical model that simulates the motion of water in a container as the container is moved. The water can "slosh" around according to the motion. In some embodiments, dynamic element 220 changes based on motion of a vehicle (e.g., a vehicle in which (or on which) computer system 200 or a user of computer system 200 is located), motion of a user of computer system 200, motion of computer system 200 itself, and/or virtual or simulated motion (e.g., motion that the user is intended to perceive, but does not physically experience). In FIG. 2P, dynamic element 220 is in a neutral state because there is no motion affecting dynamic element 220. In FIG. 2P (e.g., in the neutral state), boundary 220c is horizontal and in the middle of dynamic element 220 (from top to bottom).

FIG. 2Q illustrates example motions 222a-222g and corresponding states 224a-224g of dynamic element 220. Motion 222a corresponds to motion with constant velocity (e.g., no acceleration). In response to motion 222a, dynamic element 220 has state 224a (e.g., the neutral state) described with reference to FIG. 2P. Motion 222b corresponds to breaking (e.g., slowing down) motion with decreasing velocity (e.g., deceleration or backward acceleration solely in the backward or longitudinal direction). In response to motion 222b, dynamic element 220 has state 224b in which boundary 220c is higher (e.g., boundary 220c is more towards the top of dynamic element 220; first portion 220a is smaller; second portion 220b is larger) compared to state 224a (e.g., the "water" has sloshed forward due to the deceleration). Because there is no lateral motion, boundary 220c is horizontal in state 224b.

Motion 222c corresponds to forward, upward, or longitudinal acceleration (e.g., speeding up solely in the longitudinal direction). In response to motion 222c, dynamic element 220 has state 224c in which boundary 220c is lower (e.g., boundary 220c is more towards the bottom of dynamic element 220; first portion 220a is larger; second portion 220b is smaller) compared to state 224a (e.g., the "water" has sloshed backward due to the forward acceleration). Because there is no lateral motion, boundary 220c is horizontal in state 224c.

Motion 222*d* corresponds to a first amount of lateral acceleration to the left (e.g., a slight left turn; acceleration solely in the leftward direction; no longitudinal acceleration). In response to motion 222*d*, dynamic element 220 has state 224*d* in which boundary 220*c* is oriented counterclockwise (e.g., boundary 220*c* is tilted or rotated counterclockwise; first portion 220*a* is the same size; second portion 220*b* is the same size) compared to state 224*a* (e.g., the "water" has sloshed upward on the right side of dynamic element 220 and downward on the left side of dynamic element 220, in the opposite direction or away from the direction of acceleration). Because there is no longitudinal acceleration, the size of first portion 220*a* and the size of second portion 220*b* are the same as in state 224*a* (e.g., first portion 220*a* and second portion 220*b* are the same size as one another).

Motion 222*e* corresponds to a second amount of lateral acceleration to the left (e.g., a greater amount of lateral acceleration to the left compared to motion 222*d*; a tighter or harder left turn compared to motion 222*d*; acceleration solely in the leftward direction; no longitudinal acceleration). In response to motion 222*e*, dynamic element 220 has state 224*e* in which boundary 220*c* is oriented further counterclockwise (e.g., boundary 220*c* is tilted or rotated further counterclockwise; first portion 220*a* is the same size; second portion 220*b* is the same size) compared to state 224*e* (e.g., the "water" has sloshed further upward on the right side of dynamic element 220 and further downward on the left side of dynamic element 220, in the opposite direction or away from the direction of acceleration). Because there is no longitudinal acceleration, the size of first portion 220*a* and the size of second portion 220*b* are the same as in state 224*a* (e.g., first portion 220*a* and second portion 220*b* are the same size as one another).

Motion 222*f* corresponds to a first amount of lateral acceleration to the right (e.g., a slight right turn; acceleration solely in the rightward direction; no longitudinal acceleration). In response to motion 222*f*, dynamic element 220 has state 224*f* in which boundary 220*c* is oriented clockwise (e.g., boundary 220*c* is tilted or rotated clockwise; first portion 220*a* is the same size; second portion 220*b* is the same size) compared to state 224*a* (e.g., the "water" has sloshed upward on the left side of dynamic element 220 and downward on the right side of dynamic element 220, in the opposite direction or away from the direction of acceleration). Because there is no longitudinal acceleration, the size of first portion 220*a* and the size of second portion 220*b* are the same as in state 224*a* (e.g., first portion 220*a* and second portion 220*b* are the same size as one another).

Motion 222*g* corresponds to a second amount of lateral acceleration to the right (e.g., a greater amount of lateral acceleration to the right compared to motion 222*f*; a tighter or harder right turn compared to motion 222*f*; acceleration solely in the leftward direction; no longitudinal acceleration). In response to motion 222*g*, dynamic element 220 has state 224*g* in which boundary 220*c* is oriented further clockwise (e.g., boundary 220*c* is tilted or rotated further clockwise; first portion 220*a* is the same size; second portion 220*b* is the same size) compared to state 224*f* (e.g., the "water" has sloshed further upward on the left side of dynamic element 220 and further downward on the right side of dynamic element 220, in the opposite direction or away from the direction of acceleration). Because there is no longitudinal acceleration, the size of first portion 220*a* and the size of second portion 220*b* are the same as in state 224*a* (e.g., first portion 220*a* and second portion 220*b* are the same size as one another).

Similar to dynamic element 206 described with reference to FIGS. 2D-2F, in some embodiments, dynamic element 220 is independent from other displayed content, such as content 204. For example, content 204 can be navigated, modified, scrolled, and/or changed (e.g., as shown in FIGS. 2D-2F) independently of (e.g., without affecting) dynamic element 220. In some embodiments, the dynamic element (e.g., dynamic element 206, 215, 216, 218, and/or 220) can update concurrently with (but independently) from displayed content. For example, the dynamic element can update in response to motion concurrently while navigating content.

In some embodiments, the dynamic element (e.g., dynamic element 206, 215, 216, 218, and/or 220) is displayed behind other content (e.g., as a background element). For example, in FIGS. 2A-2L, dynamic elements 206 and 215 are displayed behind content 204. In some embodiments, the dynamic element (e.g., dynamic element 206, 215, 216, 218, and/or 220) is displayed in front of other content (e.g., as a foreground element). For example, in FIGS. 2M-2P, dynamic elements 2216, 218, and 220 are displayed in front of content 204.

In some embodiments, dynamic element 206 (or one or more portions thereof, such as, e.g., 206*a*1, 206*a*2, 206*b*1, 206*b*2, 206*c*1, 206*c*2, 206*d*1, and/or 206*d*2), dynamic element 215, dynamic element 216 (or one or more portions thereof, such as, e.g., 216*a*, 216*b*, 216*c*, 216*d*, 216*e*, and/or 216*f*), dynamic element 218 (or one or more portions thereof, such as, e.g., 218*a*, 218*b*, 218*c*, 218*d*, 218*e*, and/or 218*f*), and/or dynamic element 220 (or one or more portions thereof, such as, e.g., 220*a*, 220*b*, and/or 220*c*) includes a three-dimensional object (e.g., a virtual three-dimensional object).

Figure 3:
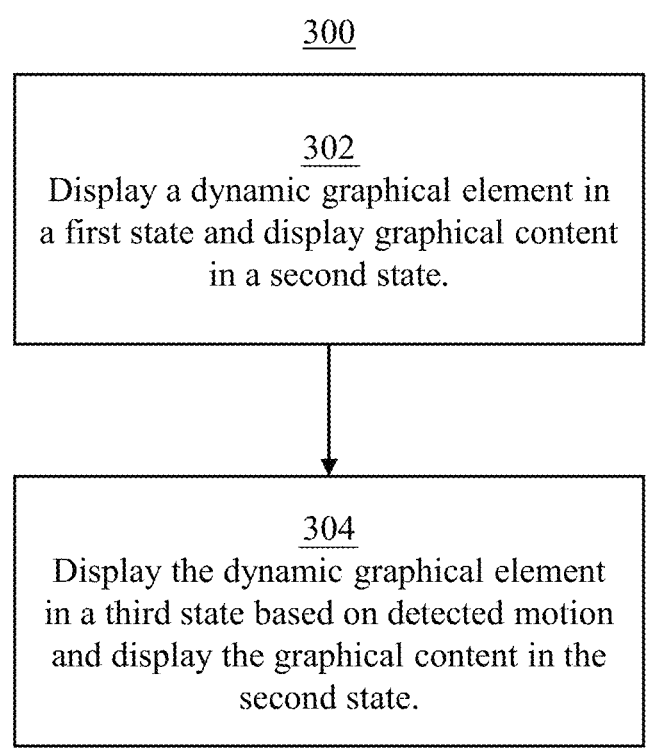
FIG. 3 is a flow diagram that illustrates a method for displaying user interfaces based on detected motion according to some embodiments.

The user interfaces in FIGS. 2A-2Q are used to illustrate the methods described below, including the methods in FIG. 3. FIG. 3 is a flow diagram that illustrates method 300 for displaying user interfaces based on detected motion according to some embodiments. In some embodiments, method 300 is performed at a computer system (e.g., a desktop computer, a laptop computer, a tablet computer, a smartphone, a smartwatch, a television, a monitor, a head-mounted display system, a virtual reality device, and/or an augmented reality device) that is in communication with a display (e.g., a monitor, a touch-sensitive display, a head-mounted display, a three-dimensional display, and/or a projector). Some operations in method 300 are, optionally, combined, the orders of some operations are, optionally, changed, and some operations are, optionally, omitted.

At block 302, a dynamic graphical element (e.g., 206, 215, 216, 218, and/or 220) (e.g., a virtual object, a two-dimensional object, and/or a three-dimensional object) and graphical content (e.g., 204 and/or 214) (e.g., virtual content, two-dimensional content, and/or three-dimensional content) are displayed (e.g., concurrently displayed; via a monitor, a touch-screen, a holographic display, and/or a head-mounted display). The dynamic graphical element is displayed in a first state (e.g., the state of 206 in FIG. 2A; the state of 215 in FIG. 2G; the state of 216 and/or 218 in FIG. 2M; and/or the state of 220 in FIG. 2P) (e.g., a static state, a dynamic state, a first position, a first orientation, a first size, a first color, a first shape, a first motion, and/or a first configuration). The graphical content is displayed in a second state (e.g., the state of 204 in FIG. 2A). In some embodiments, the graphical content includes, e.g., a home screen, a messaging application, an email application, a web browser, a word processing application, a presentation application, an audio application, a video application, and/or content thereof. In some embodiments, the second state includes, e.g., a static state, a dynamic state (such as displaying video or scrolling), a second position, a second orientation, a second size, a second color, a second shape, a second motion, and/or a second configuration). In some embodiments, the graphical content is separate and distinct from the dynamic graphical element (e.g., the graphical content does not include the dynamic graphical element, and the dynamic graphical element does not include the graphical content). In some embodiments, manipulating (e.g., scrolling, zooming, panning, closing, and/or navigating) the graphical content does not affect the dynamic graphical element (e.g., does not affect the state of the dynamic graphical element and/or does not cause the dynamic graphical element (or the state of the dynamic graphical element) to change).

At block 304, while displaying the graphical content in the second state, the graphical content is displayed in the second state (e.g., the state of 204 in FIG. 2B) (e.g., maintaining the state of the graphical content, maintaining the position, orientation, size, color, shape, motion, and/or configuration of the graphical content) and the dynamic graphical element is displayed (e.g., concurrently with the graphical content in the second state) in a third state (e.g., the state of 204 in FIG. 2B or 2C; the state of 215 in FIG. 2H or 2I; the state of 216 and/or 218 in FIG. 2N or 2O; and/or the state of 220 in FIG. 2Q) (e.g., a static state, a dynamic state, a third position, a third orientation, a third size, a third color, a third shape, a third motion, and/or a third configuration). In some embodiments, the third state is different from the first state (e.g., the position, orientation, size, color, shape, motion, and/or configuration of the dynamic graphical element is changed; the state of the dynamic graphical element is changed). In some embodiments, the third state (or a difference between the third state and the first state) is based on detected motion (e.g., 208*a*, 208*b*, 208*c*, 208*d*, 208*e*, 208*f*, 222*a*, 222*b*, 222*c*, 222*d*, 222*e*, 222*f*, 222*g*, 404*a*, 404*b*, 404*c*1, 404*d*, 404*e*, 406*a*, 406*b*, 406*c*, 612, 616, 618, 620, 812, 814, 816, 818, 820, and/or 822) (e.g., speed, velocity, acceleration, rotation, and/or vibration; motion of a vehicle) (e.g., the state of the dynamic graphical element is independent from the state of the graphical content; the state of the graphical content is not (e.g., does not change) based on the movement of the vehicle).

In some embodiments, in accordance with (or in response to) a determination that the detected motion includes first motion, the third state has a first set of parameters; and in accordance with a determination that the detected motion includes second motion that is different from the first motion, the third state has a second set of parameters that is different from the first set of parameters. In some embodiments, data associated with detected motion is received, and the dynamic graphical element is displayed in the third state (e.g., the state of the dynamic graphical element is changed) in response to receiving the data associated with detected motion. In some embodiments, the method is performed at a computer system such as, e.g., a desktop computer, a laptop computer, a tablet computer, a smartphone, a smartwatch, and/or a headset (e.g., a headset that includes a display and/or speakers; a virtual reality or augmented reality headset).

In some embodiments, the dynamic graphical element includes a plurality of graphical objects (e.g., 206) (e.g., blurry circles) that move concurrently with one another. In some embodiments, the plurality of graphical objects are arranged in a two-dimensional array. In some embodiments, the plurality of graphical objects are periodically spaced. In some embodiments, the plurality of graphical objects maintain their positions relative to each other as they change state (e.g., as they move, as they change from the first state to the third state, and/or the entire grid moves together). In some embodiments, the plurality of graphical objects are in an infinite grid (e.g., the plurality of graphical objects do not appear to have a beginning/end in horizontal or vertical direction). In some embodiments, the dynamic graphical element includes a single graphical element (e.g., 215) (e.g., a circular element and/or a representation of a sphere). In some embodiments, the dynamic graphical element simulates a mass on a spring that is subject to the detected motion. In some embodiments, the dynamic graphical element moves according to a physical model of a mass on a spring.

In some embodiments, the dynamic graphical element includes a first element (e.g., 216) (e.g., a set of subelements, a set of dots, and/or a bar) that is aligned along a first display dimension (e.g., a first dimension relative to a display; horizontally on display 202 as oriented in FIG. 2M), and wherein the first element has a first visual state (e.g., color or fill state; the state of 216 in FIG. 2M, 2N, or 2O) along the first display dimension that is based on a component of the detected motion in a first physical dimension. In some embodiments, the dynamic graphical element includes a second element (e.g., 218) (e.g., a set of sub-elements, a set of dots, and/or a bar) that is aligned along a second display dimension (e.g., a second dimension relative to a display; vertically on display 202 as oriented in FIG. 2M) that is different from (e.g., perpendicular to) the first display dimension, and wherein the second element has a second visual state (e.g., color or fill state) along the second display dimension that is based on a component of the detected motion in a second physical dimension that is different from (e.g., perpendicular to) the first physical dimension.

In some embodiments, the dynamic graphical element (e.g., 220) includes a boundary (e.g., 220*c*), wherein a position (e.g., spatial location and/or angular orientation) of the boundary is based on the detected motion. In some embodiments, the boundary is between a first portion of the dynamic graphical element and a second portion of the dynamic graphical element. In some embodiments, the boundary is a straight line. In some embodiments, a spatial position (e.g., height) of the boundary is based on a component of the detected motion in a first dimension, and an angular orientation of the boundary is based on a component of the detected motion in a second dimension (e.g., perpendicular to the first dimension). In some embodiments, the boundary simulates a water line (e.g., a surface of water in a bucket that is subject to the detected motion).

In some embodiments, while displaying the dynamic graphical element in the third state, a request (e.g., 210*a*, 210*b*, 210*c*, and/or 210*d*) (e.g., an input corresponding to a request) to change the graphical content (e.g., move the graphical content, scroll the graphical content, and/or display different graphical content such as a different user interface) is detected. In some embodiments, in response to detecting the request to change the graphical content, the graphical content is displayed in a fourth state (e.g., the state of 204 in FIG. 2E or 2K; 214 in FIG. 2F or 2L) that is different from the second state, and the dynamic graphical element is displayed in the third state (e.g., the state of 206 in FIG. 2A or 2D) (e.g., concurrently with the graphical content in the fourth state).

In some embodiments, the detected motion includes an acceleration (e.g., a change in velocity, a linear acceleration, and/or an angular acceleration). In some embodiments, the detected motion includes a change in location (e.g., spatial location). In some embodiments, the third state of the dynamic graphical element is in a direction relative to the first state of the dynamic graphical element that is based on a direction of the detected motion. In some embodiments, the direction of the third state relative to the first state is the same as the direction of the detected motion. In some embodiments, the direction of the third state relative to the first state is opposite of the direction of the detected motion. In some embodiments, in accordance with a first direction of detected motion, the third state is in a first direction relative to the first state; and in accordance with a second direction of detected motion that is different from the first direction of detected motion, the third state is in a second direction relative to the first state that is different from the first direction relative to the first state.

In some embodiments, the third state of the dynamic graphical element is different from the first state of the dynamic graphical element by an amount (e.g., a distance) that is based on a magnitude of the detected motion. In some embodiments, the amount is directly proportional to the magnitude of the detected motion. In some embodiments, in accordance with a first magnitude of detected motion, the amount is a first amount; and in accordance with a second magnitude of detected motion that is different from the first magnitude of detected motion, the amount is a second amount that is different from the first amount (e.g., if the second magnitude is greater than the first magnitude, then the second amount is greater than the first amount; if the second magnitude is less than the first magnitude, then the second amount is less than the first amount). In some embodiments, the detected motion is motion of an external object (e.g., 400, 401, 600, and/or 800) (e.g., an object external to a device that displays the graphical content and the dynamic graphical element). In some embodiments, the external object is a platform, vehicle, car, bus, train, plane, or boat.

In some embodiments, the dynamic graphical element is displayed in a foreground (e.g., 216 and/or 218 in FIG. 2M-2O; 220 in FIG. 2P) (e.g., of a user interface, in front of the graphical content; the dynamic graphical content is overlaid on the graphical content). In some embodiments, the dynamic graphical element is displayed in a background (e.g., 206 in FIGS. 2A-2F; 215 in FIGS. 2G-2L) (e.g., of a user interface; behind the graphical content; the graphical content is overlaid on or in front of the dynamic graphical element).

In some embodiments, one or more characteristics (e.g., visual characteristic, size, shape, color, pattern, brightness, opacity, and/or effect) of the dynamic graphical element is based on the graphical content. For example, in accordance with (or, in some embodiments, in response to) a determination that the graphical content includes a first application (e.g., a web page), the dynamic graphical element is displayed (e.g., automatically displayed, without user input) with a first set of one or more characteristics; and in accordance with (or, in some embodiments, in response to) a determination that the graphical content includes a second application (e.g., a movie or video) that is different from the first application, the dynamic graphical element is displayed (e.g., automatically displayed, without user input) with a second set of one or more characteristics that is different from the first set of one or more characteristics (e.g., the computer system displays dynamic element 206, dynamic element 216, and/or dynamic element 218 when the graphical content includes a web page and displays dynamic element 215 or dynamic element 220 when the graphical content includes a video). In some embodiments, the computer system changes a visual characteristic (e.g., size, shape, color, pattern, opacity, and/or effect) of the dynamic graphical element and/or changes from one type of dynamic graphical element (e.g., 206 or 215) to another type of dynamic graphical element (e.g., 215 or 220) based on a change in context such as, e.g., a change in user activity (e.g., from reading to playing a game) and/or a change in the graphical content from one type of content (e.g., a web page, article, or book) to another type of content (e.g., a video or movie).

In some embodiments, one or more characteristics (e.g., visual characteristic, size, shape, color, pattern, brightness, opacity, and/or effect) of the dynamic graphical element is based on user feedback such as, e.g., feedback about the user (e.g., a measured wellbeing of the user and/or a physical state of the user detected by one or more sensors) and/or feedback received from the user (e.g., via user input). For example, in response to receiving first user feedback (e.g., a first measured state of the user and/or first user input), the dynamic graphical element is displayed with a first set of one or more characteristics; and in response to receiving second user feedback (e.g., a second measured state of the user and/or second user input that is different from the first user feedback, the dynamic graphical element is displayed with a second set of one or more characteristics that is different from the first set of one or more characteristics. In some embodiments, the computer system changes a visual characteristic (e.g., size, shape, color, pattern, opacity, and/or effect) of the dynamic graphical element and/or changes from one type of dynamic graphical element (e.g., 206 or 215) to another type of dynamic graphical element (e.g., 215 or 220) in response to receiving user feedback.

In some embodiments, one or more characteristics (e.g., visual characteristic, position, velocity, movement, direction, orientation, size, shape, color, pattern, brightness, opacity, and/or effect) of the dynamic graphical element is based on a duration of detected motion. For example, in accordance with (or, in some embodiments, in response to) detecting motion with a first duration, the computer system displays the dynamic graphical element with a first set of one or more characteristics; and in accordance with (or, in some embodiments, in response to) detecting motion with a second duration different from the first duration, the computer system displays the dynamic graphical element with a second set of one or more characteristics that is different from the first set of one or more characteristics. In some embodiments, the computer system changes a visual characteristic (e.g., position, velocity, direction, size, shape, color, pattern, opacity, and/or effect) of the dynamic graphical element as detected motion progresses.

In some embodiments, the computer system displays the dynamic graphical element in either a background or a foreground (e.g., relative to the graphical content) depending on a magnitude (e.g., velocity and/or acceleration) of detected motion. For example, in accordance with (or, in some embodiments, in response to) detecting motion with a first magnitude (e.g., a magnitude that exceeds a threshold magnitude), the computer system displays the dynamic graphical element in a foreground; and in accordance with (or, in some embodiments, in response to) detecting motion with a second magnitude (e.g., a magnitude that does not exceed the threshold magnitude) different from the first magnitude, the computer system displays the dynamic graphical element in a background. In some embodiments, the computer system switches the dynamic graphical element between a foreground and a background (e.g., from the background to the foreground or from the foreground to the background), in response to a change in magnitude of the motion (e.g., move the dynamic graphical element from the background to the foreground when the magnitude of the motion increases above a threshold and move the dynamic graphical element from the foreground to the background when the magnitude of the motion decreases below the threshold).

In some embodiments, tactile output is generated (e.g., created and/or output) (e.g., via a tactile output device) based on (e.g., in response to detecting) the detected motion. In some embodiments, a characteristic (e.g., amplitude, duration, pattern, and/or frequency) of the tactile output is based on (e.g., proportional to) a value (e.g., direction, velocity, acceleration, speed, magnitude, rotation, and/or frequency) of the detected motion. In some embodiments, the tactile output is generated concurrently (e.g., coordinated) with setting the state of the dynamic graphical element. In some embodiments, the tactile output is generated by a tactile output device of the computer system. In some embodiments, the tactile output is generated by a tactile output device of a platform (e.g., a vehicle) in which the computer system is located and/or associated with. In some embodiments, the tactile output includes adjusting a suspension system (e.g., an active suspension system), vibrating a seat, adjusting (e.g., quickly tightening and/or loosening) a seat belt, and/or vibrating a steering wheel.

Details of the features described above with respect to method 300 (e.g., FIG. 3) are also applicable in an analogous manner to the methods described below. For example, method 500, 700, and/or 900 optionally include one or more of the characteristics of the various methods described above with reference to method 300.

Figure 4A:
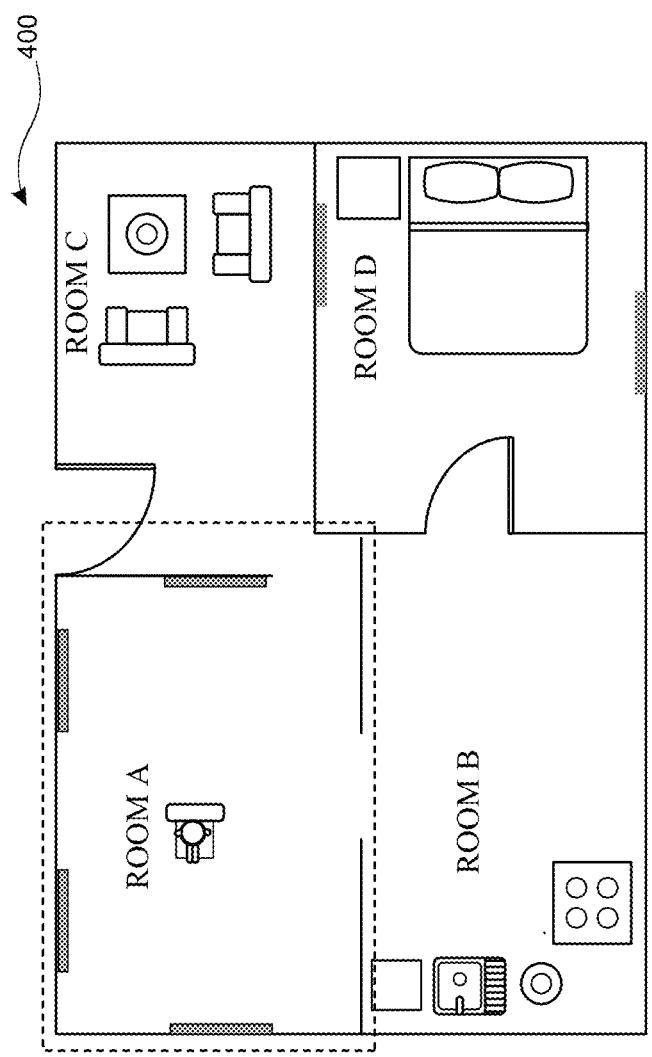

FIGS. 4A-4H illustrate example techniques for tinting windows, in accordance with some embodiments. FIG. 4A illustrates an overhead view of environment 400 (e.g., an apartment, house, smart home, platform, or vehicle). Environment 400 includes one or more areas (e.g., Rooms A-D) including environment 401 (e.g., an office, living room, bedroom, or gym). In some embodiments, the techniques described herein for environment 401 are applied to other environments such as, for example, other rooms or areas of environment 400, a platform, a vehicle, or a theater. For example, in some embodiments, environment 400 is a mobile platform (e.g., a vehicle) that includes one or more interior portions (e.g., a cabin) and one or more windows with adjustable tint controls. In some embodiments, environment 401 is a cabin of a vehicle that includes windows with adjustable tint. In some embodiments, environment 400 includes a home automation platform and/or a smart home platform that controls one or more functions and/or characteristics of a home, a house, and/or a building.

In FIGS. 4B-4H, environment 401 includes windows 402a, 402b1, 402b2, and 402c (collectively referred to as windows 402). Window 402b1 and window 402b2 are collectively referred to as windows 402b. For the purpose of explanation, window 402a is described as a front window (e.g., a front windshield) or as being on a front wall or front side of environment 401; windows 402b are described as side windows, right side windows, or as being on a side wall or right side of environment 401; and window 402c is described as a rear window (e.g., a rear windshield) or as being on a rear wall or rear side of environment 401. In some embodiments, windows 402b are on a front side of environment 401, window 402a is on a left side of environment 401, and window 402c is on a right side of environment 401. In some embodiments, environment 401 includes one or more windows on the side of environment 401 opposite windows 402b (e.g., a left side of environment 401).

The tint level (e.g., opaqueness or darkness) of windows 402 can be controlled such that different windows can have different tint levels, the tint level can vary over an individual window, and the tint level can change over time (e.g., for individual windows, for a subset of the windows, or collectively for all of the windows). As used herein, a tint level refers to how dark a window or window tinting appears. For example, a greater tint level appears darker than a lower tint level. Similarly, increasing a tint level makes the tint darker, and decreasing a tint level makes the tint lighter. In some embodiments, the tint state (e.g., tint level and/or tint level pattern) of windows 402 is controlled electronically by a computer system or controller, such as system 100 or a portion thereof.

In some embodiments, the tint level of windows 402 is based on an event, such as, e.g., a current event, an expected event, a position event, a motion event, and/or a sound event. A current event is an event that is currently occurring. An expected event is an event that is estimated to occur at a future time. A position event can include a physical or virtual position of an object (e.g., external to environment 401 or internal to environment 401), a physical position of environment 401, a virtual position of environment 401, a physical position of a person in environment 401, and/or a position of a person in environment 401. A motion event is an event that includes motion of an object (e.g., external to environment 401 or internal to environment 401), physical motion of environment 401, virtual motion of environment 401, physical motion of a person in environment 401, and/or virtual motion of a person in environment 401. A sound event is an event that includes sound (e.g., a horn honking, an ambulance siren, and/or a crash).

Figure 4B:
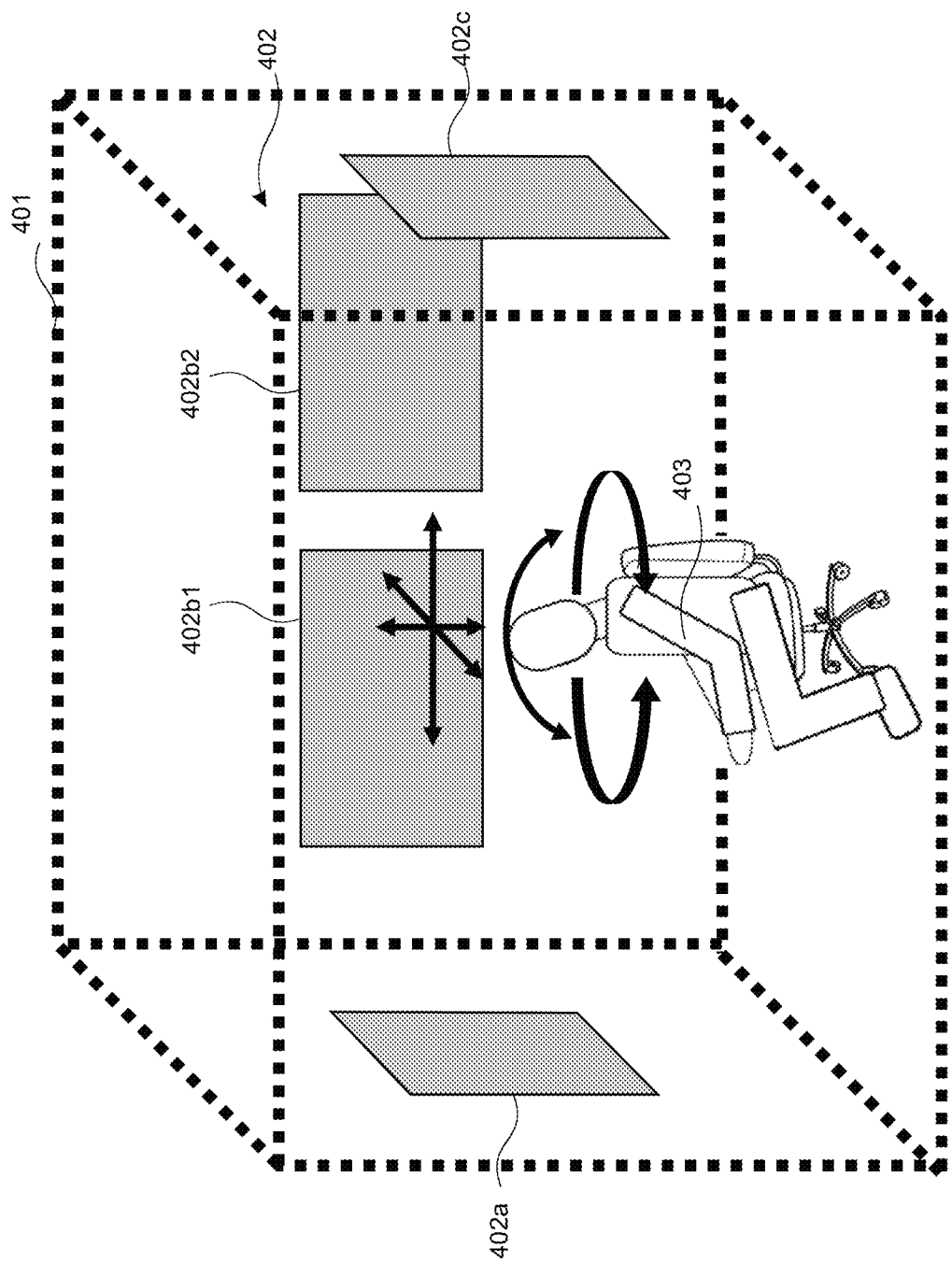

FIG. 4B illustrates a perspective view of environment 401 without the other portions of environment 400 illustrated in FIG. 4A. In FIG. 4B, person 403 is sitting in a moveable chair that enables person 403 to move in various directions in (or relative to) environment 401, as indicated by the arrows above and around person 403. In FIG. 4B, windows 402 have a uniform tint level (e.g., windows 402 all have the same tint level).

In FIG. 4C1, event 404a occurs (e.g., is detected). Event 404a is forward movement of the user and/or environment 401. Forward movement 404a includes motion (e.g., velocity and/or acceleration) in the forward direction relative to environment 401 (e.g., environment 401 and/or person 403 are physically or virtually moving forward). In response to forward movement 404a, the tint of windows 402 is changed in accordance with the motion such that the tint appears to move with the motion (e.g., the motion of the user and/or the environment). For example, when forward movement 404a begins, the tint of window 402b1 at (or, optionally, within a threshold distance of) a location of the user begins to be reduced (e.g., gradually over time) to create a tint pattern (e.g., a vertical line or bar with a reduced tint level) on the right side of window 402b1, as shown in FIG. 4C1. As forward movement 404a continues in FIG. 4C2, the location of the tint pattern moves forward (e.g., with forward movement 404a) to the middle of window 402b1. In FIG. 4C2, as forward movement 404a continues further, the tint pattern continues to move forward to front window 402a such that front window 402a has (e.g., is set to) a lower tint level than windows 402b and window 402c (e.g., the tint level of window 402a is reduced and the tint level of windows 402b and window 402c remains unchanged or is increased compared to FIG. 4B).

FIGS. 4C1-4C3 illustrate that the tint of a window (or a portion of a window) can vary gradually (e.g., between 100 percent tint to zero percent tint) over time and/or over the position on a window. For example, in some embodiments, the tint of the middle of window 402b1 varies gradually over time from 50 percent in FIG. 4C1, to zero percent in FIG. 4C2, to 100 percent in FIG. 4C3. The tint of window 402b1 also varies over the position of window 402b1. For example, in some embodiments, the tint of window 402b1 in FIG. 4C2 varies gradually with position from 100 percent tint on the left, to zero percent in the middle, and back to 100 percent on the right. In some embodiments, the tint pattern shown in FIGS. 4C1-4C3 creates a gradual wave of lightening and darkening that moves over time in accordance with the motion of the user and/or environment 401. Adjusting the tint of windows 402 as described in FIGS. 4C1-4C3 provides a visual effect that is consistent with forward movement 404a, which can make the movement comfortable for the user.

In FIGS. 4C1-4C3, event 406a occurs (e.g., is detected). In some embodiments, event 406a occurs instead of event 404a. In some embodiments, event 406a occurs concurrently with event 404a. In some embodiments, event 406a includes the presence and/or motion of an object (e.g., a person, animal, vehicle, obstruction, physical object, and/or virtual object) in the forward direction relative to environment 401. In some embodiments, event 406a includes a real or virtual sound event (e.g., a siren, an alarm, a person talking, an animal making a sound (such as a dog barking), and/or a sound that satisfies a set of sound criteria (such as amplitude, duration, and/or frequency criteria)). In some embodiments, event 406a includes a position (e.g., location and/or orientation) or detection of a position of environment 400, environment 401, and/or person 403 (e.g., relative to environment 400 and/or environment 401).

In some embodiments, environment 400 and/or environment 401 include one or more sensors that can detect an event (e.g., event 406a). In some embodiments, one or more remote sensors detect an event (e.g., event 406a) and transmit data representing the event to environment 400, environment 401, and/or a controller that controls the tint of windows 402.

In response to event 406a, the tint of windows 402 gradually changes in the direction of event 406a (e.g., in the same manner as in response to forward movement 404a). Producing a tint pattern that moves in the direction of an event provides a visual effect that is consistent with the motion so that the motion of event 406a is comfortable for person 403 and person 403 can anticipate further movement of event 406a.

In FIGS. 4D1-4D3, event 404b occurs (e.g., is detected). Motion event 404b is backward movement that includes motion (e.g., velocity and/or acceleration) in the backward direction relative to environment 401 (e.g., environment 401 and/or person 403 are physically or virtually moving backward). In response to backward movement 404b, the tint of windows 402 is changed in the same manner as in response to forward movement 404a, but in the opposite direction since backward movement 404b is in the opposite direction of forward movement 404a. For example, in some embodiments, as shown in FIGS. 4D1-4D2, the tint of windows 402 is changed in accordance with the motion such that the tint appears to move with the motion (e.g., the motion of the user and/or the environment). For example, when backward movement 404b begins, the tint of window 402b2 at (or, optionally, within a threshold distance of) a location of the user begins to be reduced (e.g., gradually over time) to create a tint pattern (e.g., a vertical line or bar with a reduced tint level) on the left side of window 402b2, as shown in FIG. 4D1. As backward movement 404b continues in FIG. 4D2, the location of the tint pattern moves backward (e.g., with backward movement 404a) to the middle of window 402b2. In FIG. 4D2, as backward movement 404b continues further, the tint pattern continues to move backward to rear window 402c such that rear window 402c has (e.g., is set to) a lower tint level than windows 402b and window 402a (e.g., the tint level of window 402c is reduced and the tint level of windows 402b and window 402a remains unchanged or is increased compared to FIG. 4B). In some embodiments, the tint pattern shown in FIGS. 4D1-4D3 creates a gradual wave of lightening and darkening that moves over time in accordance with the motion of the user and/or environment 401. Adjusting the tint of windows 402 as described in FIGS. 4D1-4D3 provides a visual effect that is consistent with backward movement 404b, which can make the movement comfortable for the user.

In FIG. 4D1, event 406b starts occurring (e.g., is initially detected) and continues in FIGS. 4D2 and 4D3. In some embodiments, event 406b occurs instead of event 404b. In some embodiments, event 406b occurs concurrently with event 404b. In some embodiments, event 406b includes the presence and/or motion of an object (e.g., a person, animal, vehicle, obstruction, physical object, and/or virtual object) in the backward direction relative to environment 401. In some embodiments, event 406b includes a real or virtual sound event (e.g., a siren, an alarm, a person talking, an animal making a sound (such as a dog barking), and/or a sound that satisfies a set of sound criteria (such as amplitude, duration, and/or frequency criteria)). In some embodiments, event 406b is a same type of event as event 406a.

In response to event 406b, the tint of windows 402 gradually changes in the direction of event 406b (e.g., in the same manner as in response to backward movement 406a). Producing a tint pattern that moves in the direction of an event provides a visual effect that is consistent with the motion so that the motion of event 406b is comfortable for person 403 and person 403 can anticipate further movement of event 406b.

In FIG. 4E1, event 404c begins (e.g., is initially detected) and continues in FIGS. 4E2-4E4. Motion event 404c includes motion (e.g., rotational velocity and/or acceleration) in the rightward (e.g., clockwise) direction relative to environment 401 (e.g., environment 401 and/or person 403 are physically or virtually turning toward the right side of environment 401).

In response to event 404c, the tint of windows 402 is gradually changed (e.g., varied over space and time) in accordance with the direction of motion event 404c. For example, in response to motion event 404c, the tint of window 402a (e.g., the window in the direction that person 403 is facing) and/or window 402b1 (e.g., a window in the direction that person 403 is moving) gradually begins to change over time (e.g., from 100 percent, to 80 percent, to 60 percent, to 40 percent, to 20 percent, or to zero percent). For example, in FIG. 4E1, the tint of front window 402a is reduced (e.g., gradually over time to 80 percent, 60 percent, 40 percent, 20 percent, or zero percent) and the tint of the left side of window 402b1 begins to be reduced. As person 403 continues to move (e.g., rotate), the tint changes in accordance with the position of person 403 and/or motion event 404c, as shown in FIGS. 4E2-4E4.

In FIG. 4F1, event 404d begins (e.g., is detected) and continues through FIGS. 4F2-4F4. Motion event 404d includes motion (e.g., linear velocity and/or acceleration) in the forward direction relative to environment 401 (e.g., environment 401 and/or person 403 are physically or virtually moving forward). In response to event 404*d*, the tint of windows 402 is gradually changed (e.g., varied over space and time) based on motion event 404*d*. For example, in response to motion event 404*d*, the tint of window 402*a* (e.g., the window in the direction of motion event 404*d*) and/or window 402*b*1 gradually begins to change over time (e.g., from 100 percent to 80 percent, to 60 percent, to 40 percent, to 20 percent, or to zero percent). For example, in FIG. 4F1, the tint of front window 402*a* is reduced (e.g., gradually over time to 80 percent, 60 percent, 40 percent, 20 percent, or zero percent) and the tint of the left side of window 402*b*1 begins to be reduced. As motion 404*d* continues, the tint pattern moves from the front of environment 401 to the back of environment 401, as shown in FIGS. 4F2-4F4. Moving the tint pattern from front to back provides the effect of the pattern moving past environment 401 and/or person 403 the way that objects would when environment 401 and/or person 403 is moving in the direction of motion event 404*d*.

FIG. 4G illustrates that the tint level of windows 402 can vary along different dimensions (e.g., along a dimension perpendicular to the dimension along which the tint level varies in FIGS. 4F1-4F4). For example, in FIG. 4G, the tint level varies from top to bottom of windows 402, whereas the tint level varies from left to right in FIGS. 4F1-4F4.

In FIG. 4G, event 404*e* occurs (e.g., is detected). Motion event 404*e* includes motion (e.g., linear velocity and/or acceleration) in the upward (e.g., vertical or floor to ceiling) direction relative to environment 401 (e.g., environment 401 and/or person 403 are physically or virtually moving upward). In some embodiments, event 404*e* includes (e.g., is and/or represents motion of a head of person 403 looking upward). In response to event 404*e*, windows 402 have (e.g., are set to) a tint state in which the tint increases in the opposite direction of the direction of event 404*e* (e.g., the tint gets darker from the top of windows 402 to the bottom of windows 402). Windows 402 are more transparent in the direction of event 404*e*, which provides person 403 with greater visibility in the direction of event 404*e* (e.g., the direction in which person 403 is looking and/or moving).

In FIG. 4G, event 406*c* occurs (e.g., is detected). In some embodiments, event 406*c* occurs instead of event 404*e*. In some embodiments, event 406*c* occurs concurrently with event 404*e*. In some embodiments, event 406*c* includes the presence and/or motion of an object (e.g., a person, animal, vehicle, obstruction, physical object, and/or virtual object) in the forward direction relative to environment 401. In some embodiments, event 406*c* includes a real or virtual sound event (e.g., a siren, an alarm, a person talking, an animal making a sound (such as a dog barking), and/or a sound that satisfies a set of sound criteria (such as amplitude, duration, and/or frequency criteria)). In some embodiments, event 406*c* is a same type of event as event 406*a* and/or 406*b*. In response to event 406*c*, windows 402 have (e.g., are set to) a tint state in which the tint decreases in the direction of event 406*c* (e.g., the tint gets lighter from the bottom of windows 402 to the top of windows 402). Windows 402 are more transparent in the direction of event 406*c*, which provides person 403 with greater visibility of event 406*c* and can direct the attention of person 403 toward event 406*c*.

In some embodiments, the tint level of windows 402 vary along two dimensions (e.g., top-to-bottom and left-to-right) in response to an event that has a component in two dimensions relative to environment 401 (e.g., an event that occurs above and in front of environment, an event that occurs below and to the left of environment 401, or an event that occurs in front and to the right of environment 401).

In FIG. 4G, the tint of windows 402*a*, 402*b*1, 402*b*2, and 402*c* (e.g., the tint of all windows in environment 401) changes in response to event 406*c*. In some embodiments, if event 406*e* occurs closer to windows 402*b*1 and 402*b*2 than to windows 402*a* and 402*c*, then the tint of windows 402*b*1 and/or 402*b*2 is changed (e.g., as in FIG. 4G) and the tint of windows 402*a* and/or 402*c* remains unchanged or is changed by a lesser amount than the tint of windows 402*b*1 and/or 402*b*2 (e.g., only the window (or windows) that are closest to event 406*c* change tint).

Figure 4H:
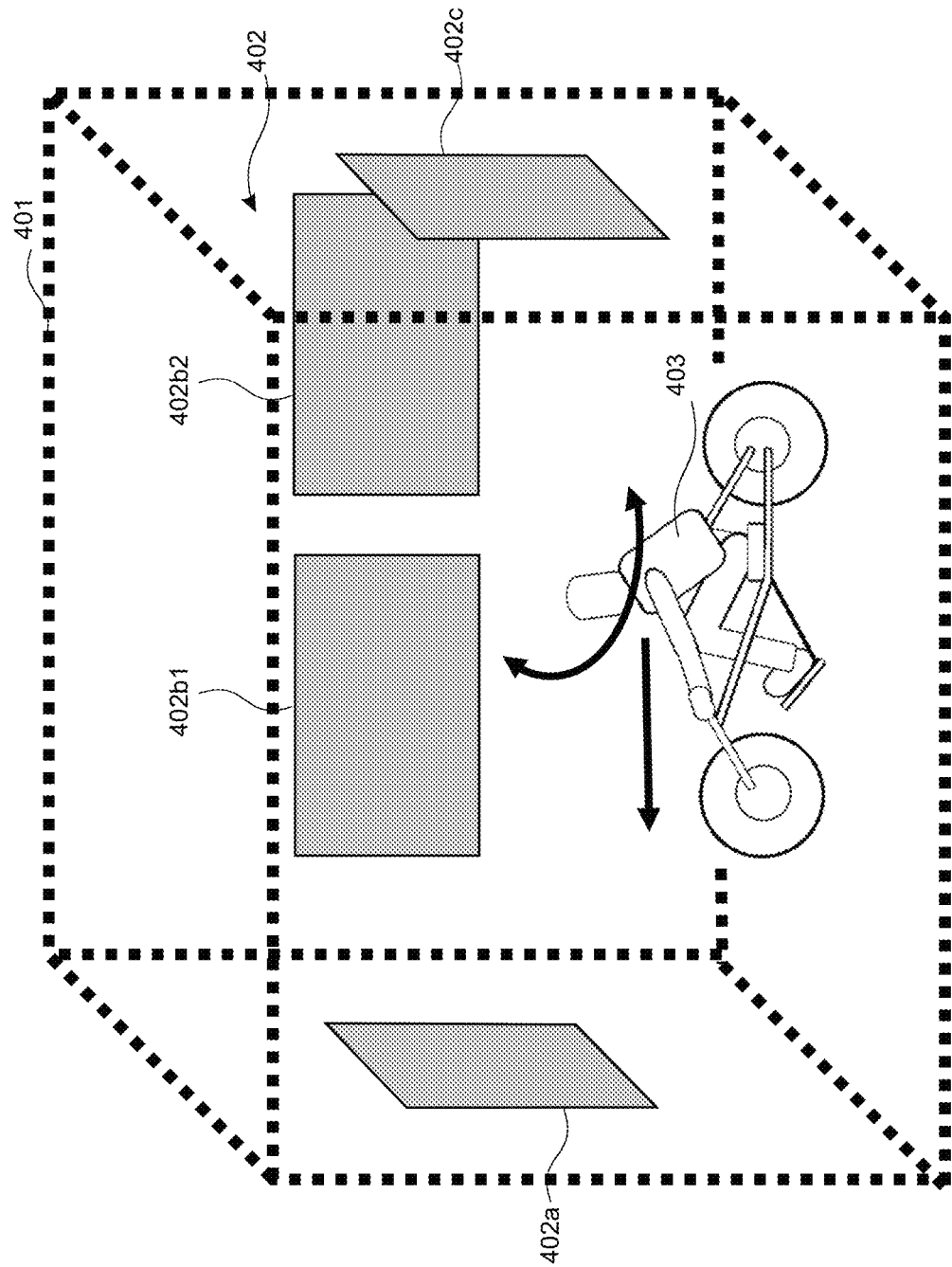

FIG. 4H illustrates person 403 in environment 401 but in a different context than in FIGS. 4A-4H. In particular, person 403 is interacting with (e.g., using, on, riding, and/or controlling) exercise equipment. In FIG. 4H, the exercise equipment includes a stationary bike. In some embodiments, the exercise equipment is a treadmill, such as a traditional treadmill on which the user is always oriented in the same direction during operation or a three-dimensional treadmill on which the user can orient themselves (e.g., turn) in different directions.

Various events can occur while person 403 is using the exercise equipment, which cause windows 402 to be set to (e.g., change to) various tint states. For example, moving forward on the exercise equipment (e.g., peddling the bike or running on a treadmill) corresponds to (e.g., is) an event in the forward direction (e.g., event 404*a*). In some embodiments, moving forward on the exercise equipment results in the state of windows 402 in FIG. 4C. In some embodiments, moving forward on the exercise equipment results in the state of windows 402 in FIGS. 4F1-4F4. In some embodiments, person 403 can steer left and right on the exercise equipment (e.g., using handlebars on the stationary bike and/or by tilting the bike, as indicated by the curved arrow in FIG. 4H). In some embodiments, steering to the right corresponds to an event in the rightward direction. In some embodiments, steering to the right results in the state of windows 402 in FIGS. 4E1-4E4. More generally, while person 403 is using the exercise equipment, windows 402 respond to events (e.g., events external to environment 401, person 403 looking in different directions, and/or physical or virtual motion) in the same manner (or an analogous manner) as described in FIGS. 4A-4G. For example, windows 402 can provide and/or supplement a virtual workout experience while person 403 is using the exercise equipment.

Figure 5:
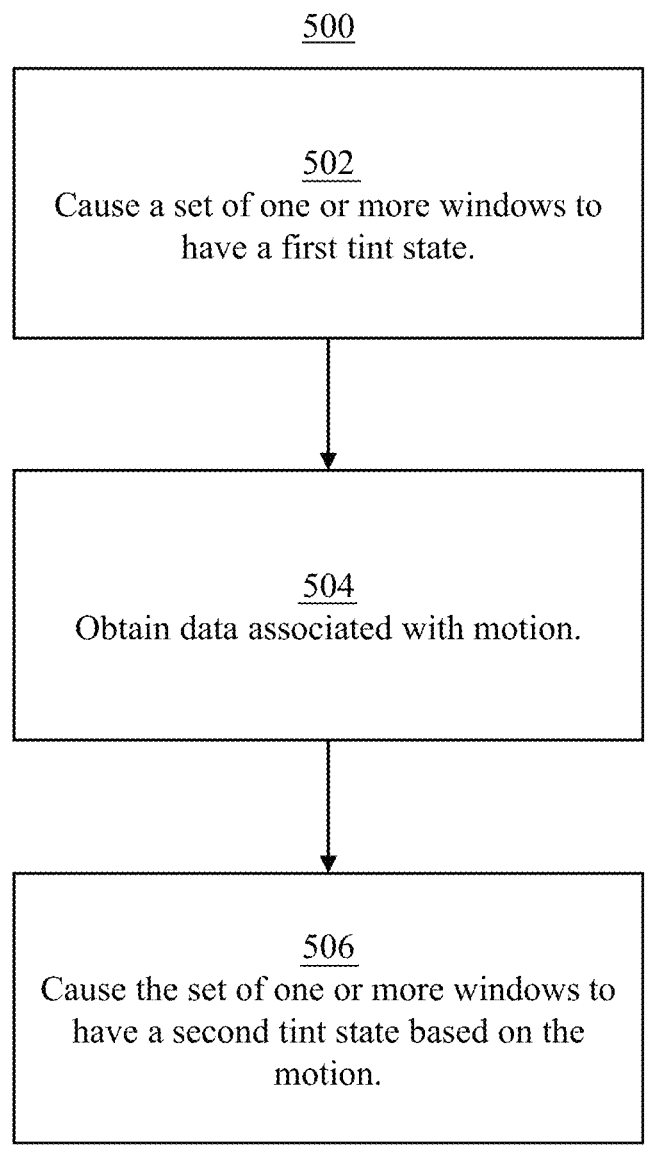
FIG. 5 is a flow diagram that illustrates a method for tinting windows according to some embodiments.

The user interfaces in FIGS. 4A-4H are used to illustrate the methods described below, including the methods in FIG. 5. FIG. 5 is a flow diagram that illustrates a method for tinting windows according to some embodiments. In some embodiments, method 500 is performed at least partially by a system (e.g., 100 or a portion thereof) that is in communication with elements that have adjustable tint states (e.g., windows 402). Some operations in method 500 are, optionally, combined, the orders of some operations are, optionally, changed, and some operations are, optionally, omitted.

At block 502, a set of one or more windows (e.g., 402) of a vehicle (e.g., 400, 401, 600, or 800) is caused (e.g., electronically, via a controller, automatically, and/or without user input) to have a first tint state (e.g., the tint state of windows 402 in FIG. 4B) (e.g., a tint level, a tint percent, opacity, opaqueness, absorption, reflectance, transmittance, a tint level over time, and/or a tint level that is a function of (e.g., depends on and/or is based on) the position on the set of one or more windows such that the tint level varies with position over a single window or over two or more windows). In some embodiments, the set of one or more widows is in communication with a controller that can control and/or program the tint of the set of one or more windows. In some embodiments, the tint defines (or is) the amount (e.g., percentage) of light that passes through a window or a portion of a window. In some embodiments, the amount of light that passes through a window depends on the frequency (or wavelength) of the light and/or the angle of incidence of the light.

At block 504, data associated with (e.g., indicative of and/or that represents) motion (e.g., 208*a*, 208*b*, 208*c*, 208*d*, 208*e*, 208*f*, 222*a*, 222*b*, 222*c*, 222*d*, 222*e*, 222*f*, 222*g*, 404*a*, 404*b*, 404*c*1, 404*d*, 404*e*, 406*a*, 406*b*, 406*c*, 612, 616, 618, 620, 812, 814, 816, 818, 820, and/or 822) (e.g., measured motion, detected motion, speed, velocity, acceleration, rotation, vibration, planned motion, expected motion, anticipated motion, a planned maneuver, an expected maneuver, and/or an anticipated maneuver) of the vehicle is obtained (e.g., received or detected).

At block 506, after (e.g., in response to) obtaining the data associated with the motion of the vehicle, the set of one or more windows is caused (e.g., electronically, via a controller, automatically, and/or without user input) to have a second tint state (e.g., the tint state of windows 402 in FIGS. 4C1-4C3, 4D1-4D3, 4E1-4E4, 4F1-4F4, and/or 4G) (e.g., increased tint, decreased tint, and/or a different tint pattern from the first tint state) that is different from the first tint state. In some embodiments, the second tint state (and/or, optionally, the difference between the second tint state and the first tint state (e.g., the change in tint state)) is based on the motion of the vehicle.

In some embodiments, the set of one or more windows includes a first window (e.g., 402*a*, 402*b*1, 402*b*2, or 402*c*) and a second window (e.g., 402*a*, 402*b*1, 402*b*2, or 402*c*), and wherein causing the set of one or more windows to have a second tint state includes causing the first window to have a third tint state (e.g., the tint state of window 402*a* in FIG. 4F1) and the second window to have a fourth tint state (e.g., the tint state of window 402*b* in FIG. 4F1) that is different from the third tint state (e.g., the second tint state includes the third tint state and the fourth tint state). In some embodiments, the first window has the third tint state while in the first tint state (e.g., the tint state of the first window is the same in the first tint state and the second tint state) and the second window has a fifth tint state while in the first tint state that is different from the fourth tint state (e.g., the tint state of the second window changes while the tint state of the first window remains the same). In some embodiments, the tint state of the first window can be controlled independently and/or individually from the tint state of the second window.

In some embodiments, the motion of the vehicle includes a change in velocity (e.g., a change in speed and/or direction) of the vehicle (e.g., the vehicle starting to move; the velocity of the vehicle going from a first predetermined velocity (e.g., zero velocity or a velocity within a threshold amount of zero velocity) to a second predetermined velocity (e.g., a non-zero velocity or a velocity that satisfies a non-zero threshold velocity)).

In some embodiments, causing the set of one or more window to have a second tint state includes reducing a tint level of the set of one or more windows (e.g., the change in tint level of window 402*a* from FIG. 4B to FIG. 4C1, FIG. 4C2, or FIG. 4C3; the change in tint level of window 402*c* from FIG. 4B to FIG. 4D1; or the change in tint level of window 402*c* from FIG. 4F1 to FIG. 4F2, FIG. 4F3, or FIG. 4F4) (e.g., causing at least a portion of the set of one or more windows to become lighter, more transparent, and/or less opaque). In some embodiments, a difference between the second tint state of the set of one or more windows and the first tint state of the set of one or more windows creates a movement effect (e.g., the tint states (and/or change in tint states) of windows 402 in FIGS. 4F1-4F4) (e.g., a sensation of movement). In some embodiments, changing the set of one or more windows from the first tint state to the second tint state creates a movement effect (e.g., a sensation of movement and/or an animation). In some embodiments, changing the set of one or more windows from the first tint state to the second tint state includes changing a tint level of a first window (e.g., a front window) of the set of one or more windows before changing a tint level of a second window (e.g., a back window) of the set of one or more windows. In some embodiments, the tint state of the one or more windows includes a gradient in tint level and/or a gradual change in tint level from a first portion (e.g., a first window or a first portion of a window) of the set of one or more windows to a second portion (e.g., a second window or a second portion of the same window) of the set of one or more windows. In some embodiments, the tint level of the set of one or more windows varies (e.g., gradually) in a direction of the motion of the vehicle. In some embodiments, in a particular tint state (e.g., the first tint state and/or the second tint state), the tint level varies along a first dimension relative to the set of one or more windows; and in some embodiments, the tint level varies along a second dimension (e.g., perpendicular to the first dimension) relative to the set of one or more windows. In some embodiments, in a particular tint state (e.g., the first tint state and/or the second tint state), the tint level varies along a first dimension relative to the set of one or more windows and varies along a second dimension (e.g., perpendicular to the first dimension) relative to the set of one or more windows.

In some embodiments, the second tint state indicates a direction of the motion of the vehicle (e.g., the tint states (and/or change in tint states) of windows 402 in FIGS. 4C1-4G). In some embodiments, in accordance with a first direction of the motion of the vehicle, the second tint state includes a first tint level (or tint pattern) (e.g., the tint level varies along a first dimension and/or increases in a first direction along the first dimension); and in accordance with a second direction of the motion of the vehicle that is different from the first direction, the second tint state includes a second tint level (or tint pattern) (e.g., the tint level varies along a second dimension and/or increases in a second (e.g., opposite) direction along the first dimension).

In some embodiments, the vehicle includes an air output device (e.g., a fan, blower, and/or air jet) for moving and/or blowing air. In some embodiments, in response to obtaining the data associated with the motion of the vehicle, the air output device is caused (e.g., electronically, via a controller, automatically, and/or without user input) to generate (e.g., output and/or create) an air output (e.g., to move air and/or create a burst of air). In some embodiments, a characteristic (e.g., direction, velocity, flow, density, duration, temperature, and/or location) of the air output is based on a value (e.g., speed, velocity, acceleration, direction, rotation, and/or frequency) of the motion of the vehicle. For example, in accordance with (or, in some embodiments, in response to) the motion of the vehicle having a first value, the air output is generated with a first characteristic; and in accordance with (or, in some embodiments, in response to) the motion of the vehicle having a second value different from the first value, the air output is generated with a second characteristic different from the first characteristic. In some embodiments, the air output is generated concurrently (e.g., coordinated) with setting the tint state of the set of one or more windows.

In some embodiments, tactile output is generated (e.g., created and/or output) (e.g., via a tactile output device) in response to obtaining the data associated with the motion of the vehicle. In some embodiments, a characteristic (e.g., amplitude, duration, pattern, and/or frequency) of the tactile output is based on (e.g., proportional to) a value (e.g., direction, velocity, acceleration, speed, magnitude, rotation, and/or frequency) of the motion of the vehicle. In some embodiments, the tactile output is generated concurrently (e.g., coordinated) with setting the tint state of the set of one or more windows. In some embodiments, the tactile output is generated by a tactile output device of a computer system (e.g., a laptop computer, a tablet computer, a smartphone, and/or a smartwatch) located in and/or associated with the vehicle. In some embodiments, the tactile output is generated by a tactile output device of the vehicle. In some embodiments, the tactile output includes adjusting a suspension system (e.g., an active suspension system), vibrating a seat, adjusting (e.g., quickly tightening and/or loosening) a seat belt, and/or vibrating a steering wheel.

Details of the methods described above with respect to method 500 (e.g., FIG. 5) are also applicable in an analogous manner to the methods described below/above. For example, method 300, 700, and/or 900 optionally include one or more of the characteristics of the various methods described above with reference to method 500.

FIGS. 6A-6I illustrate example techniques and features for providing visual effects based on motion and/or the occurrence of an event.

Figure 6A:
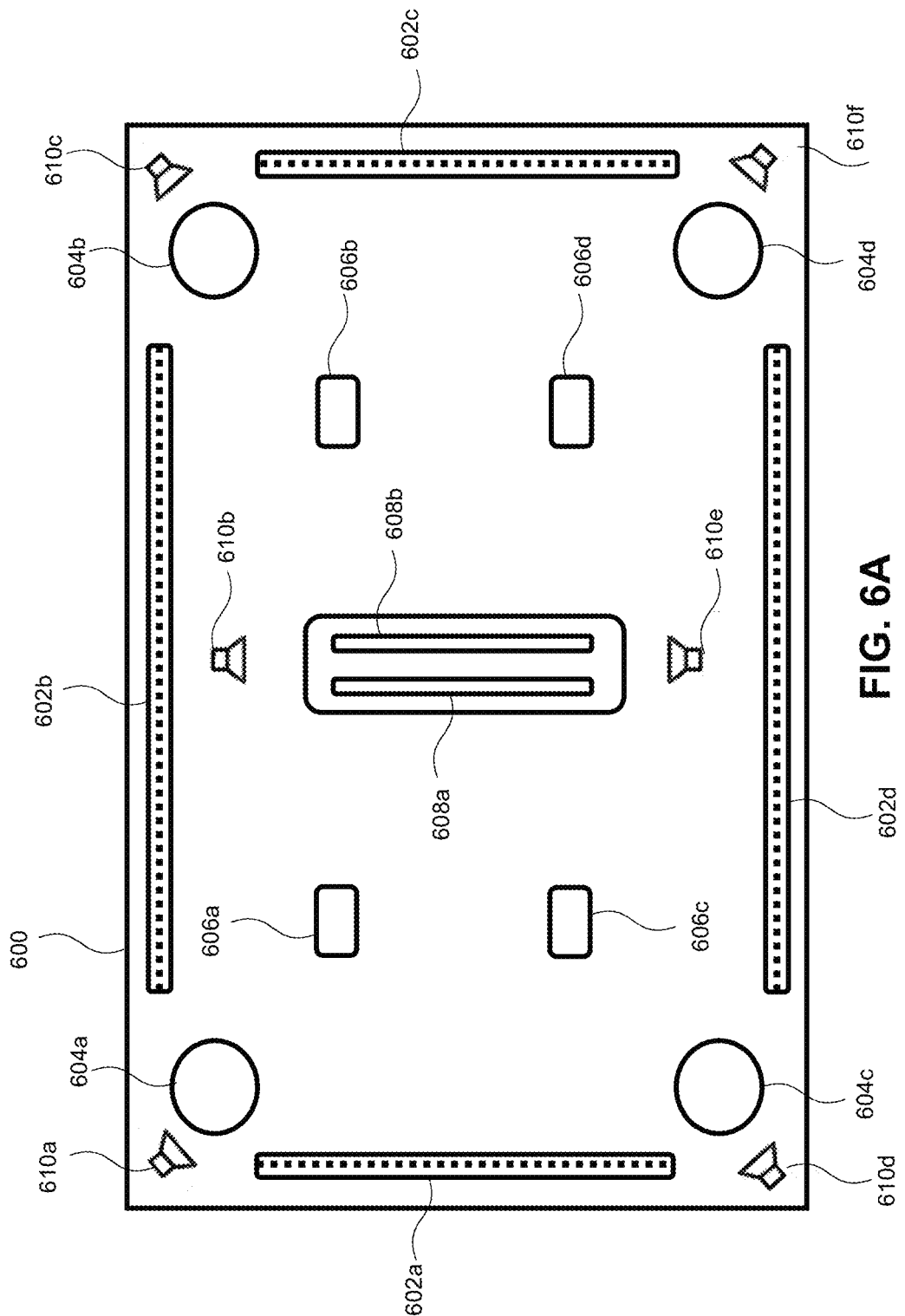

FIG. 6A illustrates an overhead view of environment 600 (e.g., a house, a smart home, a room, a building, a portion of a room, a portion of a building, a platform, a vehicle, and/or an interior portion of a vehicle). In some embodiments, environment 600 includes a home automation platform and/or a smart home platform that controls one or more functions and/or characteristics of a home, a house, and/or a building. Environment 600 includes lighting arrays 602a-602d (e.g., track lighting and/or lighting strips), lighting elements 604a-604d (e.g., lamps), individual displays 606a-606d (e.g., displays of electronic devices such as, for example, smartphones, smartwatches, tablet computers, laptop computers, desktop computers, and/or head-mounted devices), common displays 608a-608b (e.g., monitors, projectors, and/or televisions), and audio sources 610a-610f (e.g., speakers). In some embodiments, lighting arrays 602, lighting elements 604, individual displays 606, common displays 608, and/or audio sources 610 are electronically controlled by a computer system or a controller, such as system 100 or a portion thereof.

In some embodiments, the side of environment 600 at the top of FIG. 6A is a front side (or forward-facing side) and/or a north side; the side of environment 600 on the left of FIG. 6A is a left side and/or a west side; the side of environment 600 on the right of FIG. 6A is a right side and/or an east side; and the side of environment 600 at the bottom of FIG. 6A is a back side (or rear side or backward-facing side) and/or a south side.

The elements of environment 600 can controlled based on or in response to an event. In some embodiments, an event includes a current event, an expected event, a position event, a motion event and/or a sound event. A position event can include a physical or virtual position of an object (e.g., external to environment 600), a physical position of environment 600, a virtual position of environment 600, a physical position of a person in environment 800, and/or a position of a person in environment 600. An event can include motion of an object (e.g., external to environment 800 or internal to environment 600), physical motion of environment 600, virtual motion of environment 600, physical motion of a person in environment 600, and/or virtual motion of a person in environment 600. In some embodiments, environment 600 include one or more sensors that can detect an event (e.g., 612) and/or motion (e.g., 616, 618, and/or 620). In some embodiments, one or more remote sensors detect an event and/or motion and transmit data representing the event and/or motion to environment 600 and/or a controller that controls the elements of environment 600.

FIGS. 6B1-6B3 illustrate a technique for providing a user inside environment 600 with situational awareness of the surrounding outside environment. In FIG. 6B1, an event 612 occurs (e.g., outside environment 600). In some embodiments, event 612 includes a sound (e.g., an alarm, a siren, a person talking), a visual event (e.g., presence, position, and/or motion of a person, an animal, and/or a vehicle), and/or a motion event (e.g., real or simulated motion of environment 600 and/or of a user in environment 600). In some embodiments, environment 600 (e.g., an interior of environment 600) is enclosed such that visibility of the surrounding environment (e.g., an environment, object and/or or event) outside of environment 600 is limited and/or restricted in at least some directions.

FIGS. 6B2 and 6B3 illustrate an enlarged view of common display 608b. In FIG. 6B2, common display 608b displays user interface 614a at or before the time that event 612 is detected. User interface 614a includes information that may be relevant to anyone that is in environment 600, such as current and forecasted weather conditions. In some embodiments, user interface 614a include other content such as a movie, a video, a representation of currently playing media content (e.g., a song or podcast), a map, directions to a destination, status of a trip, and/or a user interface of an application (e.g., a web browser, a word processing application, or an email application). In some embodiments, user interface 614a is displayed on another display (e.g., individual displays 606a-606d and/or common display 608a). In some embodiments, one or more of audio sources 610a-610f output audio associated with user interface 614a or the content displayed on user interface 614a.

As shown in FIG. 6B3, in response to detection of event 612, common display 608b displays image 614b of a portion of the surrounding environment that includes event 612 (e.g., replaces user interface 614a with image 614b, overlays image 614b on user interface 614a, and/or displays image 614b concurrently with user interface 614a). In some embodiments, image 614b is displayed automatically (e.g., without user input) in response to detection of event 612. In some embodiments, image 614b is a static image. In some embodiments, image 614b is a video (e.g., a live video feed or a recorded video). In some embodiments, another display in environment 600 displays image 614b in response to detection of event 612. In some embodiments, in response to detection of event 612, one or more of audio sources 610a-610f output audio associated with image 614b (e.g., sound detected in the surrounding environment). In some embodiments, one or more of audio sources 610a-610f output audio associated with image 614b automatically (e.g., without user input) in response to detection of event 612.

Figure 6C:
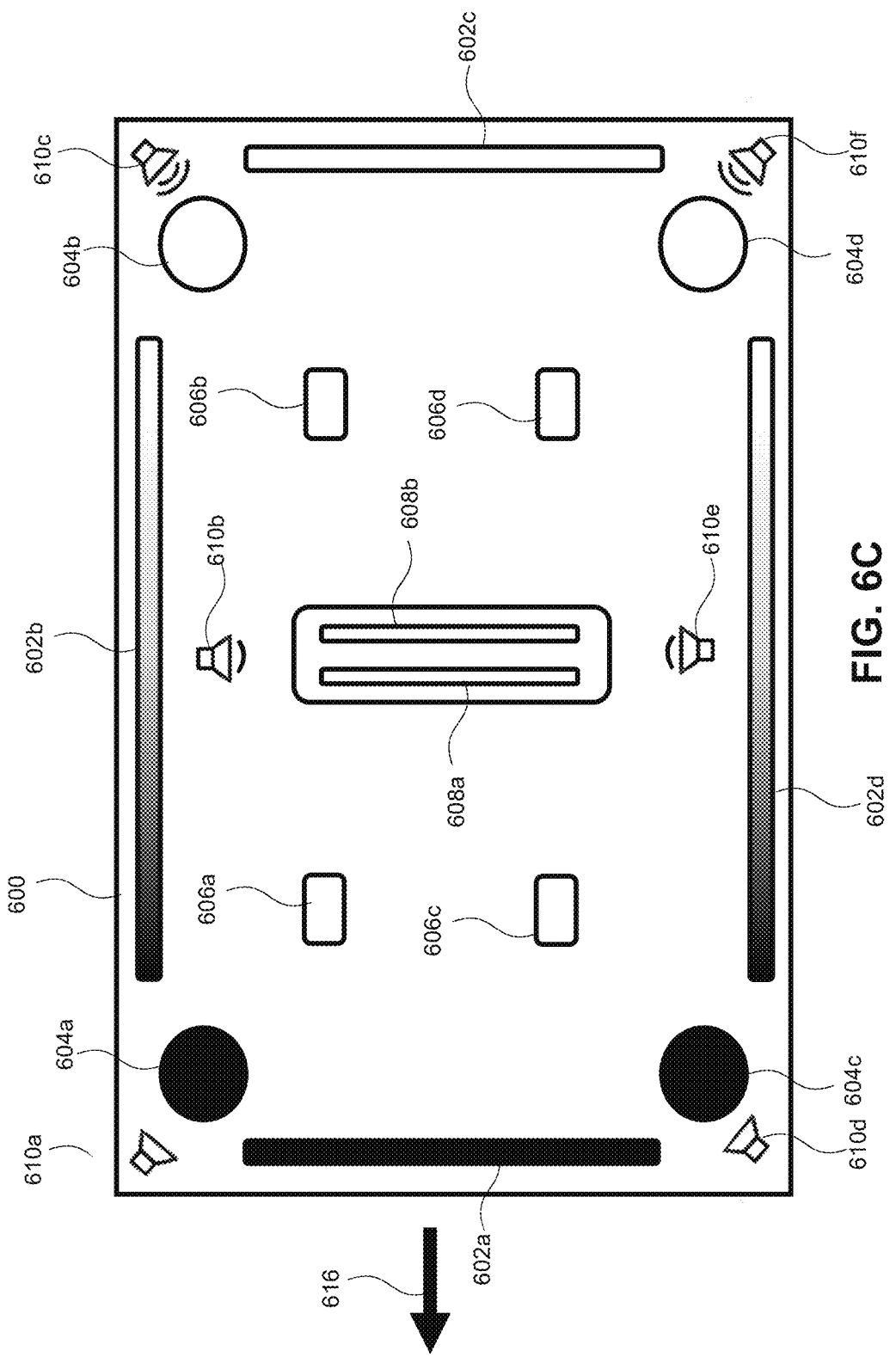

FIG. 6C illustrates motion 616. In some embodiments, motion 616 represents physical motion of environment 600. In some embodiments, motion 616 represents virtual or simulated motion of environment 600, the surrounding environment, and/or a user in environment 600. In some embodiments, environment 600 is a vehicle (e.g., a car, truck, van, or other mobile vehicle) and motion 616 represents motion of the vehicle.

In FIG. 6C, lighting arrays 602a-602d and lighting elements 604a-604d output light based on motion 616. Lighting array 602a is dark or has a low brightness, lighting array 602c is light or has a greater brightness, and lighting arrays 602b and 602d gradually increase in brightness from left to right (e.g., in the direction from lighting array 602a toward lighting array 602c). Similarly, lighting elements 610a and 610d are dark (or have a low brightness), and lighting elements 604b and 604d are light or have a greater brightness. In general, lighting arrays 602 and lighting elements 604 increase in brightness in the direction opposite of the direction of motion 616. In some embodiments, the variation in lighting provides the effect of motion in the direction of motion 616 (e.g., the light "moves" in the opposite direction as motion 616, similar to the features of dynamic elements 206, 215, 216, 218, and/or 220 described in FIGS. 2A-2Q).

In FIGS. 6C-6H, the number of curved lines (e.g., audio waves) illustrated as being emitted from audio source 610 is directly proportional to a magnitude (e.g., amplitude and/or frequency) of the output of the audio source (e.g., two curved lines indicates a greater magnitude than one curved line; no curved lines indicates little or no sound output). The curved lines are illustrated for descriptive purposes only and are not visible or displayed in environment 600.

In FIG. 6C, audio sources 610a and 610d have no output (indicated by no curved lines being emitted from audio sources 610a and 610d); audio sources 610b and 610e have a first output (e.g., output of a first amplitude represented by one curved line emitted from audio sources 610b and 610e); and audio sources 610c and 610f have a second output (e.g., output of a second amplitude represented by two curved lines being emitted from audio sources 610c and 610f) that is greater than the output of audio sources 610b and 610e. In general, the output of audio sources 610 increases in the direction opposite of the direction of motion 616. In some embodiments, the variation in sound output provides the effect of motion in the direction of motion 616 (e.g., the sound "moves" in the opposite direction as motion 616, similar to the features of dynamic elements 206, 215, 216, 218, and/or 220 described in FIGS. 2A-2Q).

Figure 6D:
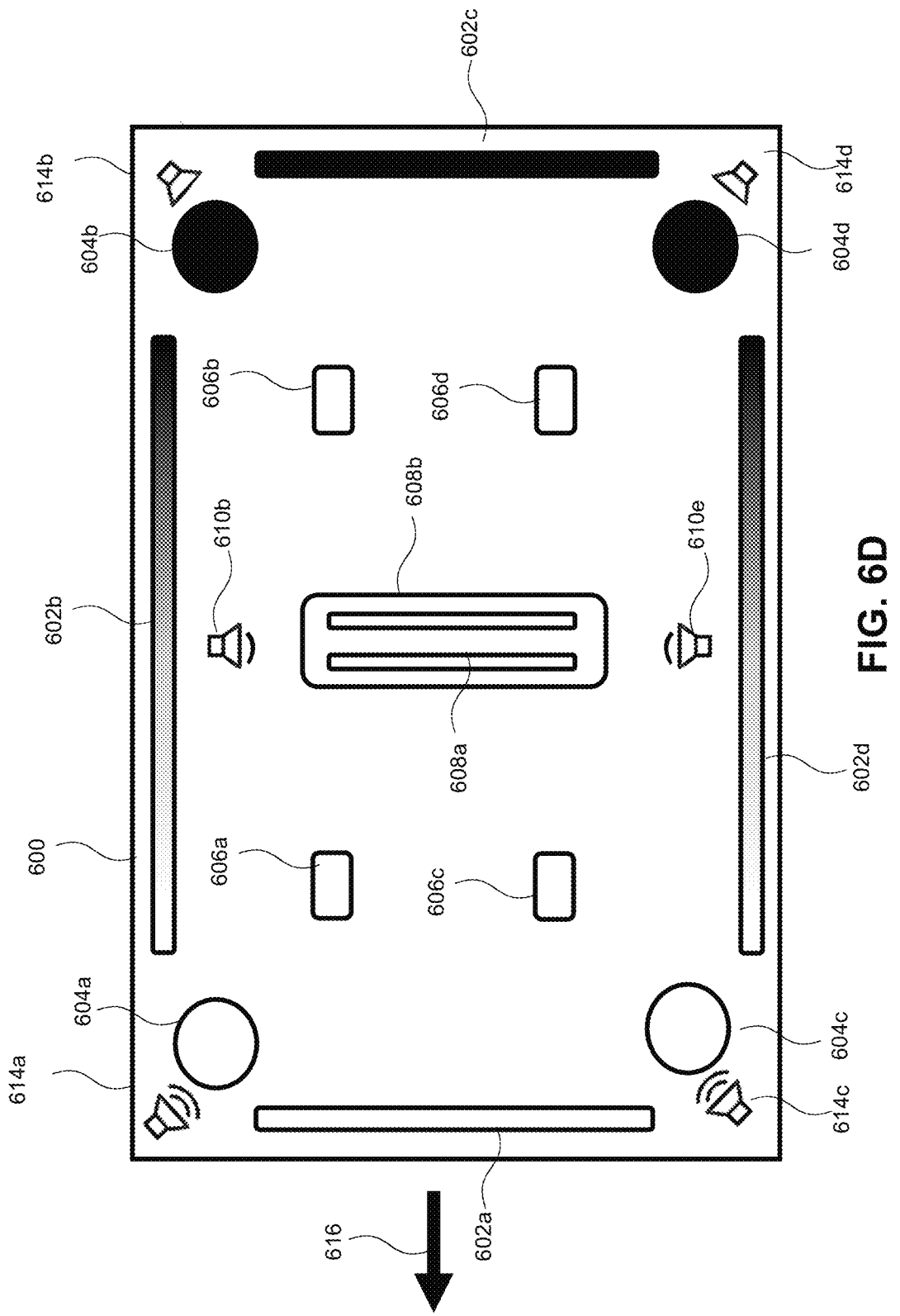

In FIG. 6D, motion 616 continues from FIG. 6C and the light and sound output in environment 600 changes to provide the effect of continued motion. In particular, the brightness of lighting arrays 602 and lighting elements 604 increases in the direction of motion 616 (e.g., the light has "moved" from the right side of environment 600 as shown in FIG. 6C to the left side of environment 600). Similarly, the output of audio sources 610 increases in the direction of motion 616, as indicated by the number of curved lines (or lack of curved lines) emitted from audio sources 610 (e.g., the sound has "moved" from the right side of environment 600 as shown in FIG. 6C to the left side of environment 600).

Figure 6E:
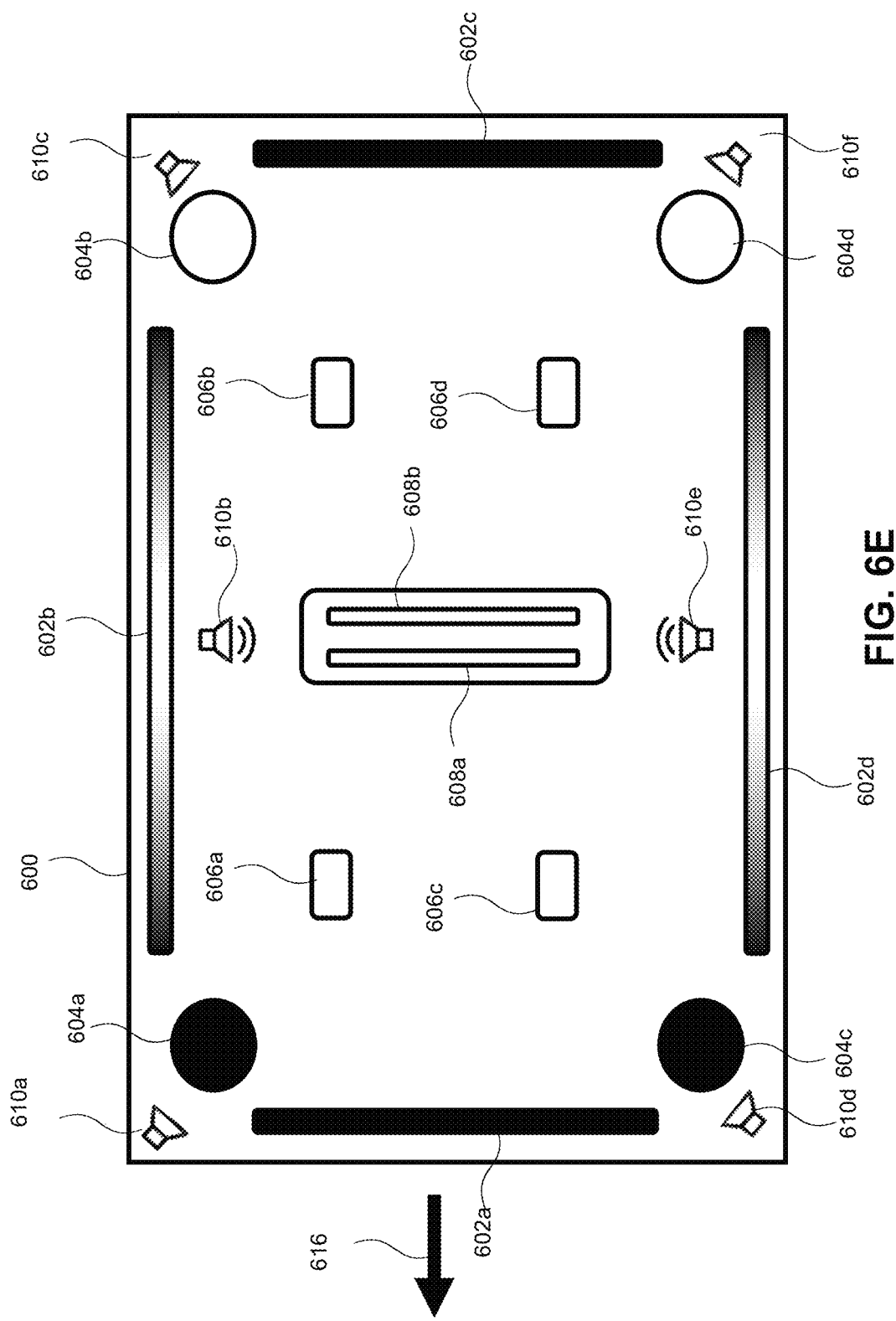

In FIG. 6E, motion 616 continues from FIG. 6D and the light and sound output in environment 600 changes to provide the effect of continued motion. In particular, the brightness of lighting arrays 602 and lighting elements 604 decreases in the direction of motion 616 from the left side of environment 600 to the middle of environment 600, and then decreases in brightness from the middle of the front and back sides of environment 600 to the right side of environment 600 (e.g., the light has "moved" from the left side of environment 600 as shown in FIG. 6D to the middle of the front and back sides of environment 600). Similarly, the output of audio sources 610 increases in the direction of motion 616 from the left side of environment 600 to the middle of environment 600, and then decreases from the middle of the front and back sides of environment 600 to the right side of environment 600 (e.g., the sound has "moved" from the left side of environment 600 as shown in FIG. 6D to the middle of front and back sides of environment 600).

Figure 6F:
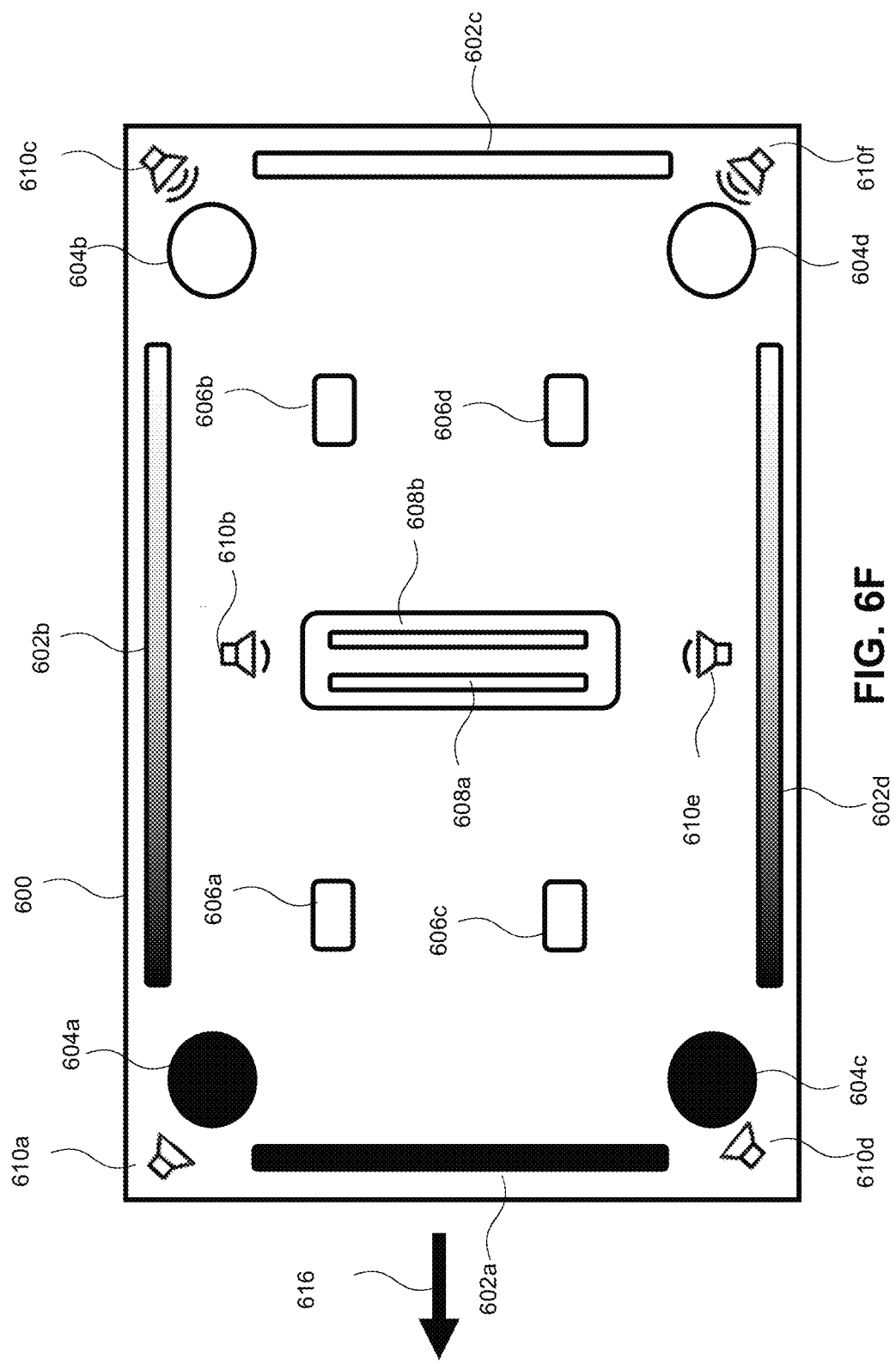

In FIG. 6F, motion 616 continues from FIG. 6E and the light and sound output in environment 600 changes to provide the effect of continued motion. In particular, the brightness of lighting arrays 602 and lighting elements 604 decreases in the direction of motion 616 from the left side of environment 600 to the right side of environment 600 (e.g., the light has "moved" from the middle of the front and back sides of environment 600 as shown in FIG. 6E back to the right side of environment 600). Similarly, the output of audio sources 610 increases in the direction of motion 616 from the left side of environment 600 to the right side of environment 600 (e.g., the sound has "moved" from the middle of the front and back sides of environment 600 as shown in FIG. 6E back to the right side of environment 600).

Figure 6G:
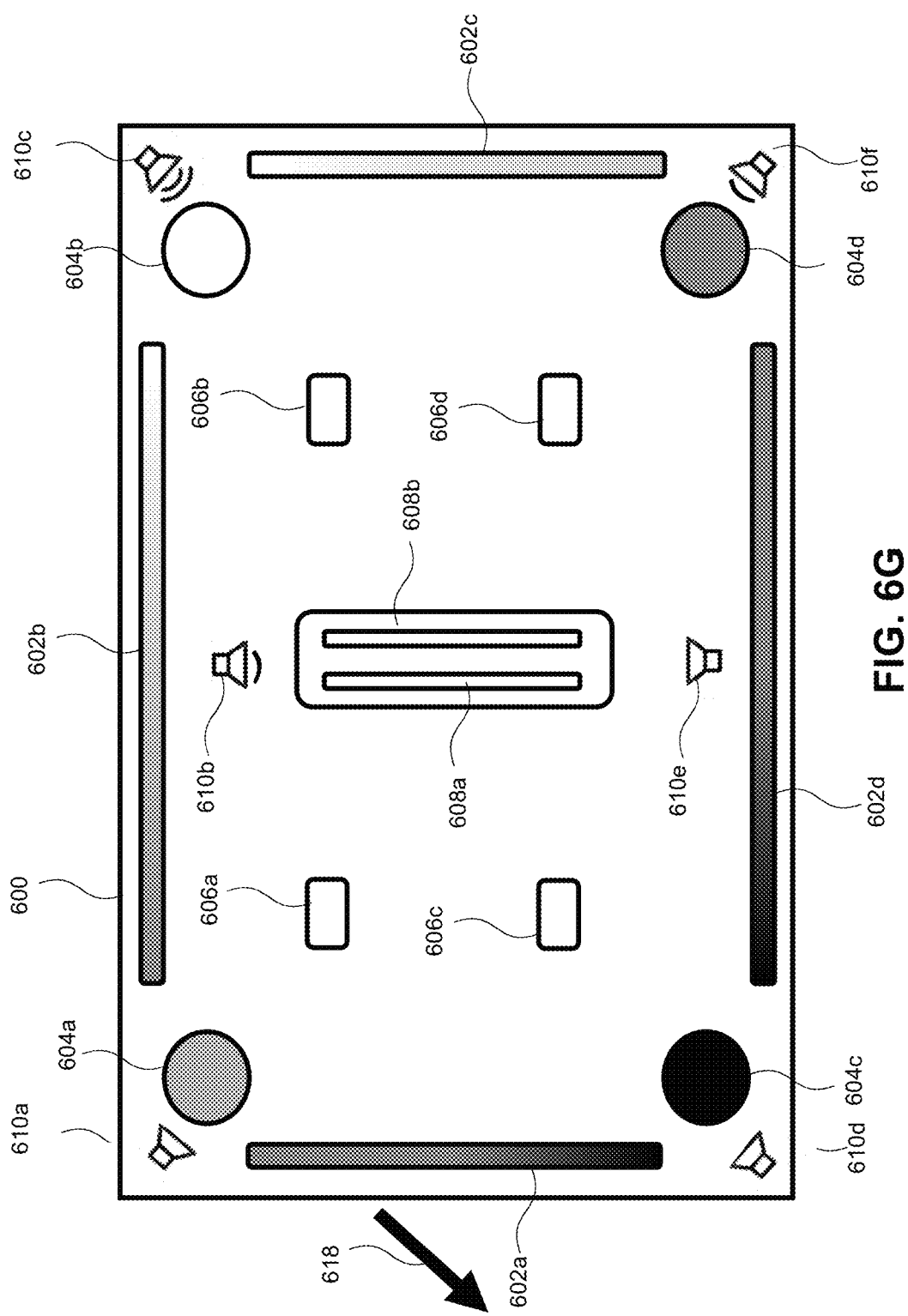

In FIG. 6G, lighting arrays 602a-602d and lighting elements 604a-604d output light based on motion 618. Motion 618 has a direction that is backward and to the left relative to environment 600 as shown in FIG. 6G. In particular, the brightness of lighting arrays 602 and lighting elements 604 increases in the direction opposite of the direction of motion 618 from the back left side of environment 600 to the front right side of environment 600 (e.g., the light "moves" from the back left side of environment 600 to the front right side of environment 600). Similarly, the output of audio sources 610 increases in the direction opposite of the direction of motion 618 from the back left side of environment 600 to the front right side of environment 600 (e.g., the sound "moves" from the back left side of environment 600 to the front right side of environment 600). In particular, there is no audio output from audio sources 610a, 610d, and 610e; a first level of output from audio sources 610b and 610f; and a second level of output from audio source 610c that is greater than the first level of output from audio sources 610b and 610f. In some embodiments, the variation in lighting and sound output provides the effect of motion in the direction opposite of the direction of motion 618 (e.g., the light and sound "move" or occur in the opposite direction as motion 618, similar to the features of dynamic elements 206, 215, 216, 218, and/or 220 described in FIGS. 2A-2Q). The light and sound vary along the vertical direction due to the vertical component of motion 618, and along the horizontal direction (e.g., left and right direction) due to the horizontal component of motion 618.

Figure 6H:
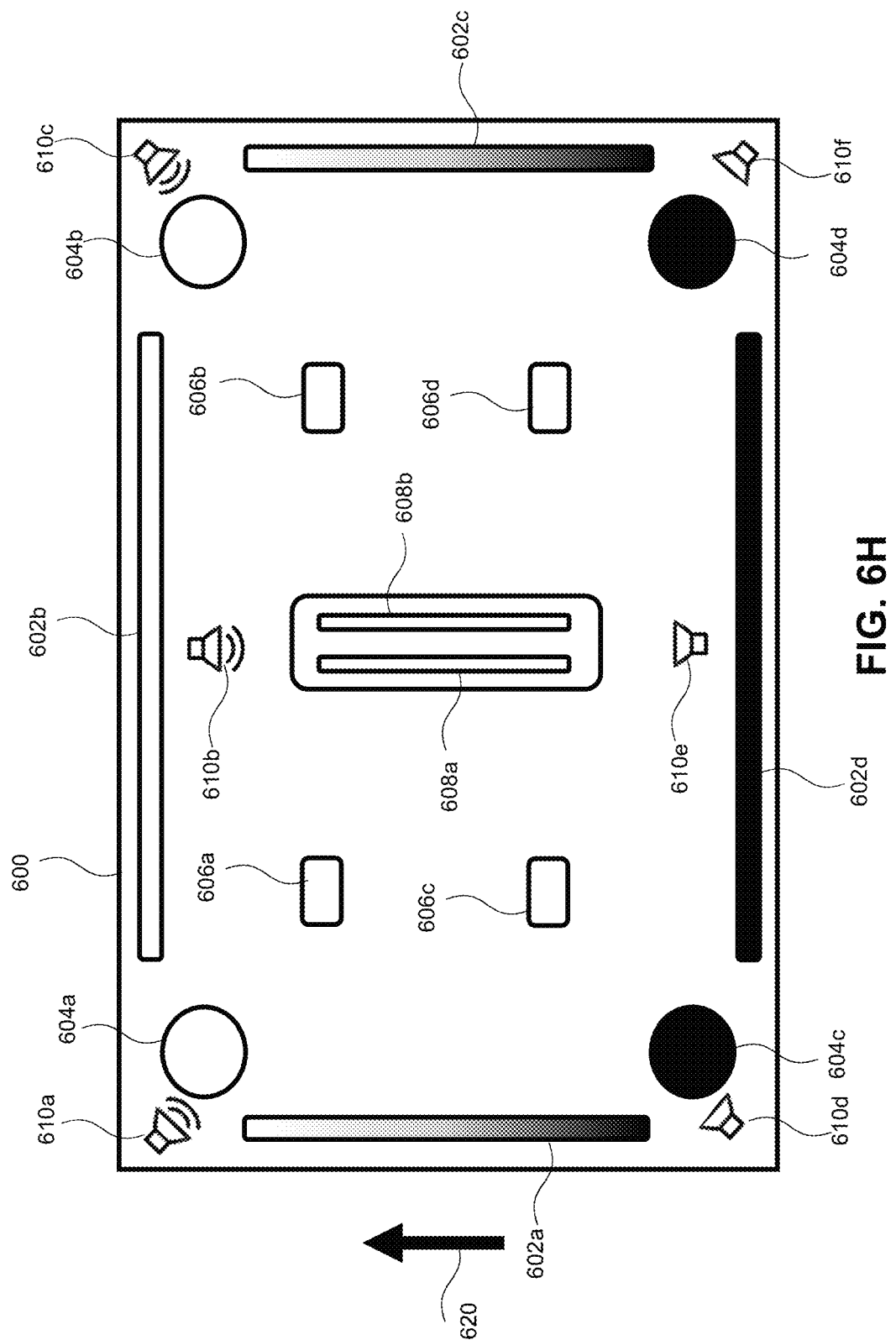
Figure 61:
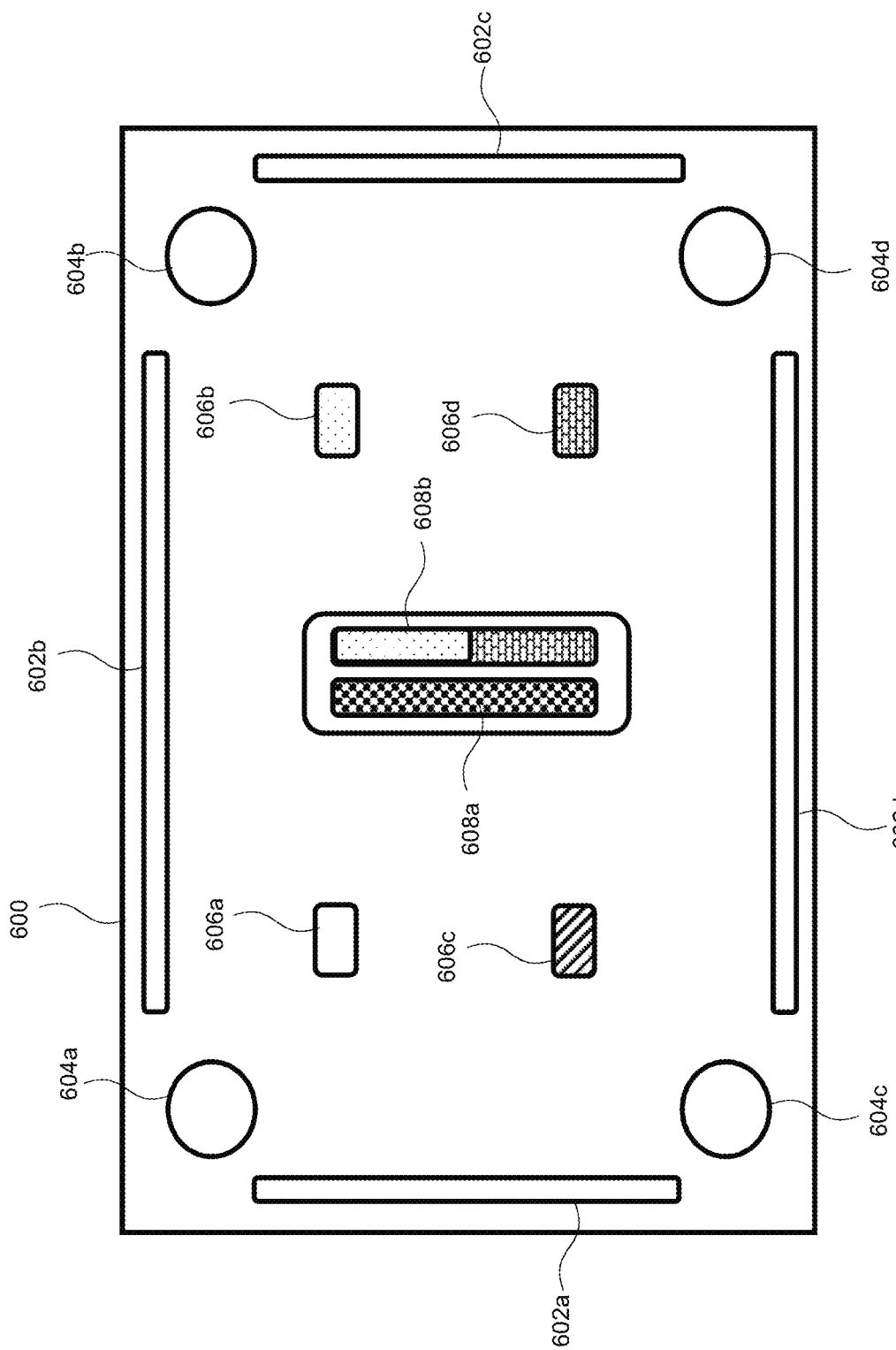

In FIG. 6H, lighting arrays 602a-602d and lighting elements 604a-604d output light based on motion 620. Motion 620 has a direction that is forward relative to environment 600 as shown in FIG. 6G (e.g., motion 620 is solely in the front-back direction relative to environment 600; motion 620 does not have a forward or backward component relative to environment 600). In particular, the brightness of lighting arrays 602 and lighting elements 604 increases in the direction of motion 620 from the back side of environment 600 to the front side of environment 600 (e.g., the light occurs on the upper side of environment 600 or "moves" from the back side of environment 600 to the front side of environment 600). Similarly, the output of audio sources 610 increases in the direction of motion 620 from the back side of environment 600 to the front side of environment 600 (e.g., the sound occurs at the front side of environment or "moves" from the back side of environment 600 to the front side of environment 600). In particular, there is no audio output from audio sources 610*d*, 610*e*, and 610*f*; and a first level of output from audio sources 610*a*, 610*b*, and 610*c*. In some embodiments, the variation in lighting and sound output provides the effect of motion in the direction of motion 620 (e.g., the light and sound "move" or occur in the direction of motion 620). The light and sound vary along the forward-backward direction due to the forward component of motion 620, but do not vary along the left-right direction due to the lack of a left or right component to motion 620.

FIG. 6I illustrates techniques for displaying content on displays in environment 600. In some embodiments, individual displays 606*a*-606*d* and common displays 608*a*-608*b* are individually and/or independently controllable (e.g., individual displays 606*a*-606*d* can be controlled independently from common displays 608*a*-608*b*; individual displays 606*a*-606*d* can be controlled independently from each other; and common display 608*a* can be controlled independently from common display 608*b*).

In FIG. 6I, different fill patterns on individual displays 606*a*-606*d* and common displays 608*a*-608*b* represent different displayed content. As shown in FIG. 6I, individual display 606*a* displays first content, individual display 606*b* displays second content, individual display 606*c* displays third content, individual display 606*d* displays fourth content, common display 608*a* displays fifth content, a first portion of common display 608*b* displays sixth content, and a second portion of common display 608*b* displays seventh content. In FIG. 6I, the first content second content, third content fourth content, fifth content, and sixth content are all different from each other, and the fourth content and the seventh content are the same as each other. In some embodiments, different portions of a display can display different content. For example, in FIG. 6I, a first portion (e.g., the right side) of common display 608*b* displays different content than a second portion (e.g., the left side) of common display 608*b*.

In some embodiments, if individual displays 606*a*-606*d* are associated with (e.g., being used by) four different respective users, different content can be displayed on individual displays 606*a*-606*d* for each of the four users based on various parameters, such as individual preferences and context within environment 600. For example, if an event (e.g., a motion event, a sound event, and/or a position event) occurs that is determined to be relevant to a user of display 606*a*, content related to the event can be displayed on display 606*a* but not on individual displays 606*b*-606*d* and common displays 608*a*-608*b*. As another example, content related to an event that is determined to be relevant to environment 600 as a whole and/or to all users in or associated with environment 600 can be displayed on common displays 608*a* and 608*b* and, optionally, on individual displays 606*a*-606*d*. In another example, content related to an event that is determined to be relevant to users on the left side of environment 600 can be displayed on common display 608*a* (and, optionally, on individual displays 606*a* and 606*c*) but not on common display 608*b* or individual displays 606*b* and 606*d*. In some embodiments, content related to an event that is determined to be relevant to a user of individual display 606*d* can be displayed on individual display 606*d* and common display 608*b* (or a portion of common display 608*b* associated with (e.g., closest to) individual display 606*d*) and, optionally, without displaying the content on other displays. For example, in FIG. 6I, a first portion (e.g., the left side) of common display 608*b* displays the same content as individual display 606*d*, while different content is displayed on a second portion (e.g., the left side) of common display 608*b*.

Figure 7:
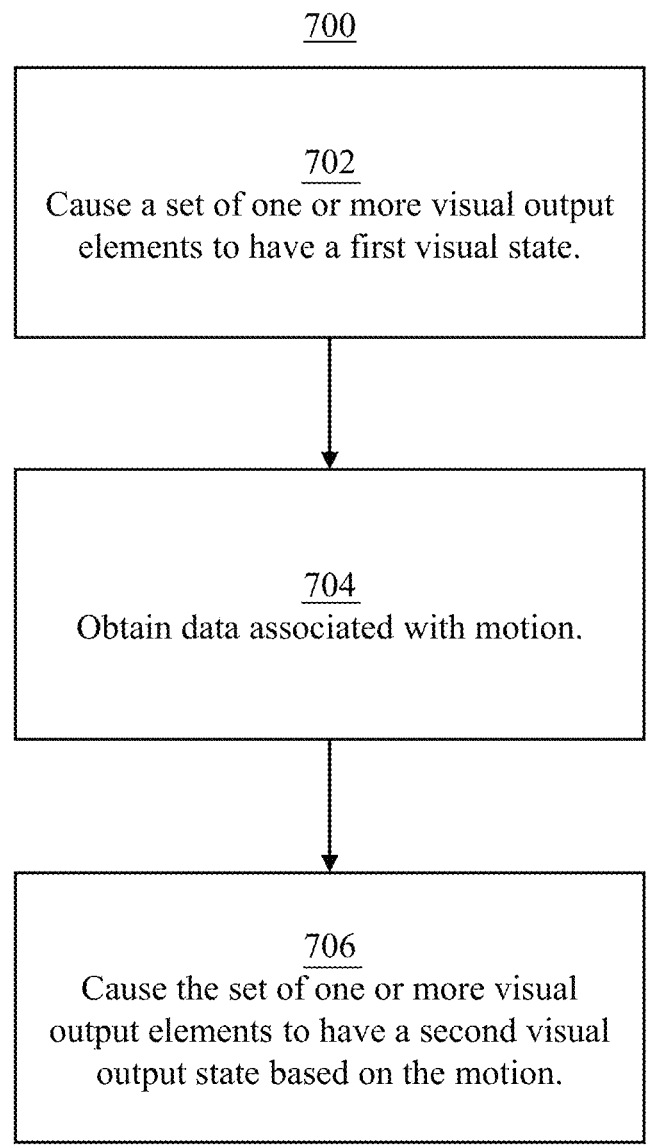
FIG. 7 is a flow diagram that illustrates a method for providing visual and/or audio output in accordance with some embodiments.

The user interfaces in FIGS. 6A-6I are used to illustrate the methods described below, including the methods in FIG. 7. FIG. 7 is a flow diagram that illustrates a method for providing visual and/or audio output in accordance with some embodiments. In some embodiments, method 700 is performed at least partially by a system (e.g., 100 or a portion thereof) that is in communication with visual output elements (e.g., lighting elements and/or displays) and/or audio output elements (e.g., speakers). Some operations in method 700 are, optionally, combined, the orders of some operations are, optionally, changed, and some operations are, optionally, omitted.

At block 702, a set of one or more visual output elements (e.g., 602, 604, and/or 606) of a vehicle (e.g., 400, 401, 600, or 800) is caused (e.g., electronically, via a controller, automatically, and/or without user input) to have a first visual state (e.g., 614*a*; or the state of 602, 604, and/or 606 in FIG. 6C, 6D, 6E, 6F, 6G, 6H, or 6I). At block 704, data associated with (e.g., indicative of and/or that represents) motion (e.g., 208*a*, 208*b*, 208*c*, 208*d*, 208*e*, 208*f*, 222*a*, 222*b*, 222*c*, 222*d*, 222*e*, 222*f*, 222*g*, 404*a*, 404*b*, 404*c*1, 404*d*, 404*e*, 406*a*, 406*b*, 406*c*, 612, 616, 618, 620, 812, 814, 816, 818, 820, and/or 822) (e.g., measured motion, detected motion, speed, velocity, acceleration, rotation, vibration, planned motion, expected motion, anticipated motion, a planned maneuver, an expected maneuver, and/or an anticipated maneuver) of the vehicle (e.g., 400, 401, 600, or 800) is obtained (e.g., received or detected). At block 706, after (e.g., in response to) obtaining the data associated with the motion of the vehicle, the set of one or more visual output elements is caused (e.g., electronically, via a controller, automatically, and/or without user input) to have a second visual state (e.g., 614*b*; or the state of 602, 604, and/or 606 in FIG. 6C, 6D, 6E, 6F, 6G, 6H, or 6I) that is different from the first visual state (e.g., updating or changing the visual state of the set of one or more visual output elements), wherein the second visual state (and/or, optionally, the difference between the second visual state and the first visual state (e.g., the change in visual state)) is based on the motion of the vehicle (e.g., the second visual state correlates to the motion of the vehicle). In some embodiments, in accordance with (or in response to) a determination that the motion of the vehicle includes first motion, the second visual state has a first set of parameters; and in accordance with (or in response to) a determination that the motion of the vehicle includes second motion that is different from the first motion, the second visual state has a second set of parameters that is different from the first set of parameters.

In some embodiments, the set of one or more visual output elements are located in an interior (e.g., a cabin) of the vehicle. In some embodiments, the set of one or more visual output elements includes a display of an electronic device (e.g., 606, 608*a*, and/or 608*b*) (e.g., a computer system, a desktop computer, a laptop computer, a smartphone, a smartwatch, a television, and/or a monitor). In some embodiments, causing the set of one or more visual output elements to have the second visual state includes displaying, on the display of the electronic device, an image (e.g., 614*b*) (e.g., a captured image, a live image, and/or a video feed) of an environment exterior to (e.g., surrounding) the vehicle. In some embodiments, the motion of the vehicle includes (e.g., is) a current maneuver (e.g., a maneuver that is currently being performed by the vehicle, such as parking, stopping, arriving, departing, turning, and/or changing velocity). In some embodiments, causing the set of one or more visual output elements to have the second visual state is performed in response to (or in accordance with) a determination that the vehicle is performing a predefined maneuver. In some embodiments, the motion of the vehicle includes (e.g., is) an expected (or anticipated, upcoming, or planned) maneuver (e.g., a maneuver that is scheduled or planned to be performed by the vehicle, such as parking, stopping, arriving, departing, turning, and/or changing velocity). In some embodiments, causing the set of one or more visual output elements to have the second visual state is performed in response to (or in accordance with) a determination that the vehicle is expected to perform a predefined maneuver. In some embodiments, causing the set of one or more visual output elements to have the second visual state includes causing a first portion (e.g., 608a (or a portion thereof) or 608b (or a portion thereof)) (e.g., a first side or a first portion of a first side) of the set of one or more visual output elements to have a third state and a second portion (e.g., 608a (or a portion thereof) or 608b (or a portion thereof)) (e.g., a second side or a second portion of the first side) of the set of one or more visual output elements to have a fourth state that is different from the third state. In some embodiments, in response to obtaining the data associated with the motion of the vehicle, the set of one or more visual output elements provides a visual effect on a first portion of the set of one or more visual output elements without providing the visual effect on a second portion of the set of one or more visual output elements.

In some embodiments, causing the set of one or more visual output elements to have the second visual state includes causing the set of one or more visual output elements to have a color (e.g., color pattern, variation in color over space and/or time, and/or color effect) that is different from a color of the first visual state of the set of one or more visual output elements (e.g., changing a color of the set of one or more visual output elements). In some embodiments, causing the set of one or more visual output elements to have the second visual state includes causing the set of one or more visual output elements to have an intensity (e.g., brightness, intensity pattern, variation in intensity over space and/or time, and/or intensity effect) that is different from an intensity of the first visual state of the set of one or more visual output elements (e.g., changing an intensity of the set of one or more visual output elements).

In some embodiments, the set of one or more visual output elements includes a first visual output element (e.g., 602a, 602b, 602c, 602d, 604a, 604b, 604c, 604d, 606a, 606b, 606c, 606d, 608a, or 608b) (e.g., a first sub-set of one or more visual output elements) and a second visual output element (e.g., 602a, 602b, 602c, 602d, 604a, 604b, 604c, 604d, 606a, 606b, 606c, 606d, 608a, or 608b) (e.g., a second sub-set of one or more visual output elements), and wherein causing the set of one or more visual output elements to have the second visual state includes causing the first visual output element to have a third visual state and the second visual output element to have a fourth visual state that is different from the third visual state. In some embodiments, the visual state of the first visual output element is controlled independently and/or individually from the visual state of the second visual output element.

In some embodiments, the set of one or more visual output elements includes (e.g., is) a linear array of lights (e.g., 602a, 602b, 602c, or 602d) (e.g., tracer lights). In some embodiments, the set of one or more visual output elements is at least partially aligned (e.g., has a component) along a first lighting dimension relative to the vehicle (e.g., longitudinally and/or from a front portion of the vehicle to a rear portion of the vehicle). In some embodiments, causing the set of one or more visual output elements to have the second visual state includes causing the set of one or more visual output elements to have a pattern (e.g., a color and/or intensity pattern in space and/or time) along the first lighting dimension based on a component of the motion of the vehicle in a first motion dimension (e.g., 602b and/or 602d in FIG. 6C or 6G; 602a and/or 602c in FIG. 6G or 6H). In some embodiments, the lighting pattern along the first lighting dimension is based on forward and/or backward motion (e.g., longitudinal motion but not side-to-side or lateral motion). In some embodiments, the lighting pattern along the first lighting dimension provides a user with a sensation of acceleration in a direction opposite to the direction of the motion of the vehicle. In some embodiments, the set of one or more visual output elements is at least partially aligned (e.g., has a component) along a second lighting dimension (e.g., different from and/or perpendicular to the first lighting dimension) relative to the vehicle (e.g., laterally and/or from a right side portion of the vehicle to a left side portion of the vehicle). In some embodiments, causing the set of one or more visual output elements to have the second visual state includes causing the set of one or more visual output elements to have a pattern (e.g., a color and/or intensity pattern in space and/or time) along the second lighting dimension based on a component of the motion of the vehicle in a second motion dimension (e.g., 602b and/or 602d in FIG. 6C or 6G; 602a and/or 602c in FIG. 6G or 6H) (e.g., different from and/or perpendicular to the first motion dimension). In some embodiments, the lighting pattern along the second lighting dimension is based on side-to-side motion (e.g., lateral motion but not front-to-back or longitudinal motion). In some embodiments, the lighting pattern along the second lighting dimension provides a user with a sensation of acceleration (e.g., turning) in a direction opposite to the direction of the motion of the vehicle.

In some embodiments, the second visual state is based on a position of the vehicle. In some embodiments, in accordance with a determination that the vehicle is in a first position, the second visual state has a first visual characteristic (e.g., a first color, color pattern in space and/or time, intensity, and/or intensity pattern in space and/or time); and in accordance with a determination that the vehicle is in a second position that is different from the first position, the second visual state has a second visual characteristic (e.g., a second color, color pattern in space and/or time, intensity, and/or intensity pattern in space and/or time) that is different from the first visual characteristic.

In some embodiments, the second visual state is based on a direction of the motion of the vehicle. In some embodiments, in accordance with a determination that the motion of the vehicle is in a first direction, the second visual state has a first visual characteristic (e.g., a first color, color pattern in space and/or time, intensity, and/or intensity pattern in space and/or time); and in accordance with a determination that the motion of the vehicle is in a second direction that is different from the first direction, the second visual state has a second visual characteristic (e.g., a second color, color pattern in space and/or time, intensity, and/or intensity pattern in space and/or time) that is different from the first visual characteristic.

In some embodiments, the second visual state is based on a maneuver of the vehicle (e.g., parking, stopping, arriving, departing, turning, and/or changing velocity). In some embodiments, in accordance with a determination that the maneuver is a first maneuver, the second visual state has a first visual characteristic (e.g., a first color, color pattern in space and/or time, intensity, and/or intensity pattern in space and/or time); and in accordance with a determination that the maneuver is a second maneuver that is different from the first maneuver, the second visual state has a second visual characteristic (e.g., a second color, color pattern in space and/or time, intensity, and/or intensity pattern in space and/or time) that is different from the first visual characteristic. In some embodiments, the maneuver of the vehicle includes (e.g., is) a current maneuver (e.g., a maneuver currently being performed by the vehicle). In some embodiments, causing the set of one or more visual output elements to have the second visual state is performed in response to (or in accordance with) a determination that the vehicle is performing a predefined maneuver. In some embodiments, the maneuver of the vehicle includes (e.g., is) an expected (or anticipated, upcoming, or planned) maneuver (e.g., a maneuver that is scheduled or planned to be performed by the vehicle). In some embodiments, causing the set of one or more visual output elements to have the second visual state is performed in response to (or in accordance with) a determination that the vehicle is expected to perform a predefined maneuver.

In some embodiments, a magnitude of the second visual state (e.g., a magnitude of a color, color pattern, intensity, and or intensity pattern) is proportional (e.g., directly proportional) to a magnitude of the motion of the vehicle. In some embodiments, in accordance with a first magnitude of motion, the second visual state has a first magnitude; and in accordance with a second magnitude of motion that is different from the first magnitude, the second visual state has a second magnitude (e.g., a larger magnitude of motion causes a larger magnitude in the second visual state than a smaller magnitude of motion). In some embodiments, a difference between the second visual state and the first visual state (e.g., a change in the visual state of the set of one or more visual output elements and/or a difference in color, color pattern, intensity, and/or intensity pattern) is proportional (e.g., directly proportional) to a magnitude of the motion of the vehicle. In some embodiments, in accordance with a first magnitude of motion, there is a first difference between the second visual state and the first visual state; and in accordance with a second magnitude of motion that is different from the first magnitude, there is a second difference between the second visual state and the first visual state (e.g., a larger magnitude of motion causes a larger difference between the second visual state and the first visual state (or a larger change in the visual state of the set of one or more visual output elements) than a smaller magnitude of motion).

In some embodiments, after (e.g., in response to) obtaining the data associated with the motion of the vehicle, a sound effect is caused (e.g., via 610a, 610b, 610c, 610d, 610e, and/or 610f) that is coordinated (e.g., provided concurrently) with causing the set of one or more visual output elements to have the second visual state. In some embodiments, the second visual state is based on a user (e.g., as described with reference to FIG. 6I). In some embodiments, in accordance with a determination that the set of one or more visual output elements is associated with a first user, the second visual state of the set of one or more visual output elements is caused to have a first visual characteristic (e.g., color, color pattern, intensity, and/or intensity pattern); and in accordance with a determination that the set of one or more visual output elements is associated with a second user that is different from the first user, the second visual state of the set of one or more visual output elements is caused to have a second visual characteristic (e.g., color, color pattern, intensity, and/or intensity pattern) that is different from the first visual characteristic.

In some embodiments, a set of two or more light sources (e.g., an array of light sources or two or more arrays (e.g., sub-arrays) of light sources) in an interior (e.g., a cabin) of a vehicle is caused (e.g., electronically, via a controller, automatically, and/or without user input) to have a first lighting state (e.g., off, on, color(s), intensity (ies), brightness(es), a static state, a dynamic state (such as turning on and off and/or changing color, intensity, and/or brightness at a frequency), and/or a pattern). In some embodiments, the set of two or more light sources includes a first light source and a second light source, and wherein the first light source and the second light source are independently controllable (e.g., the first light source can be controlled to output light independently from the second light source, and the second light source can be controlled to output light independently from the first light source). In some embodiments, the set of two or more light sources includes a first subset of one or more light sources that includes the first light source, and a second subset of one or more light sources that includes the second light source. In some embodiments, the first subset and the second subset are mutually exclusive (e.g., the first subset does not include any light sources that are in the second subset, and the second subset does not include any light sources that are in the first subset). In some embodiments, the first subset and the second subset are independently controllable.

In some embodiments, data associated with (e.g., indicative of and/or that represents) motion (e.g., measured motion, detected motion, speed, velocity, acceleration, rotation, vibration, planned motion, expected motion, anticipated motion, a planned maneuver, an expected maneuver, and/or an anticipated maneuver) of the vehicle is obtained (e.g., received or detected).

In some embodiments, after (e.g., in response to) obtaining the data associated with motion of the vehicle, the set of two or more light sources is caused (e.g., electronically, via a controller, automatically, and/or without user input) to have a second lighting state that is based on the data associated with motion of the vehicle and that is different from the first lighting state (e.g., updating or changing the lighting state of the set of two or more light sources based on the motion of the vehicle). In some embodiments, causing the set of two or more light sources to have a second lighting state that is based on the data associated with motion of the vehicle and that is different from the first lighting state includes causing the first light source to produce a first light output based on the data associated with motion of the vehicle and causing (e.g., independently from causing the first light source to produce a first light output based on the motion of the vehicle) the second light source to produce a second light output (e.g., same as the first light output or different from the first light output) based on the data associated with motion of the vehicle.

In some embodiments, the second lighting state (e.g., the change in lighting state) is based on the motion of the vehicle. In some embodiments, the difference between the second lighting state and the first lighting state (e.g., the change in lighting state) is based on the motion of the vehicle. In some embodiments, in accordance with (or in response to) a determination that the motion of the vehicle includes first motion, the second lighting state has a first set of parameters; and in accordance with (or in response to) a determination that the motion of the vehicle includes second motion that is different from the first motion, the second lighting state has a second set of parameters that is different from the first set of parameters.

In some embodiments, the vehicle includes an air output device (e.g., a fan, blower, and/or air jet) for moving and/or blowing air. In some embodiments, in response to obtaining the data associated with the motion of the vehicle, the air output device is caused (e.g., electronically, via a controller, automatically, and/or without user input) to generate (e.g., output and/or create) an air output (e.g., to move air and/or create a burst of air). In some embodiments, a characteristic (e.g., direction, velocity, flow, density, duration, temperature, and/or location) of the air output is based on a value (e.g., speed, velocity, acceleration, direction, rotation, and/or frequency) of the motion of the vehicle. For example, in accordance with (or, in some embodiments, in response to) the motion of the vehicle having a first value, the air output is generated with a first characteristic; and in accordance with (or, in some embodiments, in response to) the motion of the vehicle having a second value different from the first value, the air output is generated with a second characteristic different from the first characteristic. In some embodiments, the air output is generated concurrently (e.g., coordinated) with setting the visual state of the set of one or more visual output elements.

In some embodiments, tactile output is generated (e.g., created and/or output) (e.g., via a tactile output device) in response to obtaining the data associated with the motion of the vehicle. In some embodiments, a characteristic (e.g., amplitude, duration, pattern, and/or frequency) of the tactile output is based on (e.g., proportional to) a value (e.g., direction, velocity, acceleration, speed, magnitude, rotation, and/or frequency) of the motion of the vehicle. In some embodiments, the tactile output is generated concurrently (e.g., coordinated) with setting the visual state of the set of one or more visual output elements. In some embodiments, the tactile output is generated by a tactile output device of a computer system (e.g., a laptop computer, a tablet computer, a smartphone, and/or a smartwatch) located in and/or associated with the vehicle. In some embodiments, the tactile output is generated by a tactile output device of the vehicle. In some embodiments, the tactile output includes adjusting a suspension system (e.g., an active suspension system), vibrating a seat, adjusting (e.g., quickly tightening and/or loosening) a seat belt, and/or vibrating a steering wheel.

Details of the methods described above with respect to method 700 (e.g., FIG. 7) are also applicable in an analogous manner to the methods described below/above. For example, method 300, 500, and/or 900 optionally include one or more of the characteristics of the various methods described above with reference to method 700.

FIGS. 8A-8I illustrate example techniques for providing audio based on an event.

Figure 8A:
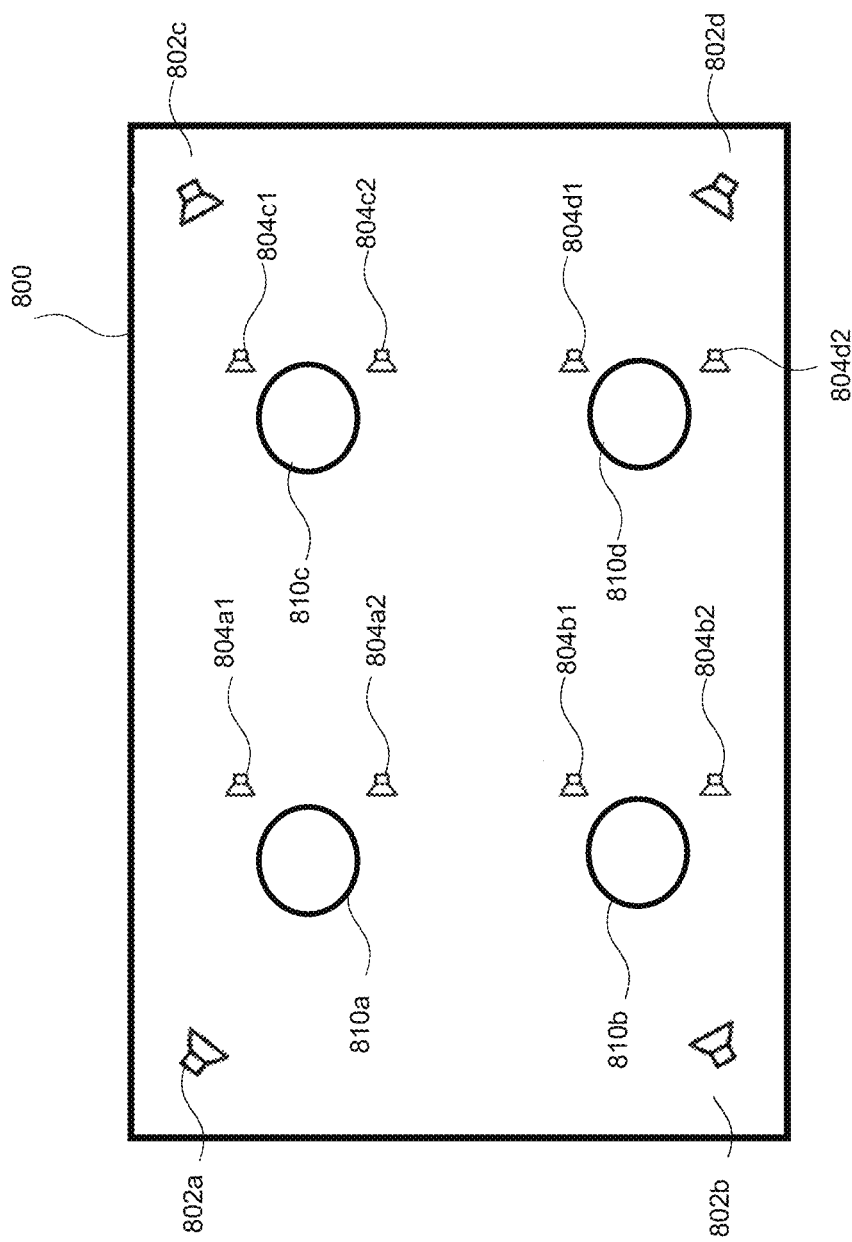

FIG. 8A illustrates environment 800. Environment 800 can be a room, a building, a house, a smart home, a portion of a room, a portion of a building, a platform, a vehicle, and/or an interior portion of a vehicle. In some embodiments, environment 800 includes a home automation platform and/or a smart home platform that controls one or more functions and/or characteristics of a home, a house, and/or a building. In some embodiments, environment 800 is environment 400 or environment 401 described in FIGS. 4A-4H or environment 600 described in FIGS. 6A-6I. Environment 800 can include any or all of the features of environment 400 or environment 401 (e.g., windows 402) and/or environment 600, such as lighting arrays 602a-602d, lighting elements 604a-604d, individual displays 606a-606d, common displays 608a-608b, and/or audio sources 610a-610f. In some embodiments, any or all of the features described with reference to environment 400, environment 401, and/or environment 600 can be applied to environment 800. Similarly, environment 400, environment 401, and/or environment 600 can include any or all of the features of environment 800, and any or all of the features described with reference to environment 800 can be applied to environment 400, environment 401, and/or environment 600.

In some embodiments, the side of environment 800 at the top of FIG. 8A is a front side (or forward-facing side) and/or a north side; the side of environment 800 on the left of FIG. 8A is a left side and/or a west side; the side of environment 800 on the right of FIG. 8A is a right side and/or an east side; and the side of environment 800 at the bottom of FIG. 8A is a back side (or rear side or backward-facing side) and/or a south side.

In the embodiment illustrated in FIG. 8A, environment 800 includes common audio sources 802a-802d (e.g., speakers) and individual audio sources 804a1, 804a2, 804b1, 804b2, 804c1, 804c2, 804d1, and 804d2 (e.g., speakers, headphone speakers, and/or earbud speakers). Individual audio sources 804a1 and 804a2 are associated with user 810a; individual audio sources 804b1 and 804b2 are associated with user 810b; individual audio sources 804c1 and 804c2 are associated with user 810c; and individual audio sources 804d1 and 804d2 are associated with user 810d. In some embodiments, the audio sources of environment 800 are controlled electronically by a computer system or controller, such as system 100 or a portion thereof.

Common audio sources 802 and individual audio sources 804 can output audio based on an event (e.g., 404a, 404b, 404c, 404d, 404e, 406a, 406b, 406c, 406e, 612, 616, 618, and/or 620) such as, e.g., a current event, an expected event, a position event, a motion event and/or a sound event. A position event can include a physical or virtual position of an object (e.g., external to environment 800), a physical position of environment 800, a virtual position of environment 800, a physical position of a person in environment 800, and/or a position of a person in environment 800. An event can include motion of an object (e.g., external to environment 800 or internal to environment 800), physical motion of environment 800, virtual motion of environment 800, physical motion of a person in environment 800, and/or virtual motion of a person in environment 800.

Figure 8B:
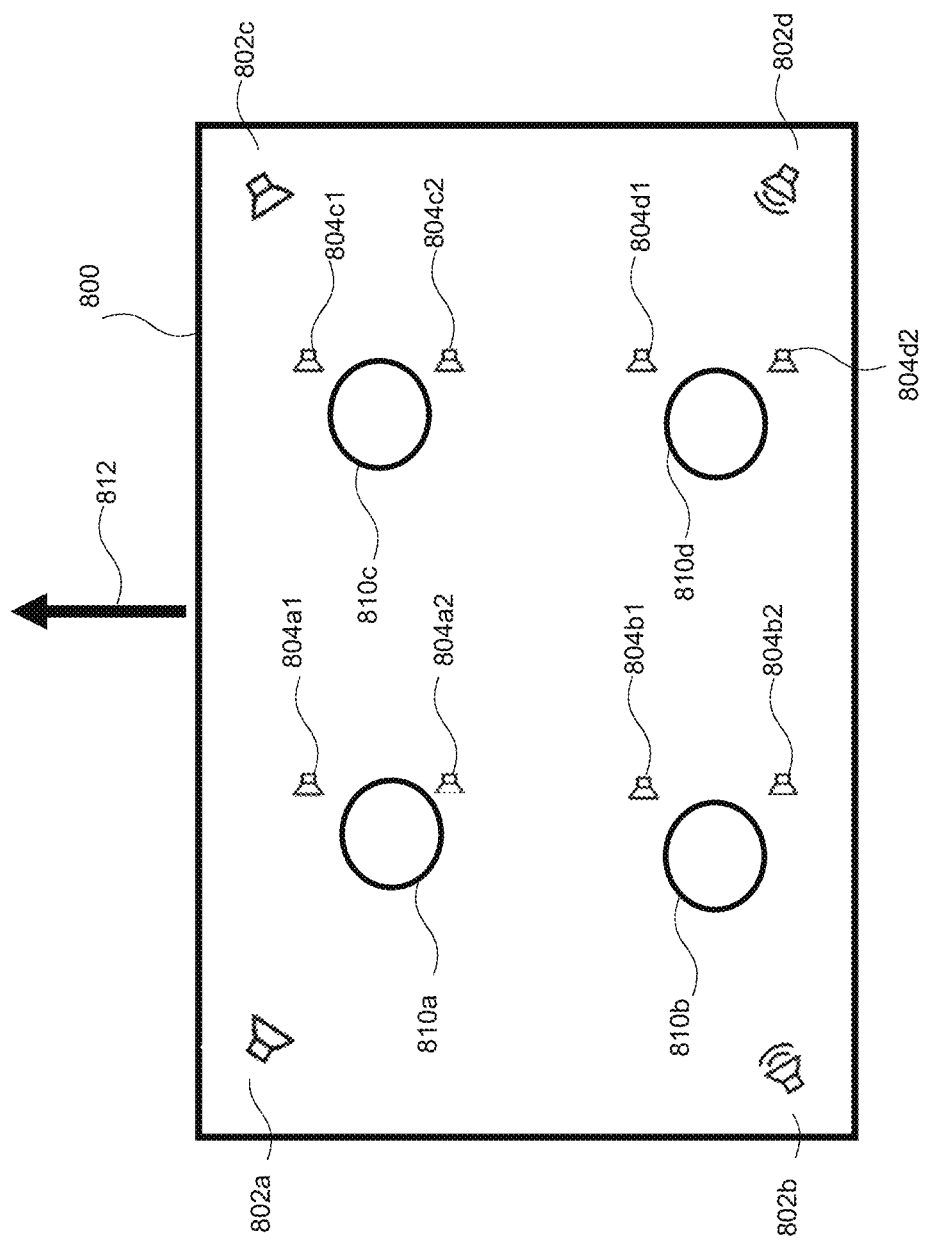

In FIG. 8B, event 812 occurs (e.g., is detected). In FIG. 8B, Motion 812 has a direction that is forward relative to the orientation of environment 800 shown in FIG. 8B (e.g., motion 812 is solely in the forward direction relative to environment 800; motion 812 does not have a left or right component relative to environment 800).

In response to event 812, common audio sources 802a and 802c output audio with a magnitude (e.g., amplitude, volume, and/or frequency) that is less than a magnitude of the audio output by common audio sources 802b and 802d. In the embodiment illustrated in FIG. 8B, in response to event 812, common audio sources 802b and 802d output audio, as indicated by the curved lines emitted from audio sources 802b and 802d, and common audio sources 802a and 802c do not output audio, as indicated by the lack of curved lines emitted from common audio sources 802a and 802c. More generally, the audio output (or the magnitude of audio output) of common audio sources 802 increases in the direction opposite of the direction of motion 812 from the front of environment 800 to the back of environment 800 (e.g., the audio occurs on the back side of environment 800 or "moves" from the front side of environment 800 to the back side of environment 800). In some embodiments, the variation in audio output provides the effect of motion in the direction of motion 812 (e.g., the sound "moves" or occurs in the opposite direction of the direction of motion 812). The sound varies along the front-back direction due to the forward component of motion 812 but does not vary along the left-right direction due to the lack of a left or right component to motion 812. Similar to the curved lines emitted from audio sources illustrated in FIGS. 6A-6I, curved lines emitted from audio sources in FIGS. 8A-8I are illustrated for descriptive purposes only and are not visible or displayed in environment 800.

Figure 8C:
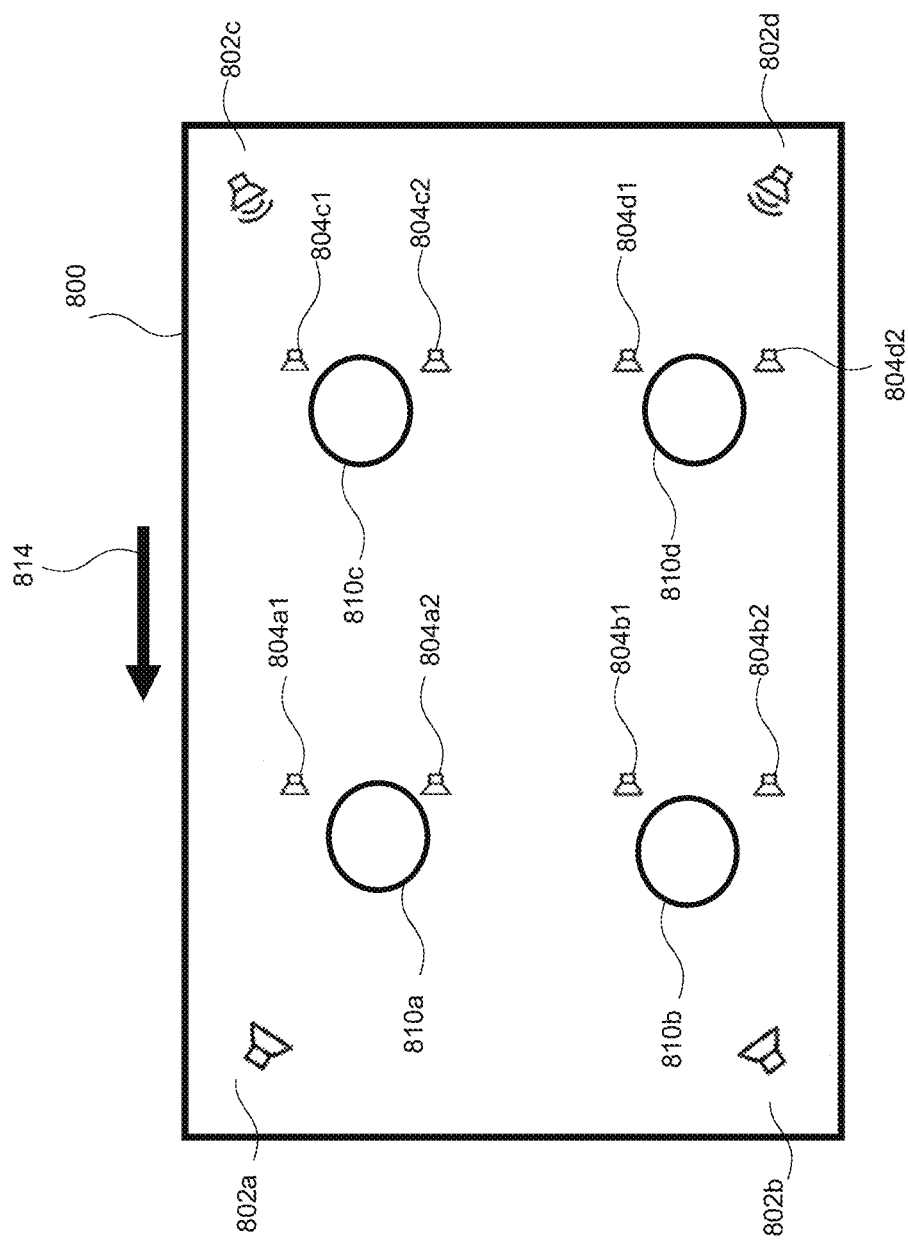

In FIG. 8C, event 814 occurs (e.g., is detected). In FIG. 8C, motion 814 has a direction that is leftward relative to environment 800 as shown in FIG. 8C (e.g., motion 814 is solely in the left-right direction relative to environment 800; motion 814 does not have a front-back component relative to environment 800).

In response to event 814, common audio sources 802*a* and 802*b* output audio with a magnitude (e.g., amplitude, volume, and/or frequency) that is less than a magnitude of the audio output by common audio sources 802*c* and 802*d*. In the embodiment illustrated in FIG. 8C, in response to event 814, common audio sources 802*c* and 802*d* output audio, as indicated by the curved lines emitted from common audio sources 802*c* and 802*d*, and common audio sources 802*a* and 802*b* do not output audio, as indicated by the lack of curved lines emitted from common audio sources 802*a* and 802*c*. More generally, the audio output (or the magnitude of audio output) of common audio sources 802 increases in the direction opposite of the direction of motion 814 from the left side of environment 800 to the right side of environment 800 (e.g., the audio occurs on the right side of environment 800 or "moves" from the left side of environment 800 to the right side of environment 800). In some embodiments, the variation in audio output provides the effect of motion in the direction of motion 814 (e.g., the sound "moves" or occurs in the opposite direction of the direction of motion 814). The sound varies along the left-right direction due to the leftward component of motion 814 but does not vary along the front-back direction due to the lack of a forward or backward component to motion 814.

Figure 8D:
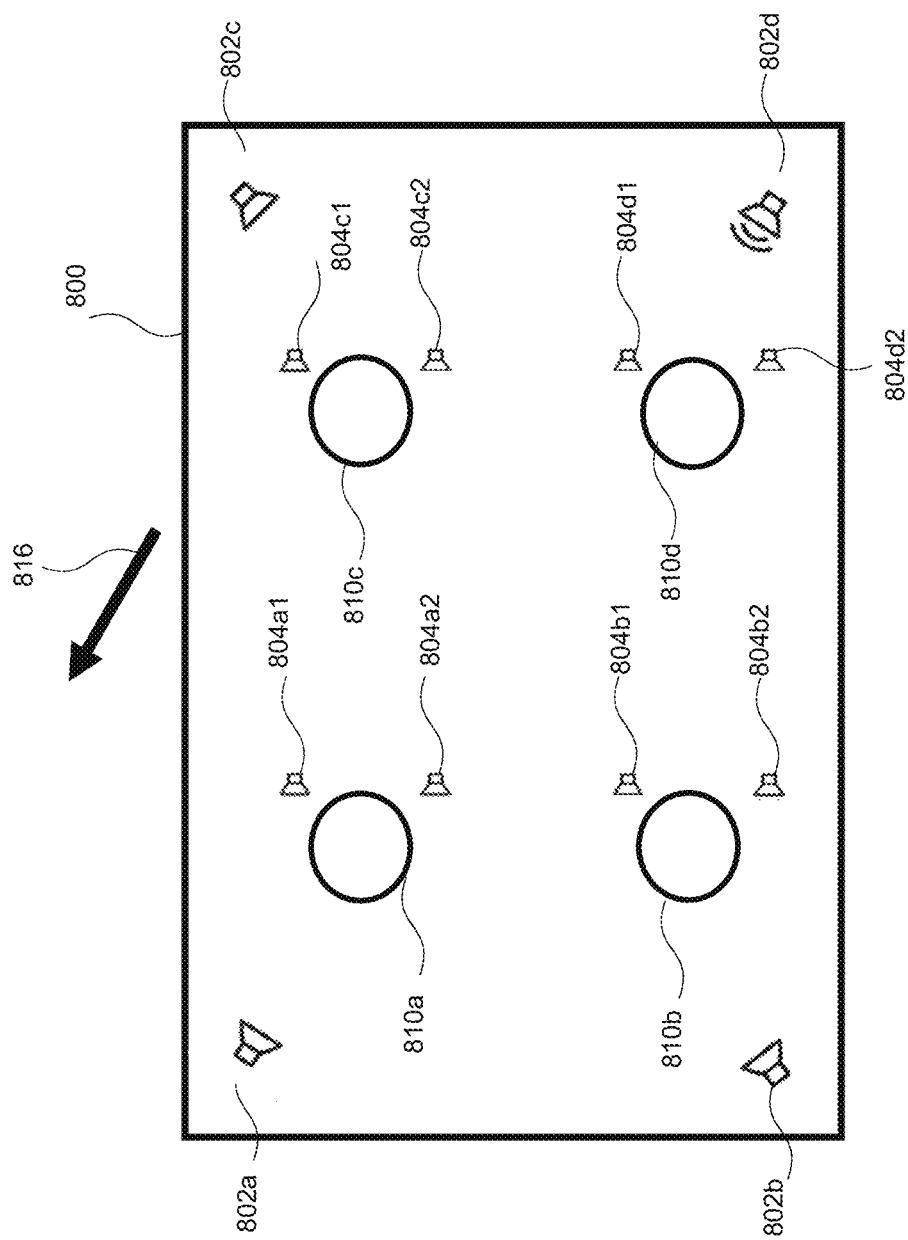

In FIG. 8D, event 816 occurs (e.g., is detected). In FIG. 8D, motion 816 has a direction that is forward and leftward relative to environment 800 as shown in FIG. 8D (e.g., motion 816 has a component in the left-right direction relative to environment 800 and a component in the front-back direction relative to environment 800).

In response to event 816, common audio sources 802*a*, 802*b*, and 802*c* output audio with a magnitude (e.g., amplitude, volume, and/or frequency) that is less than a magnitude of the audio output by common audio source 802*d*. In some embodiments, in response to event 816, common audio source 802*a* outputs audio with a magnitude (e.g., amplitude, volume, and/or frequency) that is less than a magnitude of the audio output by common audio sources 802*b* and 802*c*.

In the embodiment illustrated in FIG. 8D, in response to event 816, common audio source 802*d* outputs audio, as indicated by the curved lines emitted from audio source 802*d*, and common audio sources 802*a*, 802*b*, and 802*c* do not output audio, as indicated by the lack of curved lines emitted from audio sources 802*a*, 802*b*, and 802*c*. More generally, the audio output (or the magnitude of audio output) of common audio sources 802 increases in the direction opposite of the direction of motion 816 from the upper left side of environment 800 to the back right side of environment 800 (e.g., the audio occurs on the back right side of environment 800 or "moves" from the front left side of environment 800 to the back right side of environment 800). In some embodiments, the variation in audio output provides the effect of motion in the direction of motion 816 (e.g., the sound "moves" or occurs in the opposite direction of the direction of motion 816). The sound varies along the left-right direction due to the leftward component of motion 816 and varies along the front-back direction due to the forward component to motion 816.

Figure 8E:
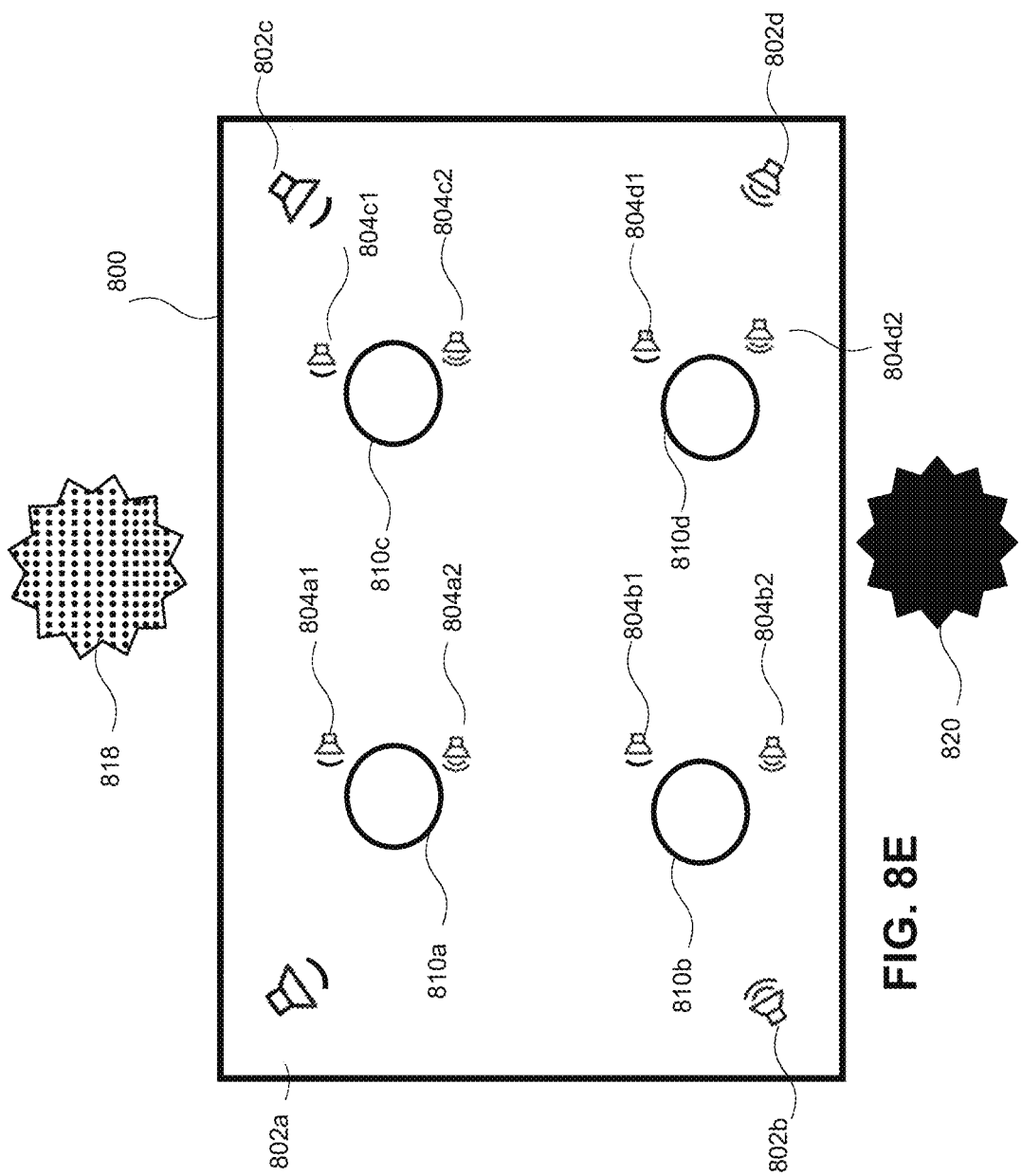

In FIG. 8E, event 818 occurs (e.g., is detected) and event 820 occurs (e.g., is detected). In FIG. 8E, event 818 occurs above environment 800 as oriented in FIG. 8E, and event 820 occurs below environment 800 as shown in FIG. 8E.

Common audio sources 802 output audio based on event 818. In response to event 818, common audio sources 802*a* and 802*c* on the front side of environment 800, output audio with a magnitude (e.g., amplitude, volume, and/or frequency) that is greater than a magnitude of the audio output by common audio sources 802*b* and 802*d* on the back side of environment 800.

In the embodiment illustrated in FIG. 8E, in response to event 818, common audio sources 802*a* and 802*c* output audio indicated by the single curved line emitted from common audio sources 802*a* and 802*c*, and common audio sources 802*b* and 802*d* output audio in response to event 820 indicated by the double curved line emitted from common audio sources 802*b* and 802*d*. More generally, the audio output (e.g., the content and/or magnitude of audio output) of common audio sources 802 due to event 818 occurs in the direction of the location of event 818 (e.g., the audio occurs on the front side of environment 800) and the audio output (e.g., the content and/or magnitude of audio output) of common audio sources 802 due to event 820 occurs in the direction of the location of event 820 (e.g., the audio occurs on the back side of environment 800). In some embodiments, the location of audio output provides an indication of the location and/or direction of event 818 and/or event 820 (e.g., the sound occurs in the direction of event 818 and/or 820).

Similarly, individual audio sources 804 output audio based on event 818. In response to event 818, individual audio sources 804*a*1, 804*b*1, 804*c*1, and 802*d*1, output audio with a magnitude (e.g., amplitude, volume, and/or frequency) that is greater than a magnitude of the audio output by individual audio sources 804*a*2, 804*b*2, 804*c*2, and 802*d*2.

In the embodiment illustrated in FIG. 8E, in response to event 818, individual audio sources 804*a*1, 804*b*1, 804*c*1, and 802*d*1 output audio, as indicated by the single curved line emitted from individual audio sources 804*a*1, 804*b*1, 804*c*1, and 802*d*1, and individual audio sources 804*a*2, 804*b*2, 804*c*2, and 802*d*2 do not output audio based on event 818 (but individual audio sources 804*a*2, 804*b*2, 804*c*2, and 802*d*2 do output audio based on event 820, as indicated by the double curved line emitted from individual audio sources 804*a*2, 804*b*2, 804*c*2, and 802*d*2, as discussed below). More generally, for a respective set (e.g., pair) of individual audio sources (e.g., 804*a*1 and 804*a*2; 804*b*1 and 804*b*1; 804*c*1 and cc804*c*2; or 804*d*1 and 804*d*2), the audio output (or the magnitude of audio output) of respective pair of audio sources occurs in the direction of event 818 (e.g., the audio occurs at the individual audio source of the respective pair that is closer to, or in the direction of, event 818). In some embodiments, the location of audio output provides an indication of the location and/or direction of event 818 (e.g., the sound occurs in the direction of event 818).

Common audio sources 802 output audio based on event 820. In response to event 820, common audio sources 802*b* and 802*d* on the bottom side of environment 800, output audio with different content and/or magnitude (e.g., amplitude, volume, and/or frequency) than the audio output by common audio sources 802*a* and 802*c* on the top side of environment 800.

In the embodiment illustrated in FIG. 8E, in response to event 820, common audio sources 802*b* and 802*d* output audio, as indicated by the double curved line emitted from common audio sources 802*b* and 802*d* (common audio sources 802*a* and 802*c* output audio based on event 818, as indicated by the single curved line emitted from common audio sources 802*a* and 802*c*). More generally, the audio output (or the magnitude of audio output) of common audio sources 802 due to event 820 occurs in the direction of the location of event 820 (e.g., the audio occurs on the front side of environment 800). In some embodiments, the location of audio output provides an indication of the location and/or direction of event 820 (e.g., the sound occurs in the direction of event 818).

Similarly, individual audio sources 804 output audio based on event 820. In response to event 820, individual audio sources 804*a*1, 804*b*1, 804*c*1, and 802*d*1, output audio with a magnitude (e.g., amplitude, volume, and/or frequency) that is greater than a magnitude of the audio output by individual audio sources 804*a*2, 804*b*2, 804*c*2, and 802*d*2.

In the embodiment illustrated in FIG. 8E, in response to event 820, individual audio sources 804*a*1, 804*b*1, 804*c*1, and 802*d*1 output audio, as indicated by the double curved lines emitted from individual audio sources 804*a*2, 804*b*2, 804*c*2, and 802*d*2, and individual audio sources 804*a*1, 804*b*1, 804*c*1, and 802*d*1 do not output audio based on event 820 (but do output audio based on event 818 as described above, as indicated by the single curved line emitted from individual audio sources 804*a*1, 804*b*1, 804*c*1, and 802*d*1). More generally, for a respective set (e.g., pair) of individual audio sources (e.g., 804*a*1 and 804*a*2; 804*b*1 and 804*b*1; 804*c*1 and cc804*c*2; or 804*d*1 and 804*d*2), the audio output (or the magnitude of audio output) of respective pair of audio sources occurs in the direction of event 820 (e.g., the audio occurs at the individual audio source of the respective pair that is closer to, or in the direction of, event 820). In some embodiments, the location of audio output provides an indication of the location and/or direction of event 820 for a respective set of audio sources (e.g., the sound occurs in the direction of event 820).

Figure 8G:
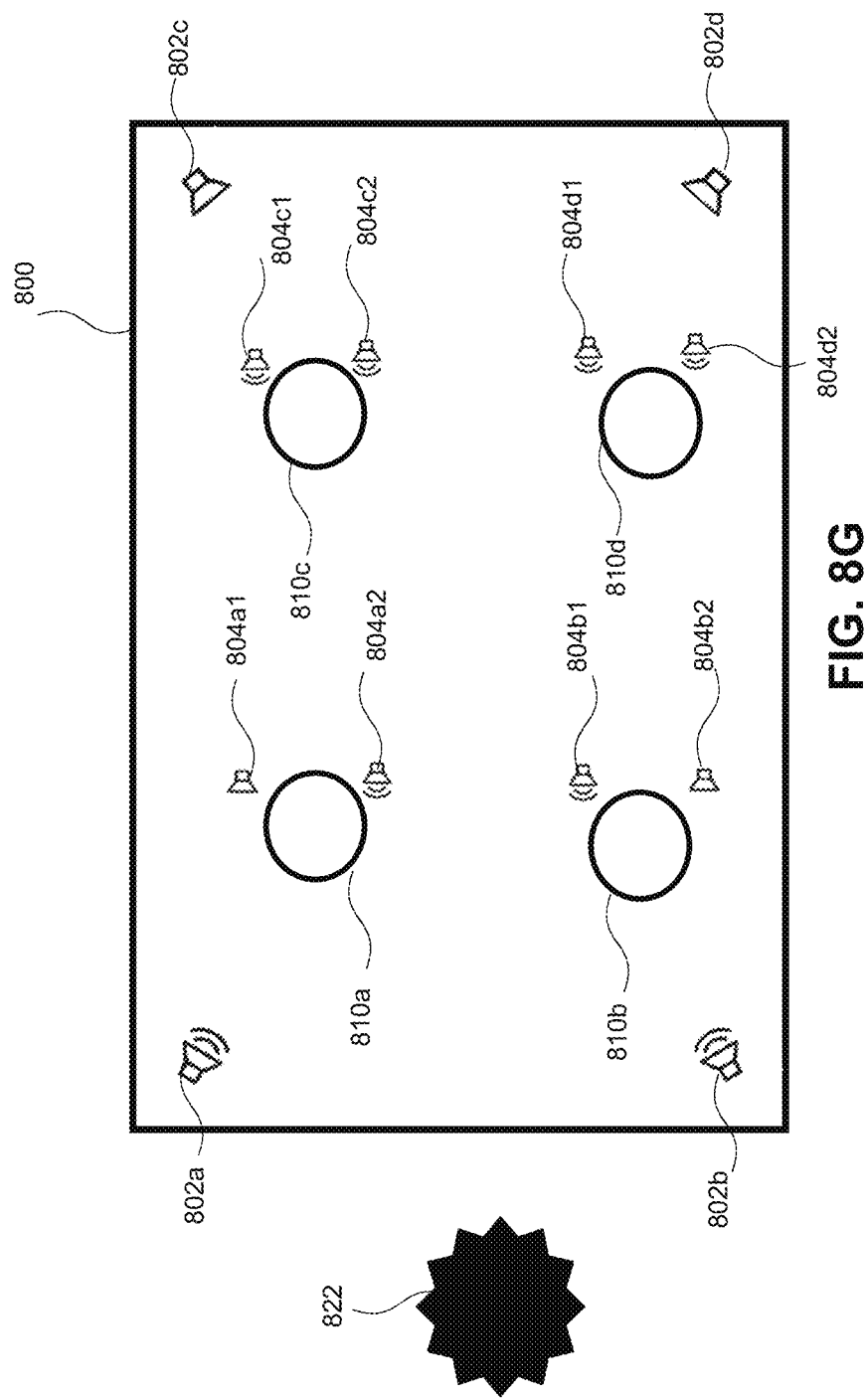

FIGS. 8F-8H illustrate sound output in response to an event as a location of the event changes relative to environment 800. In FIG. 8F, event 822 occurs (e.g., is detected) at a location that is in front of and to the left of environment 800; in FIG. 8G, event 822 occurs (e.g., is detected) at a location that is to the left of environment 800 (e.g., event 822 has moved backward relative to environment 800 compared to the location of event 822 in FIG. 8F); and in FIG. 8H, event 822 occurs (e.g., is detected) at a location that is behind and to the left of environment 800 (e.g., event 822 has moved backward relative to environment 800 compared to the location of event 822 in FIG. 8G). In some embodiments, event 822 is detected at the location shown in FIG. 8F at a first time, detected at the location shown in FIG. 8G at a second time (e.g., after the first time), and detected at the location shown in FIG. 8H at a third time (e.g., after the second time). For example, event 822 moves relative to environment 800 over time.

When event 822 is at the location shown in FIG. 8F (e.g., in response to detection of event 822 at the location shown in FIG. 8F), common audio source 802*a* outputs audio, as indicated by the curved lines emitted from common audio source 802*a* to indicate the location of event 822 at the current time. More generally, the audio output (or the magnitude of audio output) of common audio sources 802 due to event 822 occurs in the direction of the location of event 822 at the present time (e.g., the audio occurs on the top left side of environment 800).

Similarly, individual audio sources 804 output audio based on event 822. When event 822 is at the location shown in FIG. 8F (e.g., in response to detection of event 822 at the location shown in FIG. 8F), individual audio sources 804*a*1, 804*b*1, 804*c*1, and 802*d*1, output audio with a magnitude (e.g., amplitude, volume, and/or frequency) that is greater than a magnitude of the audio output by individual audio sources 804*a*2, 804*b*2, 804*c*2, and 802*d*2.

In the embodiment illustrated in FIG. 8F, in response to event 822, individual audio sources 804*a*1, 804*b*1, 804*c*1, and 802*d*1 output audio, as indicated by the double curved lines emitted from individual audio sources 804*a*2, 804*b*2, 804*c*2, and 802*d*2, and individual audio sources 804*a*1, 804*b*1, 804*c*1, and 802*d*1 do not output audio based on event 822. More generally, for a respective set (e.g., pair) of individual audio sources (e.g., 804*a*1 and 804*a*2; 804*b*1 and 804*b*1; 804*c*1 and cc804*c*2; or 804*d*1 and 804*d*2), the audio output (or the magnitude of audio output) of respective pair of audio sources occurs in the direction of event 822 (e.g., the audio occurs at the individual audio source of the respective pair that is closer to, or in the direction of, event 822). In some embodiments, the location of audio output provides an indication of the location and/or direction of event 822 for a respective set of audio sources (e.g., the sound occurs in the direction of event 822).

When event 822 is at the location shown in FIG. 8G (e.g., in response to detection of event 822 at the location shown in FIG. 8G), common audio sources 802*a* and 802*b* output audio, as indicated by the curved lines emitted from common audio sources 802*a* and 802*b* to indicate the location of event 822 at the current time. Compared to FIG. 8F, common audio source 802*b* outputs audio because event 822 is to the left of environment 800, but is not (e.g., is no longer) in front of environment 800.

Similarly, the output of individual audio sources 804 is different (e.g., has changed and/or is updated) compared to the output when event 822 was at the location shown in FIG. 8F. When event 822 is at the location shown in FIG. 8G (e.g., in response to detection of event 822 at the location shown in FIG. 8G), individual audio sources 804*a*2, 804*b*1, 804*c*1, 804*c*2, 804*d*1, and 802*d*2 output audio, as indicated by the double curved lines emitted from individual audio sources 804*ab*, 804*b*1, 804*c*1, 804*c*2, 804*d*1, and 802*d*2. More generally, for a respective set (e.g., pair) of individual audio sources (e.g., 804*a*1 and 804*a*2; 804*b*1 and 804*b*1; 804*c*1 and 804*c*2; or 804*d*1 and 804*d*2), the audio output (or the magnitude of audio output) of respective pair of audio sources occurs in the direction of event 822 relative to the respective set of individual audio sources (e.g., the audio occurs at the individual audio source of the respective pair that is closer to, or in the direction of, event 822). In FIG. 8G, individual audio source 804*a*2 is closer to event 822 compared to individual audio source 804*a*1 (e.g., event 822 is behind user 810*a*); and individual audio source 804*b*1 is closer to event 822 compared to individual audio source 804*b*2 (e.g., event 822 is in front of user 810*b*). However, because user 810*c* is further from event 822 than user 810*a*, individual audio sources 804c1 and 804c2 output audio in response to event 822 at the location of event 822 in FIG. 8G (e.g., because event 822 is not determined to be below user 810c because the angle between user 810c and event 822 in FIG. 8G relative to a left-right line does not satisfy (e.g., is not greater than or equal to) a threshold angle). Similarly, because user 810d is further from event 822 than user 810b, individual audio sources 804d1 and 804d2 output audio in response to event 822 at the location of event 822 in FIG. 8G (e.g., because event 822 is not determined to be above user 810d because the angle between user 810d and event 822 in FIG. 8G relative to a left-right line does not satisfy (e.g., is not greater than or equal to) a threshold angle).

When event 822 is at the location shown in FIG. 8H (e.g., in response to detection of event 822 at the location shown in FIG. 8H), common audio source 802b outputs audio, as indicated by the curved lines emitted from common audio sources 802b to indicate the location of event 822 at the current time. Compared to FIG. 8G, common audio source 802a does not output audio because event 822 is below environment 800 (e.g., even though event 822 is still to the left of environment 800).

Similarly, the output of individual audio sources 804 is different (e.g., has changed and/or is updated) compared to the output when event 822 was at the location shown in FIG. 8G. When event 822 is at the location shown in FIG. 8H (e.g., in response to detection of event 822 at the location shown in FIG. 8H), individual audio sources 804a2, 804b2, 804c2, and 802d2 output audio, as indicated by the curved lines emitted from individual audio sources 804a2, 804b2, 804c2, and 802d2. More generally, for a respective set (e.g., pair) of individual audio sources (e.g., 804a1 and 804a2; 804b1 and 804b1; 804c1 and cc804c2; or 804d1 and 804d2), the audio output (or the magnitude of audio output) of respective pair of audio sources occurs in the direction of event 822 relative to the respective set of individual audio sources (e.g., the audio occurs at the individual audio source of the respective pair that is closer to, or in the direction of, event 822). In FIG. 8H, individual audio source 804a2 is closer to event 822 compared to individual audio source 804a1 (e.g., event 822 is behind user 810a); individual audio source 804b2 is closer to event 822 compared to individual audio source 804b1 (e.g., event 822 is behind user 810b); individual audio source 804c2 is closer to event 822 compared to individual audio source 804c1 (e.g., event 822 is behind user 810c); and individual audio source 804d2 is closer to event 822 compared to individual audio source 804d1 (e.g., event 822 is behind user 810d). In particular, because event 822 has moved further backward relative to user 810c compared to the location of event 822 in FIG. 8G (e.g., event 822 is determined to be behind user 810c because the angle between user 810c and event 822 in FIG. 8H relative to a left-right line satisfies (e.g., is greater than and/or equal to) a threshold angle), individual audio source 804c1 does not output audio. Similarly, because event 822 has moved further backward relative to user 810d compared to the location of event 822 in FIG. 8G (e.g., event 822 is determined to be behind user 810d because the angle between user 810d and event 822 in FIG. 8H relative to a left-right line satisfies (e.g., is greater than and/or equal to) a threshold angle), individual audio source 804d1 does not output audio.

Figure 8I:
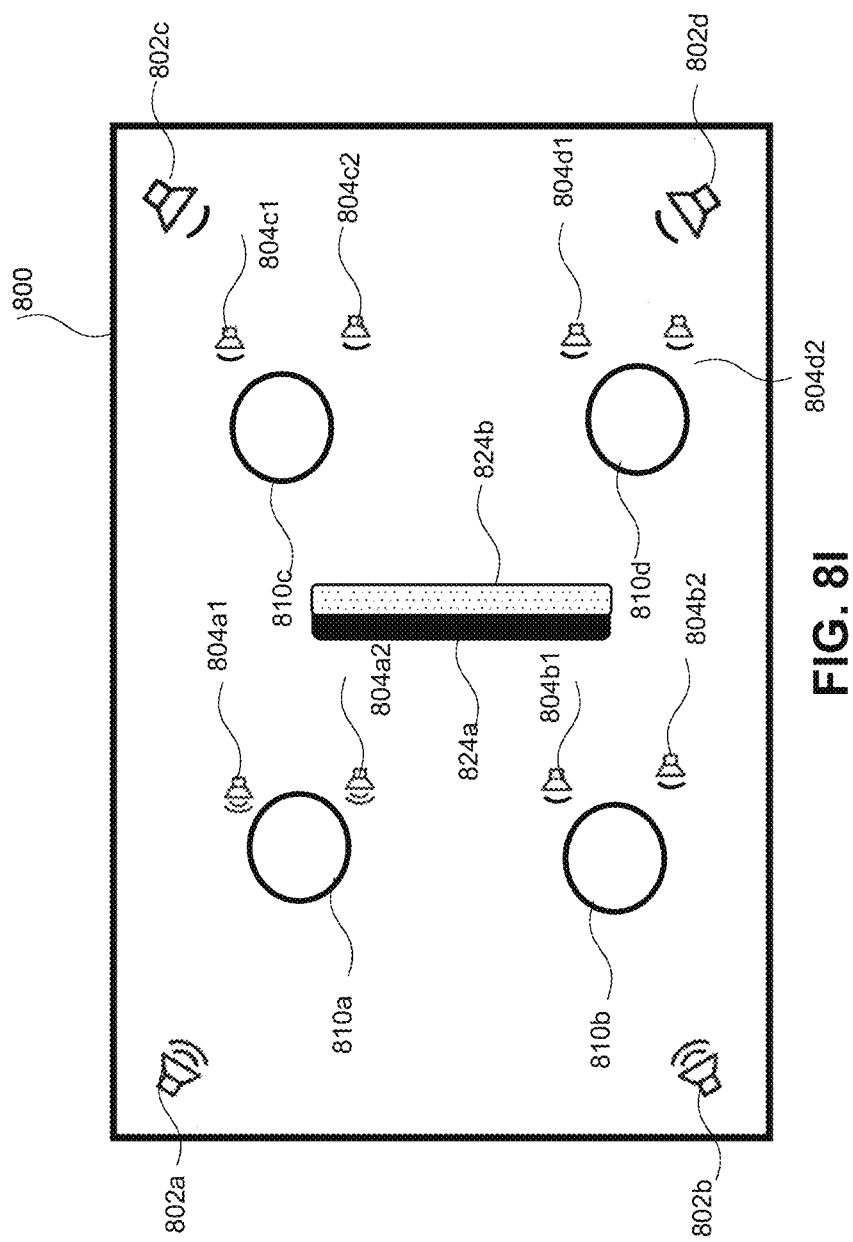

FIG. 8I illustrates an embodiment in which a subset (e.g., one or more) of audio sources (e.g., a subset of common audio sources 802 and/or a subset of individual audio sources 804) is controlled individually and/or independently from another subset of audio sources (e.g., another subset of common audio sources 802 and/or another subset of individual audio sources 804). FIG. 8I also illustrates an embodiment in which audio output is coordinated with displayed content.

In FIG. 8I, display 824a displays first content and display 824b displays second content that is different from the first content displayed on display 824a. Common audio sources 802a and 802b output audio associated with the first content at least in part because the location of common audio sources 802a and 802b is associated with display 824a (e.g., common audio sources 802a and 802b are on a same side of environment 800 as display 824a and/or display 824a faces common audio sources 802a and 802b). Individual audio sources 804a1 and 804a2 associated with user 810a output audio associated with the first content at least in part because the location of individual audio sources 804a1 and 804a2 (e.g., the location of user 810a) is associated with display 824a (e.g., individual audio sources 804a1 and 804a2 are on the same side of environment 800 as display 824a and/or display 824a faces individual audio sources 804a1 and 804a2). In some embodiments, individual audio sources 804a1 and 804a2 output audio associated with the first content because user 810a selects the first content for display on display 824a. In some embodiments, a user can select content for display on display 824a by interacting with display 824a (e.g., display 824a includes a touch-sensitive surface and/or display 824a is a touch-sensitive display), by using a computing device (a tablet computer, a smartphone, and/or a smartwatch) that is in communication with display 824a (e.g., via a Bluetooth and/or wi-fi connection), and/or by using a remote control that is in communication with display 824a and/or a computer system in communication with display 824a. In some embodiments, individual audio sources 804a1 and 804a2 output audio associated with the first content based on a set of display criteria. In some embodiments, the display criteria includes a criterion that is met if display 824a displays content that is determined to be relevant to user 810a (e.g., a message sent to and/or intended for user 810a, an event in a calendar associated with user 810a, a live video communication session in which user 810a is a participant, map information associated with user 810a, and/or trip status associated with a destination associated with user 810a).

Individual audio sources 804b output audio that is different from the audio output by individual audio sources 804a, as indicated by individual audio sources 804b emitting single curved lines instead of double curved lines like individual audio sources 804a. Individual audio sources 804b output audio that is different from the audio output by individual audio sources 804a even though display 824a faces user 810b and is on the same side of environment 800 as display 824a. In some embodiments, individual audio sources 804b output audio that is different from the audio output by individual audio sources 804a because user 810b has selected content (e.g., music, a podcast, and/or a movie) that is different from the first content displayed on display 824a. In some embodiments, individual audio sources 804b output audio that is different from the audio output by individual audio sources 804a because user 810b is participating in an audio communication (e.g., phone call) and/or video communication (e.g., a video chat and/or live audio/video communication session) in which user 810a is not a participant. In some embodiments, individual audio sources 804b output audio that is different from the audio output by individual audio sources 804a because the audio output by individual audio sources 804*b* is determined to be relevant to user 810*b* but not to user 810*a* (e.g., relevant only to user 810*b*).

Common audio sources 802*c* and 802*d* output audio associated with the second content (as indicated by the single curved lines emitted from common audio sources 802*c* and 802*d*) at least in part because the location of common audio sources 802*c* and 802*d* is associated with display 824*b* (e.g., common audio sources 802*c* and 802*d* are on a same side of environment 800 as display 824*b* and/or display 824*b* faces common audio sources 802*c* and 802*d*).

Individual audio sources 804*c*1 and 804*c*2 associated with user 810*c* output audio associated with the second content (as indicated by the curved lines emitted from individual audio sources 804*c*1 and 804*c*2 shown in the same single curved lines emitted from common audio sources 802*c* and 802*d*) at least in part because the location of individual audio sources 804*c*1 and 804*c*2 (e.g., the location of user 810*c*) is associated with display 824*b* (e.g., individual audio sources 804*c*1 and 804*c*2 are on the same side of environment 800 as display 824*b* and/or display 824*b* faces individual audio sources 804*c*1 and 804*c*2). In some embodiments, individual audio sources 804*c*1 and 804*c*2 output audio associated with the second content because user 810*c* selects the second content for display on display 824*b*. In some embodiments, a user can select content for display on display 824*b* using techniques analogous to any of the techniques described for selecting content for display on display 824*a*.

Similarly, individual audio sources 804*d*1 and 804*d*2 associated with user 810*d* output audio associated with the second content (as indicated by the curved lines emitted from audio sources 804*d*1 and 804*d*2 being the same single curved lines as the single curved lines emitted from common audio sources 802*c* and 802*d* and individual audio sources 804*c*1 and 804*c*2) at least in part because the location of individual audio sources 804*d*1 and 804*d*2 (e.g., the location of user 810*d*) is associated with display 824*b* (e.g., individual audio sources 804*d*1 and 804*d*2 are on the same side of environment 800 as display 824*b* and/or display 824*b* faces individual audio sources 804*d*1 and 804*d*2). In some embodiments, individual audio sources 804*d*1 and 804*d*2 output audio associated with the second content because user 810*d* selects the second content for display on display 824*b*.

Figure 9:
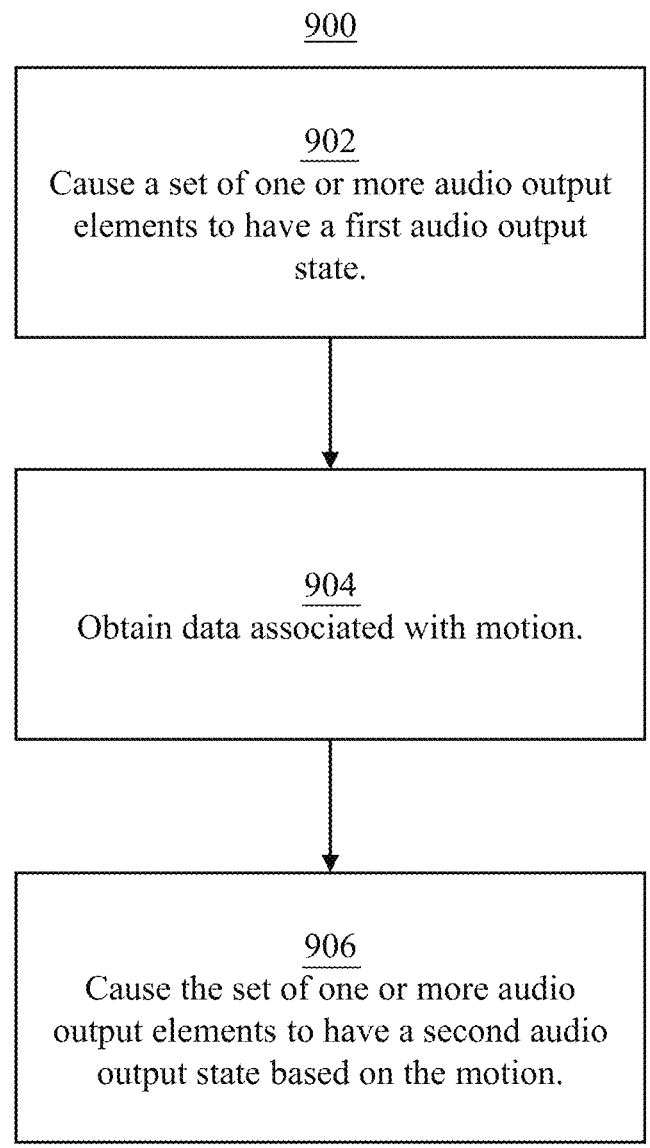
FIG. 9 is a flow diagram that illustrates a method for providing visual and/or audio output in accordance with some embodiments.

The user interfaces in FIGS. 8A-8I are used to illustrate the methods described below, including the methods in FIG. 9. FIG. 9 is a flow diagram that illustrates a method for providing visual and/or audio output in accordance with some embodiments. In some embodiments, method 900 is performed at least partially by a system (e.g., 100 or a portion thereof) that is in communication with visual output elements (e.g., lighting elements and/or displays) and/or audio output elements (e.g., speakers). Some operations in method 900 are, optionally, combined, the orders of some operations are, optionally, changed, and some operations are, optionally, omitted.

At block 802, a set of one or more audio output elements (e.g., 610, 802, and/or 804) (e.g., speakers) of a vehicle (e.g., 400, 401, 600, or 800) is caused (e.g., electronically, via a controller, automatically, and/or without user input) to have a first audio output state (e.g., the audio output state of 610 in FIG. 6C, 6D, 6E, 6F, 6G, or 6H; or the audio output state of 802 and/or 804 in FIG. 8B, 8C, 8D, 8E, 8F, 8G, 8H, or 8I) (e.g., volume level, amplitude, frequency, audio content (such as, e.g., music, audio associated with a video, a sound, an announcement, and/or an audio notification), amplitude pattern and/or frequency pattern, and/or no output). At block 604, data associated with (e.g., indicative of and/or that represents) motion (e.g., 208*a*, 208*b*, 208*c*, 208*d*, 208*e*, 208*f*, 222*a*, 222*b*, 222*c*, 222*d*, 222*e*, 222*f*, 222*g*, 404*a*, 404*b*, 404*c*1, 404*d*, 404*e*, 406*a*, 406*b*, 406*c*, 612, 616, 618, 620, 812, 814, 816, 818, 820, and/or 822) (e.g., measured motion, detected motion, speed, velocity, acceleration, rotation, vibration, planned motion, expected motion, anticipated motion, a planned maneuver, an expected maneuver, and/or an anticipated maneuver) of the vehicle is obtained (e.g., received or detected. At block 606, after (e.g., in response to) receiving the data associated with motion of the vehicle, the set of one or more audio output elements is caused (e.g., electronically, via a controller, automatically, and/or without user input) to have a second audio output state (e.g., the audio output state of 610 in FIG. 6C, 6D, 6E, 6F, 6G, or 6H; or the audio output state of 802 and/or 804 in FIG. 8B, 8C, 8D, 8E, 8F, 8G, 8H, or 8I) that is different from the first audio output state. In some embodiments, the second audio output state (and/or, optionally, the difference between the second audio output state and the first audio output state (e.g., the change in audio output state)) is based on the motion of the vehicle. In some embodiments, in accordance with (or in response to) a determination that the motion of the vehicle includes first motion, the second audio output state has a first set of parameters; and in accordance with (or in response to) a determination that the motion of the vehicle includes second motion that is different from the first motion, the second audio output state has a second set of parameters that is different from the first set of parameters.

In some embodiments, the set of one or more audio output elements is in an interior (e.g., a cabin) of the vehicle. In some embodiments, the set of one or more audio output elements is associated with a user in the vehicle (e.g., 804) (and, optionally, is not associated with another user in the vehicle). In some embodiments, the set of one or more audio output elements output audio associated with a particular user, as opposed to audio that is associated with the vehicle more generally and/or multiple (or all) users in the vehicle.

In some embodiments, the set of one or more audio output elements includes a first audio output element (e.g., 610*a*, 610*b*, 610*c*, 610*d*, 802*a*, 802*b*, 802*c*, 802*d*, 804*a*1,804*a*2, 804*b*1, 804*b*2, 804*c*1, 804*c*2, 804*d*1, and/or 804*d*2) (e.g., at a first position in the vehicle) and a second audio output element (e.g., at a second position in the vehicle that is different from the first position of the first audio output element). In some embodiments, causing the set of one or more audio output elements to have the second audio output state includes: in accordance with a determination that the motion of the vehicle includes first motion (e.g., 812), causing the first audio output element (e.g., 802*b* or 802*d*) to output audio without causing the second output element (e.g., 802*a* or 802*c*) to output audio; and in accordance with a determination that the motion of the vehicle includes second motion (e.g., 814) that is different from the first motion, causing the second audio output element (e.g., 802*c* or 802*d*) to output audio without causing the first output element (e.g., 802*a* or 802*b*) to output audio. In some embodiments, the motion of the vehicle determines the position of sound in the vehicle (e.g., which audio output elements output audio and/or the audio output state of the first audio output element and the audio output state of the second audio output element).

In some embodiments, causing the set of one or more audio output elements to have the first audio output state includes causing the first audio output element to output audio without causing the second output element to output audio, and causing the set of one or more audio output elements to have the second audio output state includes causing the second audio output element to output audio without causing the first output element to output audio (e.g., as described with reference to FIGS. 8F-8H). In some embodiments, changing the audio output state includes changing a position of the audio output (e.g., changing the audio output element that provides audio output).

In some embodiments, the set of one or more audio output elements (e.g., 802a and 802b; 802a and 802c; 802c and 802d; or 802b and 802d) is at least partially aligned (e.g., has a component) along a first audio dimension relative to the vehicle (e.g., longitudinally and/or from a front portion of the vehicle to a rear portion of the vehicle). In some embodiments, causing the set of one or more audio output elements to have the second audio output state includes causing the set of one or more audio output elements to have an audio pattern (e.g., audio that varies in amplitude and/or frequency) along the first audio dimension based on a component of the motion of the vehicle in a first motion dimension (e.g., as described with reference to FIGS. 8B, 8C, and 8D). In some embodiments, the audio pattern along the first audio dimension is based on forward and/or backward motion, such as acceleration (e.g., longitudinal motion but not side-to-side or lateral motion). In some embodiments, the audio pattern along the first audio dimension provides a user with a sensation of acceleration in a direction opposite to the direction of the motion of the vehicle.

In some embodiments, the set of one or more audio output elements (e.g., 802a and 802b; 802a and 802c; 802c and 802d; or 802b and 802d) is at least partially aligned (e.g., has a component) along a second audio dimension (e.g., different from and/or perpendicular to the first audio dimension) relative to the vehicle (e.g., laterally and/or from a right side portion of the vehicle to a left side portion of the vehicle). In some embodiments, causing the set of one or more audio output elements to have the second audio output state includes causing the set of one or more audio output elements to have an audio pattern (e.g., audio that varies in amplitude and/or frequency) along the second audio dimension based on a component of the motion of the vehicle in a second motion dimension (e.g., as described with reference to FIGS. 8B, 8C, and 8D) (e.g., different from and/or perpendicular to the first motion dimension). In some embodiments, the audio pattern along the second audio dimension is based on side-to-side motion (e.g., lateral motion but not front-to-back or longitudinal motion). In some embodiments, the audio pattern along the second audio dimension provides a user with a sensation of acceleration (e.g., turning) in a direction opposite to the direction of the motion of the vehicle.

In some embodiments, the second audio output state is based on a position of the vehicle. In some embodiments, in accordance with a determination that the vehicle is in a first position, the second audio output state has a first audio characteristic (e.g., a first amplitude, amplitude pattern in space and/or time, frequency, and/or frequency pattern in space and/or time); and in accordance with a determination that the vehicle is in a second position that is different from the first position, the second audio output state has a second audio characteristic (e.g., a second amplitude, amplitude pattern in space and/or time, frequency, and/or frequency pattern in space and/or time) that is different from the first audio characteristic.

In some embodiments, the second audio output state is based on a direction of the motion of the vehicle (e.g., as described with reference to FIG. 6H or 8C). In some embodiments, in accordance with a determination that the motion of the vehicle is in a first direction, the second audio output state has a first audio characteristic (e.g., a first amplitude, amplitude pattern in space and/or time, frequency, and/or frequency pattern in space and/or time); and in accordance with a determination that the motion of the vehicle is in a second direction that is different from the first direction, the second audio output state has a second audio characteristic (e.g., a second amplitude, amplitude pattern in space and/or time, frequency, and/or frequency pattern in space and/or time) that is different from the first audio characteristic.

In some embodiments, the second audio output state is based on a maneuver of the vehicle (e.g., parking, stopping, arriving, departing, turning, and/or changing velocity). In some embodiments, in accordance with a determination that the maneuver is a first maneuver, the second audio output state has a first audio characteristic (e.g., a first amplitude, amplitude pattern in space and/or time, frequency, and/or frequency pattern in space and/or time); and in accordance with a determination that the maneuver is a second maneuver that is different from the first maneuver, the second audio output state has a second audio characteristic (e.g., a second amplitude, amplitude pattern in space and/or time, frequency, and/or frequency pattern in space and/or time) that is different from the first audio characteristic. In some embodiments, the maneuver of the vehicle includes (e.g., is) a current maneuver (e.g., a maneuver currently being performed by the vehicle). In some embodiments, causing the set of one or more audio output elements to have the second audio output state is performed in response to (or in accordance with) a determination that the vehicle is performing a predefined maneuver. In some embodiments, the maneuver of the vehicle includes (e.g., is) an expected (or anticipated, upcoming, or planned) maneuver (e.g., a maneuver that is scheduled or planned to be performed by the vehicle). In some embodiments, causing the set of one or more audio output elements to have the second audio output state is performed in response to (or in accordance with) a determination that the vehicle is expected to perform a predefined maneuver.

In some embodiments, an amplitude and/or frequency of the second audio output state is proportional (e.g., directly proportional) to a magnitude of the motion of the vehicle. In some embodiments, in accordance with a first magnitude of motion, the second audio output state has a first magnitude; and in accordance with a second magnitude of motion that is different from the first magnitude, the second audio output state has a second magnitude (e.g., a larger magnitude of motion causes a larger magnitude in the second audio output state than a smaller magnitude of motion).

In some embodiments, a difference between the second audio output state and the first audio output state (e.g., a change in the audio output state of the set of one or more audio output elements) is proportional (e.g., directly proportional) to a magnitude of the motion of the vehicle. In some embodiments, in accordance with a first magnitude of motion, there is a first difference between the second audio output state and the first audio output state; and in accordance with a second magnitude of motion that is different from the first magnitude, there is a second difference between the second audio output state and the first audio output state (e.g., a larger magnitude of motion causes a larger difference between the second audio output state and the first audio output state (or a larger change in the audio output state of the set of one or more audio output elements) than a smaller magnitude of motion).

In some embodiments, in response to an occurrence of an event (e.g., a real-world event, a virtual event, and/or an event external to the vehicle) at a first external position (e.g., a first physical position or a first virtual position) in an external environment (e.g., the outside world or an environment outside the vehicle), where the first external position has a relative position relative to the vehicle (e.g., the event is in front of the vehicle), the set of one or more audio output elements is caused to have a third audio output state in which sound corresponding to the event is produced to seem as though the sound is located at the first position in the external environment. In some embodiments, after causing the set of one or more audio output elements to have the third audio output state in which a sound corresponding to the event is produced to seem as though the sound is located at the first position in the external environment and while the event is at the first external position, in response to a change in the relative position of the event relative to the vehicle (e.g., the event is at the same position in the external environment, but the position of the vehicle has changed), the set of one or more audio output elements is caused to have a fourth audio output state in which the sound corresponding to the event is produced to seem as though the sound is located at the first position in the external environment (e.g., the audio output is changed so that the position of the sound corresponding to the event remains at the same location in the external environment). In some embodiments, the position of the sound corresponding to the event is fixed relative to the environment outside the vehicle (e.g., the sound is world-locked; the position of the sound corresponding to the event has a stationary point in the world; the sound is road-locked). In some embodiments, the sound corresponding to the event stays in the same position in the world even though the vehicle is changing orientation relative to the event.

In some embodiments, the set of one or more audio output elements is caused to output audio that corresponds to a real-world phenomenon (e.g., object, event, and/or condition). In some embodiments, the real-world phenomenon includes (or is) a police officer, a siren, ambient wind noise, white noise, ocean noise, and/or calming sounds. In some embodiments, the real-world phenomenon correlates to a phenomenon that can be seen (e.g., has a line of sight or an unobstructed line of sight) from the vehicle (e.g., from a cabin of the vehicle). In some embodiments, the audio that corresponds to the real-world phenomenon includes simulated sound (e.g., a fictional sound, a chime, a tone, and/or a designated sound (such as a sound designated by a user to correspond to a predefined phenomenon)). In some embodiments, the audio that corresponds to the real-world phenomenon includes amplified sound (e.g., sound captured from the environment outside the vehicle that is amplified). In some embodiments, causing the set of one or more audio output elements to output audio that corresponds to the real-world phenomenon includes outputting the audio that corresponds to the real-world phenomenon based on a position (e.g., a physical or virtual position) of the real-world phenomenon (e.g., as described with reference to FIGS. 8E-8H). In some embodiments, in accordance with a determination that the real-world phenomenon has a first position, the audio that corresponds to the real-world phenomenon is output in a third audio state (e.g., output by some audio elements of the set of one or more audio output elements, such as elements that are closer to or in the direction of the position of the real-world phenomenon, is greater than output by other audio elements of the set of one or more audio output elements, such as elements that are farther away from or in a direction opposite of the position of the real-world phenomenon).

In some embodiments, causing the set of one or more audio output element to have the second audio output state includes causing the set of one or more audio output element to output (e.g., concurrently output) first audio based on (e.g., corresponding to) the motion of the vehicle and second audio (e.g., audio associated with media content currently being played by a user) that is different from the first audio. In some embodiments, after (e.g., in response to) obtaining the data associated with the motion of the vehicle, a visual effect is caused that is coordinated (e.g., provided concurrently) with causing the set of one or more audio output elements to have the second audio output state (e.g., as described with reference to FIGS. 6C-6H and 8I).

In some embodiments, the second audio output state is based on a user (e.g., as described with reference to FIGS. 8E-8I). In some embodiments, in accordance with a determination that the set of one or more audio output elements is associated with a first user, the second audio output state of the set of one or more audio output elements is caused to have a first audio characteristic (e.g., a first amplitude, amplitude pattern in space and/or time, frequency, and/or frequency pattern in space and/or time); and in accordance with a determination that the set of one or more audio output elements is associated with a second user that is different from the first user, the second audio output state of the set of one or more audio output elements is caused to have a second audio characteristic (e.g., a second amplitude, amplitude pattern in space and/or time, frequency, and/or frequency pattern in space and/or time) that is different from the first visual characteristic.

In some embodiments, in response to an occurrence of an event (e.g., a real-world event, a virtual event, and/or an event external to the vehicle) at a first position (e.g., a first physical position or a first virtual position) relative to the vehicle, the set of one or more audio output elements is caused to have a third audio output state that is based on the first position of the event. In some embodiments, after causing the set of one or more audio output elements to have the third audio output state that is based on the first position of the event, in response to an occurrence of the event (e.g., continued occurrence of the event) at a second position (e.g., a second physical position or a second virtual position) relative to the vehicle that is different from the first position of the event (e.g., the position of the event has changed over time), the set of one or more audio output elements is caused to have a fourth audio output state that is based on the second position of the event and that is different from the third audio output state (e.g., as described with reference to FIGS. 8F-8H). In some embodiments, changing from the third audio output state to the fourth audio output state simulates movement of the event. For example, if an ambulance siren approaches the vehicle from the front and then passes the vehicle, then sound corresponding to the siren output by the set of one or more audio output elements moves from output elements in the front of the vehicle, to output elements in the middle of the vehicle, and then to output elements in the rear of the vehicle as if the sound is passing the vehicle.

In some embodiments, a set of two or more audio output elements (e.g., speakers, sets of speakers, speaker pairs, headsets, earphones earbuds, and/or earbud pairs) in an interior (e.g., a cabin) of a vehicle is caused (e.g., electronically, via a controller, automatically, and/or without user input) to have a first audio output state (e.g., volume level, amplitude, frequency, audio content (such as, e.g., music, audio associated with a video, a sound, an announcement, and/or an audio notification), amplitude pattern and/or frequency pattern, and/or no output). In some embodiments, the set of two or more audio output elements includes a first audio output element and a second audio output element, and wherein the first audio output element and the second audio output elements are independently controllable (e.g., the audio output element can be controlled to output audio (e.g., sound) independently from the second audio output element, and the second audio output element can be controlled to output audio (e.g., sound) independently from the first audio output element). In some embodiments, the set of two or more audio output elements includes a first subset of one or more audio output elements that includes the first audio output element, and a second subset of one or more audio output elements that includes the second audio output element. In some embodiments, the first subset and the second subset are mutually exclusive (e.g., the first subset does not include any audio sources that are in the second subset, and the second subset does not include any audio sources that are in the first subset). In some embodiments, the first subset and the second subset are independently controllable.

In some embodiments, data associated with (e.g., indicative of and/or that represents) motion (e.g., measured motion, detected motion, speed, velocity, acceleration, rotation, vibration, planned motion, expected motion, anticipated motion, a planned maneuver, an expected maneuver, and/or an anticipated maneuver) of the vehicle is obtained (e.g., received or detected). In some embodiments, after (e.g., in response to) receiving the data associated with motion of the vehicle, the set of two or more audio output elements is caused (e.g., electronically, via a controller, automatically, and/or without user input) to have a second audio output state that is based on the motion of the vehicle and that is different from the first audio output state (e.g., updating or changing the audio output state based on the motion of the vehicle).

In some embodiments, causing the set of two or more audio output elements to have a second audio output state that is based on the motion of the vehicle includes causing the first audio output element to produce a first audio output based on the data associated with motion of the vehicle and causing (e.g., independently from causing the first audio output element to produce a first audio output based on the motion of the vehicle) the second audio output element to produce a second audio output (e.g., same as the first audio output or different from the first audio output) based on the data associated with motion of the vehicle.

In some embodiments, the difference between the second audio output state and the first audio output state (e.g., the change in audio output state) is based on the motion of the vehicle. In some embodiments, in accordance with (or in response to) a determination that the motion of the vehicle includes first motion, the second audio output state has a first set of parameters; and in accordance with (or in response to) a determination that the motion of the vehicle includes second motion that is different from the first motion, the second audio output state has a second set of parameters that is different from the first set of parameters.

In some embodiments, the vehicle includes an air output device (e.g., a fan, blower, and/or air jet) for moving and/or blowing air. In some embodiments, in response to obtaining the data associated with the motion of the vehicle, the air output device is caused (e.g., electronically, via a controller, automatically, and/or without user input) to generate (e.g., output and/or create) an air output (e.g., to move air and/or create a burst of air). In some embodiments, a characteristic (e.g., direction, velocity, flow, density, duration, temperature, and/or location) of the air output is based on a value (e.g., speed, velocity, acceleration, direction, rotation, and/or frequency) of the motion of the vehicle. For example, in accordance with (or, in some embodiments, in response to) the motion of the vehicle having a first value, the air output is generated with a first characteristic; and in accordance with (or, in some embodiments, in response to) the motion of the vehicle having a second value different from the first value, the air output is generated with a second characteristic different from the first characteristic. In some embodiments, the air output is generated concurrently (e.g., coordinated) with setting the audio output state of the set of one or more audio output elements.

In some embodiments, tactile output is generated (e.g., created and/or output) (e.g., via a tactile output device) in response to obtaining the data associated with the motion of the vehicle. In some embodiments, a characteristic (e.g., amplitude, duration, pattern, and/or frequency) of the tactile output is based on (e.g., proportional to) a value (e.g., direction, velocity, acceleration, speed, magnitude, rotation, and/or frequency) of the motion of the vehicle. In some embodiments, the tactile output is generated concurrently (e.g., coordinated) with setting the audio output state of the set of one or more audio output elements. In some embodiments, the tactile output is generated by a tactile output device of a computer system (e.g., a laptop computer, a tablet computer, a smartphone, and/or a smartwatch) located in and/or associated with the vehicle. In some embodiments, the tactile output is generated by a tactile output device of the vehicle. In some embodiments, the tactile output includes adjusting a suspension system (e.g., an active suspension system), vibrating a seat, adjusting (e.g., quickly tightening and/or loosening) a seat belt, and/or vibrating a steering wheel.

Details of the methods described above with respect to method 900 (e.g., FIG. 9) are also applicable in an analogous manner to the methods described below/above. For example, method 300, 500, and/or 700 optionally include one or more of the characteristics of the various methods described with reference to method 900.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the techniques and their practical applications. Others skilled in the art are thereby enabled to utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:
1. A computer system comprising:
one or more processors;
memory storing one or more programs configured to be executed by the one or more processors, the one or more programs including instructions for:

displaying:
  a dynamic graphical element in a first state; and
  graphical content in a second state;
while displaying the graphical content in the second state, receiving information corresponding to detected motion, wherein the detected motion is selected from the group consisting of: movement of the computer system, movement of an environment in which the computer system is located, virtual motion of the computer system, simulated motion of the computer system, and a combination thereof; and
in response to receiving the information corresponding to the detected motion:
  in accordance with a determination that the detected motion is in a first direction, displaying:
    the graphical content in the second state; and
    the dynamic graphical element in a third state, wherein the third state is different from the first state, and wherein the third state is based on the first direction of the detected motion; and
  in accordance with a determination that the detected motion is in a second direction that is different from the first direction, displaying:
    the graphical content in the second state; and
    the dynamic graphical element in a fourth state, wherein the fourth state is different from the first state and the third state, and wherein the fourth state is based on the second direction of the detected motion.

2. The computer system of claim 1, wherein the dynamic graphical element includes a plurality of graphical objects that move concurrently with one another.

3. The computer system of claim 1, wherein the dynamic graphical element includes a single graphical element.

4. The computer system of claim 1, wherein the dynamic graphical element includes a first element that is aligned along a first display dimension, and wherein the first element has a first visual state along the first display dimension that is based on a component of the detected motion in a first physical dimension.

5. The computer system of claim 4, wherein the dynamic graphical element includes a second element that is aligned along a second display dimension that is different from the first display dimension, and wherein the second element has a second visual state along the second display dimension that is based on a component of the detected motion in a second physical dimension that is different from the first physical dimension.

6. The computer system of claim 1, wherein the dynamic graphical element includes a boundary, wherein a position of the boundary is based on the detected motion.

7. The computer system of claim 1, wherein the one or more programs further include instructions for:
  while displaying the dynamic graphical element in the third state, detecting a request to change the graphical content; and
  in response to detecting the request to change the graphical content, displaying:
    the graphical content in a fifth state that is different from the second state; and
    the dynamic graphical element in the third state.

8. The computer system of claim 1, wherein the detected motion includes an acceleration.

9. The computer system of claim 1, wherein the detected motion includes a change in location.

10. The computer system of claim 1, wherein the third state of the dynamic graphical element is in a direction relative to the first state of the dynamic graphical element that is based on the first direction of the detected motion.

11. The computer system of claim 1, wherein the third state of the dynamic graphical element is different from the first state of the dynamic graphical element by an amount that is based on a magnitude of the detected motion.

12. The computer system of claim 1, wherein the detected motion is motion of an external object.

13. The computer system of claim 1, wherein the dynamic graphical element is displayed in a foreground.

14. The computer system of claim 1, wherein the dynamic graphical element is displayed in a background.

15. The computer system of claim 1, wherein:
  displaying the dynamic graphical element in the third state includes displaying a set of graphical elements in a first arrangement relative to one another in a first position; and
  displaying the dynamic graphical element in the fourth state includes displaying the set of graphical elements in the first arrangement relative to one another in a second position that is different from the first position.

16. The computer system of claim 1, wherein the one or more programs further include instructions for:
  in accordance with a determination that the detected motion includes no motion, displaying:
    the graphical content in the second state; and
    the dynamic graphical element in the first state.

17. The computer system of claim 16, wherein:
  displaying the dynamic graphical element in the first state includes displaying the dynamic graphical element with a first opacity;
  displaying the dynamic graphical element in the third state includes displaying the dynamic graphical element with a second opacity, greater than the first opacity; and
  displaying the dynamic graphical element in the fourth state includes displaying the dynamic graphical element with the second opacity.

18. A non-transitory computer-readable storage medium storing one or more programs configured to be executed by one or more processors of a computer system, the one or more programs including instructions for:
  displaying:
    a dynamic graphical element in a first state; and
    graphical content in a second state;
  while displaying the graphical content in the second state, receiving information corresponding to detected motion, wherein the detected motion is selected from the group consisting of: movement of the computer system, movement of an environment in which the computer system is located, virtual motion of the computer system, simulated motion of the computer system, and a combination thereof; and
  in response to receiving the information corresponding to the detected motion:
    in accordance with a determination that the detected motion is in a first direction, displaying:
      the graphical content in the second state; and
      the dynamic graphical element in a third state, wherein the third state is different from the first state, and wherein the third state is based on the first direction of the detected motion; and
    in accordance with a determination that the detected motion is in a second direction that is different from the first direction, displaying:

the graphical content in the second state; and
the dynamic graphical element in a fourth state, wherein the fourth state is different from the first state and the third state, and wherein the fourth state is based on the second direction of the detected motion.

19. The non-transitory computer-readable storage medium of claim 18, wherein the dynamic graphical element includes a plurality of graphical objects that move concurrently with one another.

20. The non-transitory computer-readable storage medium of claim 18, wherein the dynamic graphical element includes a single graphical element.

21. The non-transitory computer-readable storage medium of claim 18, wherein the dynamic graphical element includes a first element that is aligned along a first display dimension, and wherein the first element has a first visual state along the first display dimension that is based on a component of the detected motion in a first physical dimension.

22. The non-transitory computer-readable storage medium of claim 21, wherein the dynamic graphical element includes a second element that is aligned along a second display dimension that is different from the first display dimension, and wherein the second element has a second visual state along the second display dimension that is based on a component of the detected motion in a second physical dimension that is different from the first physical dimension.

23. The non-transitory computer-readable storage medium of claim 18, wherein the dynamic graphical element includes a boundary, wherein a position of the boundary is based on the detected motion.

24. The non-transitory computer-readable storage medium of claim 18, wherein the one or more programs further include instructions for:
while displaying the dynamic graphical element in the third state, detecting a request to change the graphical content; and
in response to detecting the request to change the graphical content, displaying:
the graphical content in a fifth state that is different from the second state; and
the dynamic graphical element in the third state.

25. The non-transitory computer-readable storage medium of claim 18, wherein the detected motion includes an acceleration.

26. The non-transitory computer-readable storage medium of claim 18, wherein the detected motion includes a change in location.

27. The non-transitory computer-readable storage medium of claim 18, wherein the third state of the dynamic graphical element is in a direction relative to the first state of the dynamic graphical element that is based on the first direction of the detected motion.

28. The non-transitory computer-readable storage medium of claim 18, wherein the third state of the dynamic graphical element is different from the first state of the dynamic graphical element by an amount that is based on a magnitude of the detected motion.

29. The non-transitory computer-readable storage medium of claim 18, wherein the detected motion is motion of an external object.

30. The non-transitory computer-readable storage medium of claim 18, wherein the dynamic graphical element is displayed in a foreground.

31. The non-transitory computer-readable storage medium of claim 18, wherein the dynamic graphical element is displayed in a background.

32. The non-transitory computer-readable storage medium of claim 18, wherein:
displaying the dynamic graphical element in the third state includes displaying a set of graphical elements in a first arrangement relative to one another in a first position; and
displaying the dynamic graphical element in the fourth state includes displaying the set of graphical elements in the first arrangement relative to one another in a second position that is different from the first position.

33. The non-transitory computer-readable storage medium of claim 18, wherein the one or more programs further include instructions for:
in accordance with a determination that the detected motion includes no motion, displaying:
the graphical content in the second state; and
the dynamic graphical element in the first state.

34. The non-transitory computer-readable storage medium of claim 33, wherein:
displaying the dynamic graphical element in the first state includes displaying the dynamic graphical element with a first opacity;
displaying the dynamic graphical element in the third state includes displaying the dynamic graphical element with a second opacity, greater than the first opacity; and
displaying the dynamic graphical element in the fourth state includes displaying the dynamic graphical element with the second opacity.

35. A method comprising:
displaying:
a dynamic graphical element in a first state; and
graphical content in a second state;
while displaying the graphical content in the second state, receiving information corresponding to detected motion, wherein the detected motion is selected from the group consisting of: movement of the computer system, movement of an environment in which the computer system is located, virtual motion of the computer system, simulated motion of the computer system, and a combination thereof; and
in response to receiving the information corresponding to the detected motion:
in accordance with a determination that the detected motion is in a first direction, displaying:
the graphical content in the second state; and
the dynamic graphical element in a third state, wherein the third state is different from the first state, and wherein the third state is based on the first direction of the detected motion; and
in accordance with a determination that the detected motion is in a second direction that is different from the first direction, displaying:
the graphical content in the second state; and
the dynamic graphical element in a fourth state, wherein the fourth state is different from the first state and the third state, and wherein the fourth state is based on the second direction of the detected motion.

36. The method of claim 35, wherein the dynamic graphical element includes a plurality of graphical objects that move concurrently with one another.

37. The method of claim 35, wherein the dynamic graphical element includes a single graphical element.

38. The method of claim 35, wherein the dynamic graphical element includes a first element that is aligned along a first display dimension, and wherein the first element has a first visual state along the first display dimension that is based on a component of the detected motion in a first physical dimension.

39. The method of claim 38, wherein the dynamic graphical element includes a second element that is aligned along a second display dimension that is different from the first display dimension, and wherein the second element has a second visual state along the second display dimension that is based on a component of the detected motion in a second physical dimension that is different from the first physical dimension.

40. The method of claim 35, wherein the dynamic graphical element includes a boundary, wherein a position of the boundary is based on the detected motion.

41. The method of claim 35, further comprising:
while displaying the dynamic graphical element in the third state, detecting a request to change the graphical content; and
in response to detecting the request to change the graphical content, displaying:
the graphical content in a fifth state that is different from the second state; and
the dynamic graphical element in the third state.

42. The method of claim 35, wherein the detected motion includes an acceleration.

43. The method of claim 35, wherein the detected motion includes a change in location.

44. The method of claim 35, wherein the third state of the dynamic graphical element is in a direction relative to the first state of the dynamic graphical element that is based on the first direction of the detected motion.

45. The method of claim 35, wherein the third state of the dynamic graphical element is different from the first state of the dynamic graphical element by an amount that is based on a magnitude of the detected motion.

46. The method of claim 35, wherein the detected motion is motion of an external object.

47. The method of claim 35, wherein the dynamic graphical element is displayed in a foreground.

48. The method of claim 35, wherein the dynamic graphical element is displayed in a background.

49. The method of claim 35, wherein:
displaying the dynamic graphical element in the third state includes displaying a set of graphical elements in a first arrangement relative to one another in a first position; and
displaying the dynamic graphical element in the fourth state includes displaying the set of graphical elements in the first arrangement relative to one another in a second position that is different from the first position.

50. The method of claim 35, further comprising:
in accordance with a determination that the detected motion includes no motion, displaying:
the graphical content in the second state; and
the dynamic graphical element in the first state.

51. The method of claim 50, wherein:
displaying the dynamic graphical element in the first state includes displaying the dynamic graphical element with a first opacity;
displaying the dynamic graphical element in the third state includes displaying the dynamic graphical element with a second opacity, greater than the first opacity; and
displaying the dynamic graphical element in the fourth state includes displaying the dynamic graphical element with the second opacity.

* * * * *